(12) United States Patent
Herr et al.

(10) Patent No.: US 10,768,141 B2
(45) Date of Patent: Sep. 8, 2020

(54) ISOELECTRIC FOCUSING ARRAYS AND METHODS OF USE THEREOF

(71) Applicant: The Regents of the University of California, Oakland, CA (US)

(72) Inventors: Amy E. Herr, Oakland, CA (US); Augusto M. Tentori, Berkeley, CA (US); Kevin A. Yamauchi, Berkeley, CA (US)

(73) Assignee: The Regents Of The University Of California, Oakland, CA (US)

( * ) Notice: Subject to any disclaimer, the term of this patent is extended or adjusted under 35 U.S.C. 154(b) by 107 days.

(21) Appl. No.: 15/749,039

(22) PCT Filed: Sep. 8, 2016

(86) PCT No.: PCT/US2016/050759
§ 371 (c)(1),
(2) Date: Jan. 30, 2018

(87) PCT Pub. No.: WO2017/044614
PCT Pub. Date: Mar. 16, 2017

(65) Prior Publication Data
US 2018/0217094 A1 Aug. 2, 2018

Related U.S. Application Data

(60) Provisional application No. 62/217,530, filed on Sep. 11, 2015.

(51) Int. Cl.
*G01N 27/447* (2006.01)
*B01D 57/02* (2006.01)

(52) U.S. Cl.
CPC ....... *G01N 27/44747* (2013.01); *B01D 57/02* (2013.01); *G01N 27/44791* (2013.01); *G01N 27/44795* (2013.01)

(58) Field of Classification Search
CPC ........ G01N 27/44795; G01N 27/44791; B01L 3/5025; C12M 47/66
See application file for complete search history.

(56) References Cited

U.S. PATENT DOCUMENTS 7,615,354 B2    11/2009 Faupel et al.
8,366,899 B2 *   2/2013 Albrecht .......... G01N 27/44795
                                                         204/459

(Continued)

FOREIGN PATENT DOCUMENTS

WO    2012177940    12/2012
WO    2014138475     9/2014

OTHER PUBLICATIONS

A.J. Hughes, Single-cell western blotting, 11 Nature Methods, 2014, p. 749-755. (Year: 2014).*

(Continued)

*Primary Examiner* — Luan V Van
*Assistant Examiner* — Caitlyn Mingyun Sun
(74) *Attorney, Agent, or Firm* — Rudy J. Ng; Bozicevic, Field & Francis LLP

(57) ABSTRACT

Isoelectric focusing devices configured for multiplex separation of sample components of interest in a polymeric separation medium are provided. Also provided are methods of using the devices as well as systems and kits that include the devices. The devices, systems and methods find use in a variety of different applications, including diagnostic and validation assays.

23 Claims, 40 Drawing Sheets

(56) References Cited

U.S. PATENT DOCUMENTS

| | | | |
|---|---|---|---|
| 2006/0240548 A1* | 10/2006 | Deutsch | B01L 3/5027 435/305.2 |
| 2008/0220442 A1* | 9/2008 | Liao | G01N 27/44726 435/7.1 |
| 2011/0177618 A1 | 7/2011 | Herr et al. | |
| 2012/0329040 A1 | 12/2012 | Herr et al. | |
| 2014/0158537 A1* | 6/2014 | Herr | G01N 27/44795 204/452 |
| 2014/0332382 A1 | 11/2014 | Herr et al. | |

OTHER PUBLICATIONS

Hughes et al., (2014) "Single-cell Western blotting," Nat Methods 11(7): 749-755.

Hughes et al., (2012) "Microfluidic integration for automated targeted proteomic assays," PNAS 109(16): 5972-5977.

Kang et al., (2014) "Single-Cell Western Blotting after Whole-Cell Imaging to Assess Cancer Chemotherapeutic Response," Analytical Chemistry 86:10429-10436.

Liu et al., (2008) "Polyacrylamide gel plugs enabling 2-D microfluidic protein separations via isoelectric focusing and multi," 29 (11): 2241-2250.

Tentori et al., (2013) "Microchamber integration unities distinct separation modes for two-dimensional electrophoresis," 85(9): 4538-4545.

\* cited by examiner

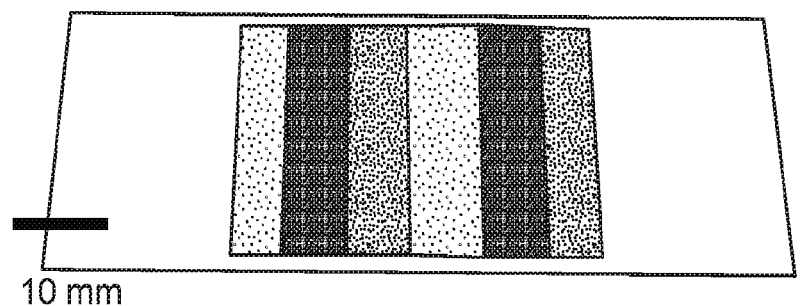
FIG. 2
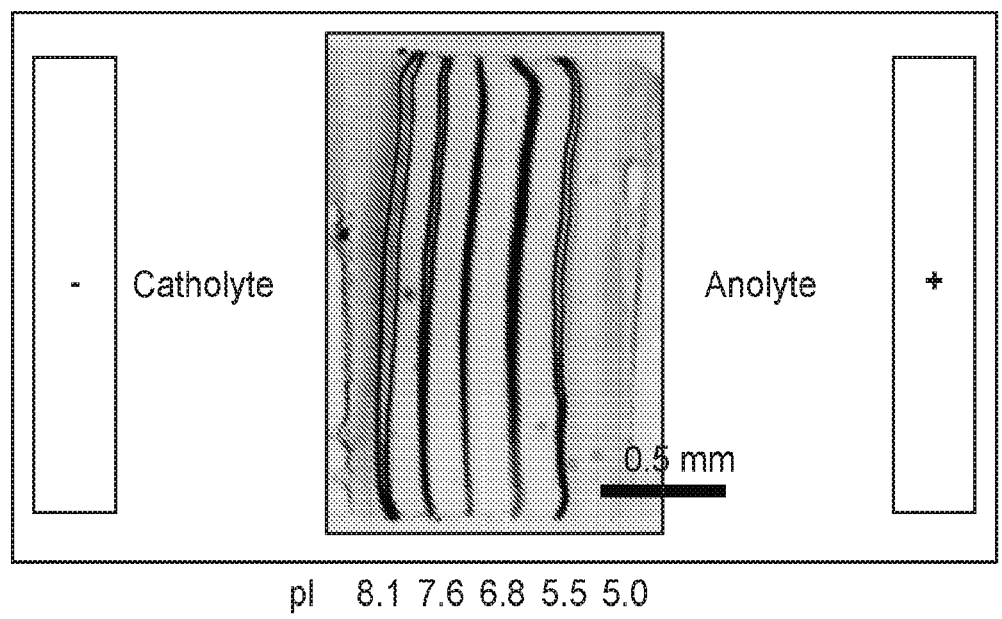
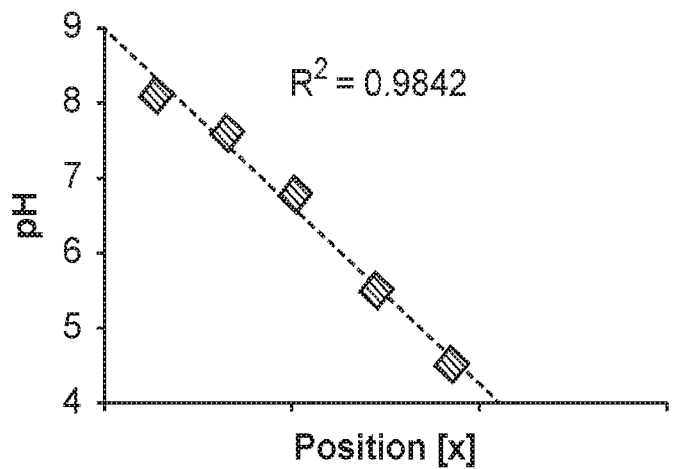
FIG. 3

| | Acidic region gel lid pH < 3.3 | Basic region gel lid pH > 10.1 | Focusing region gel lid | Gel slide |
|---|---|---|---|---|
| Gel | 15%T (3.3%C) 13.6 mM Immobiline II pK 3.6 6.4 mM Immobiline II pK 9.3 | 15%T (3.3%C) 14.4 mM Immobiline II pK 9.3 5.6 mM Immobiline II pK 3.6 | 15%T (3.3%C) | 6%T (3.3%C) 5 mM BPMAC |
| Carrier ampholytes | - | - | Polybuffer 74 1:10 Polybuffer 96 1:10 | - |
| Detergents | - | - | 3.6% (w/v) CHAPS 1% (v/v) Triton x-100 0.0125% (w/v) digitonin | - |
| Initiator | 0.2% (w/v) VA-086 | 0.2% (w/v) VA-086 | 0.2% (w/v) VA-086 | 0.08% (v/v) TEMED 0.08% (w/v) APS |

FIG. 10

| Sample | Gel | Conductivity [$\mu S\ m^{-1}$] |
|---|---|---|
| Water | 6%T | 860.1 ± 314.8 |
| Acidic gel | 15%T | 7013.4 ± 1592.2 |
| Basic gel | 15%T | 1891.9 ± 790.1 |
| Focusing gel (unfocused) | 6%T | 34328.8 ± 2193.6 |
| Focusing gel (focused) | 6%T | 4304.0 ± 1436.7 |
| Focusing gel (unfocused) | 15%T | 19519.7 ± 3297.9 |
| Focusing gel (focused) | 15%T | 6845.0 ± 681.7 |

FIG. 19

| Reagent | Diffusivity [$\mu m^2 s^{-1}$] | $t_{40\mu m}$ [s] | $t_{500\mu m}$ [s] |
|---|---|---|---|
| CHAPS | 133.86 | 5.97 | 933.53 |
| Triton X-100 | 80.00 | 10.00 | 1562.50 |
| Digitonin | 52.50 | 11.95 | 1867.50 |
| Polybuffers (200 - 1000 Da) | 7157.20 | 0.11 - 0.22 | 17.46 - 34.72 |
| pH markers (285 Da) | 6152.68 | 0.13 | 20.32 |

FIG. 21

| Simulation | Platform | Geometry | Region 1 | Region 2 | Region 3 |
|---|---|---|---|---|---|
| Lysis (Lid) | scIEF | 2D axis-symmetric | 15%T | 6%T | Free solution |
| Lysis (No lid) | scWB | 2D axis-symmetric | Free solution | 6%T | Free solution |
| Electromigration (Lid) | scIEF | 2D axis-symmetric | 15%T | 6%T | 6%T |
| Electromigration (Lid+Focusing) | scIEF | 2D | 15%T | 6%T | 6%T |
| Electromigration (No lid) | scWB | 2D axis-symmetric | Free solution | 6%T | 6%T |

FIG. 24

| Peak | Measured pI [pH units] |
|---|---|
| Acidic isoform | 4.32 ± 0.01 |
| Major isoform | 4.44 ± 0.01 |
| Basic isoform | 4.62 ± 0.00 |

FIG. 26

|  | Gel density | Partitioning coefficient K |
|---|---|---|
| $K_{eq,6\text{-}FS}$ | 6%T PAG to free solution | 0.51 ± 0.13 |
| $K_{eq,15\text{-}FS}$ | 15%T PAG to free solution | 0.24 ± 0.04 |
| $K_{eq,15\text{-}6}$ | 15%T PAG to 6%T PAG | 0.10 ± 0.04 |

FIG. 27

| Gel density | Diffusivity [$\mu m^2 s^{-1}$] |
|---|---|
| Free solution | 169.1 ± 94.1 |
| 6%T (3.3%C) | 31.3 ± 5.2 |
| 15%T (3.3%C) | 4.2 ± 1.1 |

FIG. 28

|  | anolyte region gel lid | catholyte region gel lid | focusing region gel lid | bottom layer |
|---|---|---|---|---|
| gel composition | 15%T (3.3%C) immobilines: 13.6 mM pKa 3.6 6.4 mM pKa 9.3 | 15%T (3.3%C) immobilines: 14.4 mM pKa 9.3 5.6 mM pKa 3.6 | 15%T (3.3%C) | 6%T (3.3%C) 5 mM BPMAC |
| carrier ampholytes | - | - | PB74 1:10 (v/v) PB 96 1:10 (v/v) | - |
| detergents (native) | - | - | 3.6% (w/v) CHAPS 1% (v/v) Triton x-100 0.0125% (w/v) digitonin | - |
| chaotropes (denaturing) |  |  | 7M urea 2M thiourea |  |
| initiators | 0.2% (w/v) VA-086 | 0.2% (w/v) VA-086 | 0.2% (w/v) VA-086 | 0.08% (v/v) TEMED 0.08% (w/v) APS |

FIG. 31

| data sets | pH range | well position (mm) | lysis time (s) | voltage application time (min) | lysis reagents | sample |
|---|---|---|---|---|---|---|
| 1d, S2 | 4-9 | 4.50 | 60 | 5.5 | native | U373-tGFP cells |
| 1e, S6a | 4-7 | 6.75 | 30 | 6.0 | native | U373-tGFP cells |
| S3 | 4-7 | 2.25 | 30 | 6.0 | native | U373-tGFP cells |
| 2b, S5 | 4-9 | N/A | N/A | 10.0 | native | wtGFP |
| S7 | 4-9 | N/A | N/A | 5.0 | native | tGFP |
| 2c | 4-7 | N/A | N/A | 10.0 | native | pH markers |
| 3a, S6b | 4-7 | 2.25 | 30 | 6.0 | native | U373-tGFP cells |
| 3b, S6c | 4-7 | 2.25 | 30 | 6.0 | denaturing | U373-tGFP cells |
| 3e, S6d | 4-7 | 2.25 | 30 | 6.0 | denaturing | U373-tGFP cells |

FIG. 38

| reagent | diffusivity ($\mu m^2 s^{-1}$) | $t_{40\mu m}$ (s) | $t_{500\mu m}$ (s) |
|---|---|---|---|
| CHAPS | 133.86 | 5.97 | 933.53 |
| Triton X-100 | 80.00 | 10.00 | 1562.50 |
| digitonin | 52.50 | 11.95 | 1867.50 |
| Polybuffers (200 - 1000 Da) | 7157.20 | 0.11-0.22 | 17.46-34.72 |
| urea | 903.66 | 1.77 | 276.66 |
| thiourea | 1314.00 | 1.22 | 190.26 |
| pH markers (285 Da) | 6152.68 | 0.13 | 20.32 |

FIG. 39

ISOELECTRIC FOCUSING ARRAYS AND METHODS OF USE THEREOF

CROSS-REFERENCE TO RELATED APPLICATIONS

This application claims the benefit pursuant to 35 U.S.C. § 119(e) of U.S. Provisional Application No. 62/217,530, filed Sep. 11, 2015, the disclosure of which is incorporated herein by reference in its entirety.

REFERENCE TO GOVERNMENT SUPPORT

This invention was made with government support under grant number 1056035 awarded by the National Science Foundation. The government has certain rights in the invention.

INTRODUCTION

Isoelectric focusing (IEF) separates analytes by isoelectric point (pI), making the assay useful for detection of protein isoforms and post-translational modifications with small differences in molecular weight, but detectable pI shifts. Protein pI is a physicochemical property determined by amino acid composition, three-dimensional conformation, and modified chemical groups that affect protein charge. pI differences in protein isoforms are generally attributable to post-translational modifications including enzymatic glycosylation or primary sequence cleavage processes occurring within the cell. IEF can resolve electrostatic charge differences between protein isoforms, making IEF useful for the study of biophysical phenomena. IEF separation occurs when an electric field is applied along the axis of a stable pH gradient, commonly formed by polyprotic amphoteric buffers called carrier ampholytes. A pH gradient is formed by the carrier ampholytes between terminal buffers at basic and acidic pH values upon application of an electric field. At equilibrium, focused proteins experience a balance between eletromigration and diffusion.

In certain assays, it may be desirable to perform multiplexed IEF separations and IEF of the protein contents from single cells.

SUMMARY

Isoelectric focusing devices configured for multiplex separation of sample components of interest in a polymeric separation medium are provided. Also provided are methods of using the devices as well as systems and kits that include the devices. The devices, systems and methods find use in a variety of different applications, including diagnostic and validation assays.

Aspects of the present disclosure include a device that includes a polymeric separation medium having an isoelectric focusing region configured for multiplex separation of sample components of interest from two or more samples in the polymeric separation medium.

In some embodiments, the polymeric separation medium includes two or more isoelectric focusing regions arranged in series along an axis of the polymeric separation medium.

In some embodiments, each isoelectric focusing region includes a pH gradient along the axis of the polymeric separation medium.

In some embodiments, the isoelectric focusing region includes a polymeric gel.

In some embodiments, the pH gradient is an immobilized pH gradient.

In some embodiments, the polymeric separation medium further includes functional groups that covalently bond to the sample components of interest in the polymeric separation medium upon application of an applied stimulus.

In some embodiments, the polymeric separation medium includes a pH gradient along an axis of the polymeric separation medium, and a plurality of microwells arranged for parallel separations of the sample components of interest along the axis from each microwell.

In some embodiments, each microwell is dimensioned to accommodate a single cell.

In some embodiments, the device also includes a polymeric gel cover configured to contact a top surface of the polymeric separation medium.

In some embodiments, the polymeric gel cover contacts one or more electrodes configured to apply an electric field to the polymeric separation medium.

In some embodiments, the polymeric gel cover includes a pH gradient along an axis of the polymeric gel cover substantially parallel to the axis of the polymeric separation medium.

In some embodiments, the polymeric gel cover includes a lysis reagent.

In some embodiments, the polymeric separation medium includes two or more isoelectric focusing regions arranged in series along the axis of the polymeric separation medium.

In some embodiments, the polymeric separation medium further includes functional groups that covalently bond to the sample components of interest in the polymeric separation medium upon application of an applied stimulus.

Aspects of the present disclosure include a method that includes contacting a sample to a polymeric separation medium as described herein, and applying an electric field to the polymeric separation medium in a manner sufficient to perform a multiplex isoelectric focusing separation of the sample components of interest in the polymeric separation medium.

In some embodiments, the polymeric separation medium includes two or more isoelectric focusing regions arranged in series along an axis of the polymeric separation medium.

In some embodiments, the polymeric separation medium includes a pH gradient along an axis of the polymeric separation medium, and a plurality of microwells arranged for parallel separations of the sample components of interest along the axis from each microwell, and where, prior to applying the electric field, the method includes contacting a top surface of the polymeric separation medium with a polymeric gel cover having a pH gradient along an axis of the polymeric gel cover substantially parallel to the axis of the polymeric separation medium.

In some embodiments, the sample includes cells and/or cellular components.

In some embodiments, the method further includes lysing the cells to produce cellular components of interest in the sample.

In some embodiments, the method further includes immobilizing the separated sample components in the polymeric separation medium.

In some embodiments, the method further includes detecting the separated sample components.

Aspects of the present disclosure include a system that includes a device comprising a polymeric separation medium having an isoelectric focusing region configured for multiplex separation of sample components of interest from two or more samples in the polymeric separation medium, and an electric field source.

Aspects of the present disclosure include a kit that includes a device as described herein, and a packaging containing the device.

BRIEF DESCRIPTION OF THE FIGURES

FIG. 2 shows an image of gel photopatterning on a slide, according to embodiments of the present disclosure. Horizontal regions of gels containing different food dyes were photopolymerized and crosslinked to a glass slide.

FIG. 3 shows an image and graph of IEF on a polyacrylamide gel between glass slides, according to embodiments of the present disclosure. Location of pH gradient indicated in inverted fluorescence micrographs by UV fluorescent pH markers. pH gradient was linear in the x-direction and uniform along the y-direction.

FIG. 5, panel A, shows a schematic of a device, according to embodiments of the present disclosure. FIG. 5, panel B, shows a montage of inverted fluorescence micrographs of scIEF from a 40 µm wells. Cell lysis began at t=0 s and the protein contents indicated by GFP fluorescence were loaded upon application of an electric field at t=60 s. Focusing time ~t=270 s (contrast adjusted for the different time points). Intensity profiles at different times were obtained from a horizontal x-axis window spanning the well size. FIG. 5, panel C, shows a device operation schematic. Cells were first settled onto the patterned wells. Then, the multi-patterned lid containing carrier ampholytes and lysis reagents in the center region was laid over the gel slide containing the settled cells and the electrodes. After a 60 s lysis, an electric field was applied which led to the formation of a pH gradient and scIEF.

FIG. 6, panel A, shows a montage of inverted fluorescence micrographs of scIEF from two 40 µm wells with loaded cells. Cell lysis began at t=30 s and the protein contents indicated by GFP fluorescence were loaded upon application of an electric field at t=80 s. Proteins focus at t=390 s (contrast adjusted for the last three time points). Graph shows position of band center in the x-axis with error bars representing sigma for band width. FIG. 6, panel B, shows intensity profiles at different times obtained from indicated horizontal x-axis window. Graph shows maximum intensity and inset shows SNR at each time point. FIG. 6, panel C, shows intensity profiles at different times obtained from indicated vertical y-axis window. Graph shows maximum intensity and inset shows signal to noise ratio (SNR) at each time point. FIG. 6, panel D, shows graphs of the separation resolution in the y-axis and the spacing between the peaks of the bands in the y-axis.

FIG. 9, panel A, shows an inverted fluorescence micrographs of whole-gel scans after cell settling and after protein photocapture upon completion of scIEF. Plot shows intensity vs. position for the cells in the wells before scIEF and after photocapture. FIG. 9, panel B, shows a zoomed in view of fluorescent cells settled in wells, and the corresponding photocaptured protein band. FIG. 9, panel C, shows inverted fluorescence micrographs of GenePix scans of GFP fluorescence (488 channel) and fluorescent antibody signal (640 channel) after immunoprobing.

FIG. 10 shows a table of gel precursor solution compositions. Carrier ampholytes and detergent composition can vary and gel slide can include 1:100 (v/v) dilutions of pH markers and 10 µg/ml of wtGFP, as specified.

FIG. 13, panel A, shows a montage of inverted fluorescence micrographs (contrast adjusted easy visualization) of U373 cells expressing TurboGFP settled into two adjacent microwells. Device contained a single row of wells in the center of a 9 mm focusing region spaced 500 µm apart. Cell lysis began at t=10 s and the protein contents indicated by TurboGFP fluorescence were loaded upon application of a potential difference of 600

V at t=60 s. Proteins focused at t=370 s. FIG. 13, panel B, shows the position of band center in the x-axis with error bars representing σ for band width. FIG. 13, panel C shows thesSeparation resolution in the y-axis and the spacing between the peaks of the bands in the y-axis.

FIG. 14, panel A, shows the inverted UV fluorescence micrograph of a 4× scan of the scIEF system taken at 10 min from start of electric field application. The gradient was analyzed at 500 µm window intervals in the y-axis, corresponding to scIEF lanes. FIG. 14, panel B, shows extrapolated ends of the pH gradient (pH 4 and pH 9). FIG. 14, panel C, shows linearity of the pH gradient indicated by R2. FIG. 14, panel D, shows the peak capacity measured using pH marker or wtGFP isoform widths. FIG. 14, panel E, shows ΔpI measured using either pH marker or wtGFP isoform widths. Error bars represent the standard deviation resulting from averaging the 4 different pH marker band widths and the 3 wtGFP isoform band widths.

FIG. 15, panel A shows inverted fluorescence micrograph of turboGFP signal in the IEF system (bottom layer and gel lid layer) during focusing (pH 4-9, 9 mm wide gradient, 600 V, native conditions). FIG. 15, panel B, shows the inverted fluorescence micrograph of turboGFP signal in the gel lid slide after stopping the electric field and removing gel lid from bottom layer. Data from these scans is shown FIG. 34, panel B. The signal in the gel lid was ~15% of the total signal in the full IEF system (lid+bottom layer) after 10 min of focusing. Scale bars are 1 mm.

FIG. 16, panel A, shows inverted UV fluorescence micrographs of scIEF system taken at 5, 10, 15, 20 min from the start of electric field application. The pH markers indicate the position of the pH gradient. The gradient was analyzed at 500 µm intervals in the y axis, corresponding to scIEF lanes. FIG. 16, panel B, shows extrapolated ends of the pH gradient (pH 4 and pH 9). FIG. 16, panel C, shows the length of the pH gradient. FIG. 16, panel D, shows linearity of the pH gradient indicated by R2. FIG. 16, panel E, shows the peak capacity measured using average pH marker band widths. FIG. 16, panel F, shows the minimum resolvable pI difference measured using average pH marker band widths. FIG. 16, panel G, shows the pH gradient drift determined by measuring the position changes of the pH marker bands at 5 min intervals.

FIG. 17, panel A, shows intensity profiles of fluorescence from the TurboGFP signal at different times obtained from a vertical y-axis window. Intensity profiles were obtained by averaging intensities in a window proportional to the well width. FIG. 17, panel B, shows the difference in the center of both bands along the y axis. FIG. 17, panel C, shows a graph of the maximum intensity along the y axis for both bands. FIG. 17, panel D, shows a Graph of SNR for the signal from each well at each timepoint in a log scale. FIG. 17, panel E, shows intensity profiles of fluorescence from the TurboGFP signal of the lower well at different times obtained from a horizontal x-axis window. Intensity profiles were obtained by averaging intensities in a window proportional to well width. Plots were aligned by the peak center since the band is moving in the x direction. FIG. 17, panel F, shows signal enrichment of signal from lower well along the x axis. Stacking was calculated by dividing band width at each time point by the initial band width of the signal from the well before cell lysis. FIG. 17, panel G, shows a graph of the maximum intensity along the x-axis for the lower well. FIG. 17, panel H, shows a graph of SNR for the signal along the x-axis from bottom well at each timepoint in a log scale. SNR was calculated by taking max intensity and dividing it by the standard deviation of the signal in a window of the same size as the signal window outside of the signal.

FIG. 18, panel A, shows a schematic of the scIEF apparatus. FIG. 18, panel B, shows that the first cells were settled into the microwells via gravity. Then, the lid containing the pH gradient and lysis reagents was brought in contact with the gel slide, thus simultaneously completing the fluidic and electrical circuits. The compliance of the free-standing gel lid prevented bubble trapping between lid and gel. The reagents in the gel lid were transported into the gel slide by diffusion, initiating cell lysis. Upon completion of lysis, the electric field was applied and IEF begins. During focusing, the carrier ampholytes self-assembled into a pH gradient and the proteins migrated to their pI. Proteins focused into a stationary zone at the position where the local pH equaled the protein pI because the proteins had no net electrophoretic mobility. After focusing, the device was irradiated with UV light, covalently immobilizing the proteins in the benzophenone-containing PAG matrix. FIG. 18, panel C, shows the slide after photocapture, where the slide was probed with fluorescently-labeled antibodies for targets of interest and imaged with a fluorescence microarray scanner. Integrated fluorescence of the individual bands was assessed to determine relative protein expression.

FIG. 19 shows Measured conductivities. Mean values and standard deviations were reported for 3 technical replicates.

FIG. 20, panel A, shows the device geometry. FIG. 20, panel B, shows a zoomed in gel slide and mesh. FIG. 20, panel C, shows the electric field in uniform conductivities. FIG. 20, panel D, shows the electric field in unfocused carrier ampholytes conductivities. FIG. 20, panel E, shows the electric field in focused carrier ampholytes conductivities. The magnitude of the x component of the electric field was measured along the center of the lid (250 µm) and along the center (−15 µm), ¼ (−7.2 µm), and ¾ (−22.5 µm) of the height of the gel slide for all 3 conditions.

FIG. 21 shows a table of free solution diffusivities of reagents used in the focusing region of scIEF.

FIG. 22, panel A, shows 2 back-to-back 9 mm 4-9 pH gradients formed using alternating acidic, basic, and focusing regions. FIG. 22, panel B, shows 4 back-to-back 3 mm 4-9 pH gradients formed using alternating acidic, basic, and focusing regions. FIG. 22, panel C, shows 9 mm 4-7 pH gradient. FIG. 22, panel D, shows 3 mm 4-7 pH gradient.

FIG. 23, panel A, shows the device geometry and mesh. The configurations for the different conditions were specified in FIG. 24. FIG. 23, panel B, shows the heat map of scIEF system during lysis after 40 s. FIG. 23, panel C, shows the heat map of single-cell western blotting system during lysis after 10 s. Heat map scales ranged from 0 to 2% of the initial starting concentration. FIG. 23, panel D, shows integrated concentration of retained protein over time during lysis. FIG. 23, panel E, shows integrated concentration of retained protein over time during electromigration.

FIG. 24 shows a table of protein simulation configurations.

FIG. 25, panel A, shows inverted fluorescence micrographs of 10× magnification channels scans in the UV and GFP channels. The aspect ratio distorted for visualization of the focused bands. FIG. 25, panel B, shows a plot of the calculated position of the focused pH markers and the major TurboGFP isoform. The error bars indicate the measured σ as the band widths and the dotted line indicates the extrapolated position of the linear fit of the pH gradient. The mean value±standard deviation of the pI for the isoforms were determined using 3 technical replicates. The pH gradients were linear with R2=1.00±0.00.

FIG. 26 shows the estimated pI values of extracted TurboGFP isoforms. Mean value and standard deviations for 3 technical replicates were included. The pH gradients linear with R2=1.00±0.00.

FIG. 27 shows a table of the partitioning coefficients.

FIG. 28 shows measured TurboGFP diffusivity. Mean values and standard deviations reported for 3 technical replicates.

FIG. 30, panel A, shows an exploded view rendering of scIEF assay setup. FIG. 30, panel B, shows isometric schematic of the multilayer scIEF microdevice and top view photograph of lid layer with catholyte and anolyte regions with blue and red dye, respectively. FIG. 30, panel C, shows scIEF workflow. FIG. 30, panel D, shows a time-course of tGFP fluorescence signal position during single-cell lysis and scIEF. Error bars indicate band width (4σ). pH range 4-9, microwell position 4.5 mm from catholyte-side edge of the bottom gel. FIG. 30, panel E, shows inverted grayscale fluorescence micrographs report blotting and subsequent immunoprobing (α-tGFP) from a single cell. pH range 4-7, microwell position 6.75 mm from catholyte-side edge of the bottom gel. Traces in arbitrary fluorescence units (AFU).

FIG. 31 shows a polyacrylamide gel precursor solution compositions. Carrier ampholyte and lysis reagent composition was varied for different experiments, as specified. Because ionic detergents such as SDS are incompatible with IEF, chaotropes were added to the focusing gel region for denaturing conditions in addition to the detergents used for native conditions. The anolyte region had pH<3.3 and catholyte region had pH>10.1. pH measurements were done with a Twin Compact pH Meter (Horiba Scientific, Edison, N.J.).

FIG. 32, panel A, shows a montage of inverted fluorescence micrographs (contrast adjusted easy visualization) of scIEF from adjacent microwells expressing tGFP settled into two adjacent microwells. FIG. 32, panel B, shows the intensity profiles obtained from a horizontal x-axis window of the tGFP fluorescence signal of the bottom microwell during focusing. Plots of the moving protein band are aligned at the peak center. FIG. 32, panels C-D, shows the maximum intensity and SNR along the x-axis from bottom microwell over time. FIG. 32, panel E, shows intensity profiles obtained from a vertical y-axis window of the tGFP fluorescence signal of both microwells during focusing. FIG. 32, panel F, shows the separation resolution in the y-axis and the spacing between the peaks of the bands in the y-axis. FIG. 32, panel G, shows the difference in the center of both bands along the y-axis. FIG. 32, panels H-I, shows the maximum intensity and SNR along the y-axis from bottom microwell over time. Data from the bottom microwell is shown in FIG. 30. Traces in arbitrary fluorescence units (AFU). We have demonstrated the ability to perform parallel IEF separations from single cells for the first time. This novel approach has a high degree of customization, as the pH gradient composition and length can easily be tuned for the desired application. Additionally, we showcase a novel approach for the formation of back-to-back pH gradients for increasing the multiplexing of IEF arrays.

FIG. 33, panel A shows micrographs of the focused tGFP bands from single U373-tGFP cells from 3 separate devices. FIG. 33, panel B shows the coefficient of variance of the tGFP peak location across the three devices was 14.87% (n=3 devices, 9 cells).

FIG. 34, panel A shows concentration heat maps from simulation show protein diffusion out of the bottom layer is mitigated in hindered (with lid) vs unhindered (no lid, free solution) conditions. Plots indicate maximum concentration along z-axis. Fraction of total protein in bottom layer is fbl. FIG. 34, panel B shows fluorescence traces that show tGFP transfer from bottom layer to lid layer after 10 min of scIEF. FIG. 34, panel C shows inverted grayscale fluorescence micrograph that show focused pH markers in pH 4-7 gradient. Dashed line is linear fit; error bars, peak widths (4σ).

FIG. 35, panel A shows photocaptured and immunoblotted tGFP signal after native scIEF. Data from these scans is displayed in FIG. 30, panel E. FIG. 35, panel B shows immunoblotted tGFO and β-TUB signal after native scIEF. Data from these scans is displayed in FIG. 37, panel A and FIG. 37, panel C. FIG. 35, panel C shows immunoblotted tGFO and β-TUB after denaturing scIEF. Data from these scans is displayed in FIG. 37, panels B-D. FIG. 35, panel D shows Lamin A/C signal after denaturing scIEF. Data from these scans is displayed in FIG. 37, panel E. All scale bars are 2 mm.

The dashed black lines indicate the extents of the bottom layer and the arrows indicated the focused tGFP. Photocapture efficiency was quantified as $\eta = AUC_{after\_wash}/AUC_{before\_wash} = AUC_{before\_wash}$ are the area under the curve of the tGFP band before and after washing. Photocapture was determined to be $\eta = 17.7 \pm 1.5\%$ (n=30 ROIs).

Figure 37:
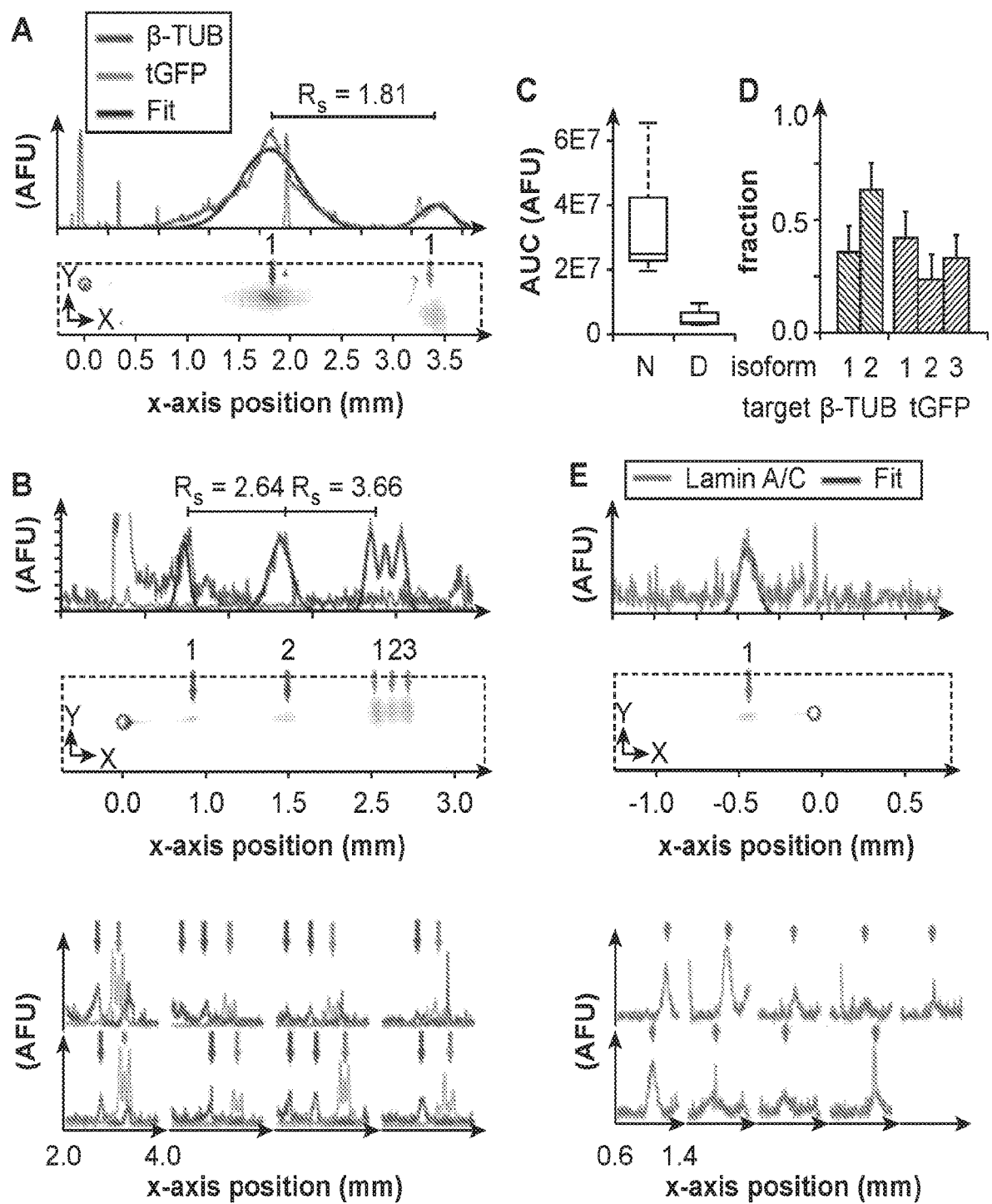

FIG. 37 shows scIEF with immunoprobing that resolves proteoforms in individual mammalian cells. FIG. 37, panel A, shows false-color fluorescence micrographs and traces show scIEF detection via immunoprobing of β-TUB and tGFP from individual cells. Microwells are outlined with black circle, located at 0 mm. Arrows indicate protein peaks; plotted black outlines, Gaussian fits for identified peaks. FIG. 37, panel B, shows false-color fluorescence micrographs and traces show detection of denatured β-TUB isoforms in 3/8 cells. FIG. 37, panel C, shows median total tGFP probing fluorescence (Area under the curve, AUC) under native "N" and denaturing "D" conditions (nD=8, nN=9, p<0.01). FIG. 37, panel D, shows relative isoform fractions (nβ-TUB=3, ntGFP=8). FIG. 37, panel E shows false-color fluorescence micrographs and traces show detection of lamin A/C from individual cells under denaturing conditions (nD=9). pH range 4-7, microwell position 6.75 mm from catholyte-side edge of the bottom gel in all separations.

FIG. 38 shows a table of experimental conditions. Microwell position along the x-axis was measured from the catholyte-side edge of the bottom gel. The focusing region was 9 mm wide along the focusing direction (x-axis) and a potential difference of 600 V was applied in all experiments.

FIG. 39 shows a table of free solution diffusivities used in the focusing region of scIEF.

Figure 40:
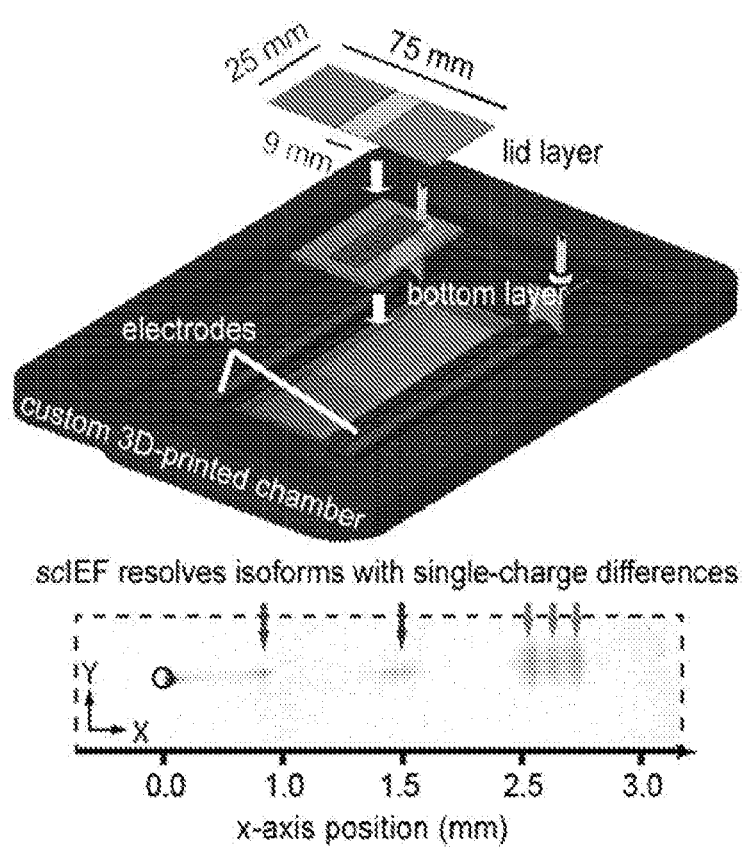

FIG. 40 shows a schematic and image of a multilayer, patterned hydrogel device that was used to perform isoelectric focusing to separate protein isoforms with single-cell resolution (scIEF), according to embodiments of the present disclosure. All preparative and analytical steps were performed on the device without using pumps or valves, including: cell isolation, cell lysis, protein separation via IEF, UV-actuated blotting, and in-gel immunoprobing. Protein isoforms with single-charge differences were resolved, blotted, and then detected via immunoprobing.

DETAILED DESCRIPTION

Isoelectric focusing devices configured for multiplex separation of sample components of interest in a polymeric separation medium are provided. Also provided are methods of using the devices as well as systems and kits that include the devices. The devices, systems and methods find use in a variety of different applications, including diagnostic and validation assays.

Below, the subject multiplex separation devices are described first in greater detail. Methods of detecting one or more analytes in a sample are also disclosed in which the subject devices find use. In addition, systems and kits that include the subject devices are also described.

Devices

Embodiments of the present disclosure include separation devices. In certain embodiments, the separation devices are configured to separate analytes in a sample. For example, the separation devices may be configured to separate analytes in a sample based on one or more physical and/or chemical properties of the analytes. In some instances, the analytes may include detectable differences in their molecular weight, size, charge (e.g., mass to charge ratio), isoelectric point, affinity interactions, and the like. Separation devices of the present disclosure may be configured to distinguish different analytes from each other based on one or more of their molecular weight, size, charge (e.g., mass to charge ratio), isoelectric point, affinity interactions, and the like.

In certain embodiments, the separation medium is configured to separate the constituents in the sample based on the isoelectric point (pI) of the constituents (e.g., isoelectric focusing, IEF). As such, embodiments of the subject devices include a polymeric separation medium with an isoelectric focusing region. In some cases, the separation medium is a polymeric separation medium, such as a polymeric gel separation medium. For example, the polymeric gel may include a polyacrylamide gel, an agarose gel, and the like. In some cases, the polymeric gel is a polyacrylamide gel.

In certain embodiments, the polymeric separation medium includes an isoelectric focusing region. The isoelectric focusing region is an area of the polymeric separation medium where an IEF analysis of constituents of interest in a sample can be performed. In some instances, the isoelectric focusing region is configured for multiplex analysis of sample constituents of interest from two or more samples in the polymeric separation medium.

By "multiplex" or "multiplex analysis" is meant that two or more samples are analyzed at substantially the same time, e.g., substantially simultaneously. For instance, two or more samples may be subjected to the analysis methods and/or devices described herein, where two or more samples are analyzed in parallel. Thus, two or more samples may be subjected to an IEF assay in the isoelectric focusing region of the polymeric separation medium at substantially the same time (e.g., parallel analyses). The presence one or more distinct analytes in each sample may be determined in each sample. In some cases, the methods include the multiplex analysis of two or more samples, such as two or more cells, to determine the presence of one or more analytes of interest in each sample (e.g., in each cell). In certain instances, the sample to be analyzed in each of the multiple analyses is a single cell. In some instances, the number of samples analyzed is greater than 2, such as 4 or more, 6 or more, 8 or more, etc., up to 20 or more, e.g., 50 or more, including 100 or more, or 250 or more, or 500 or more, or 750 or more, or 1000 or more distinct samples. In certain embodiments, the methods include the multiplex analysis of 2 to 1000 distinct samples, such as 4 to 500 distinct samples, including 4 to 100 distinct samples.

In some instances, multiplex may also refer to detecting the presence of two or more analytes in a sample in a single assay. For instance, a sample may be subjected to the analysis methods and/or devices described herein, where two or more analytes in the sample are detected. The presence two or more distinct analytes in each sample may be determined in these types of multiplex analyses. In certain instances, the sample to be analyzed for the presence of two or more analytes is a single cell. In some instances, the number of analytes to be detected is greater than 2, such as 4 or more, 6 or more, 8 or more, etc., up to 20 or more, e.g., 50 or more, including 100 or more distinct analytes. In certain embodiments, the methods include the multiplex analysis of 2 to 100 distinct analytes, such as 4 to 50 distinct analytes, including 4 to 20 distinct analytes.

In certain embodiments, multiplex analysis also includes the use of two or more different detectable labels. The two or more different detectable labels may specifically bind to the same or different analytes. In some cases, the two or more different detectable labels may specifically bind to the same analyte. For instance, the two or more different detectable labels may include different antibodies specific for different epitopes on the same analyte. The use of two or more detectable labels specific for the same analyte may facilitate the detection of the analyte by improving the signal-to-noise ratio. In other cases, the two or more different detectable labels may specifically bind to different analytes. For example, the two or more detectable labels may include different antibodies specific for epitopes on different analytes. The use of two or more detectable labels each specific for different analytes may facilitate the detection of two or more respective analytes in the sample in a single assay.

In contrast to multiplex analysis, "uniplex" or "uniplex analysis" is meant that a single sample is analyzed to detect the presence of one or more analytes in the sample. For example, a sample may include a mixture of one or more analytes of interest and other molecular entities that are not of interest. In some cases, the methods include the uniplex analysis of a single sample, such as a single cell, to determine the presence of one or more analytes of interest in the sample. In certain instances, the single sample to be analyzed in a uniplex analysis is a single cell.

In certain embodiments, the separation medium is configured for isoelectric focusing and includes a buffer. The buffer may be any convenient buffer suitable for isoelectric focusing. In some instances, the buffer is a catholyte buffer, such as, but not limited to a sodium hydroxide buffer. In some instances, the buffer is an anolyte buffer, such as but not limited to, a phosphoric acid buffer. In certain embodiments, the separation medium includes a fluid-phase pH gradient. As such, in some instances, the separation medium in the isoelectric focusing region includes a polybuffer, an ampholyte solution or an electrode-generated pH gradient.

Any other convenient buffer for gel electrophoresis may also be used as desired. For example, the buffer can be a Tris buffer, such as a Tris-glycine buffer (e.g., the buffer may include a mixture of Tris and glycine).

In certain instances, the polymeric separation medium (e.g., the polymeric gel) includes a pH gradient in the isoelectric focusing region. In some embodiments, the pH gradient is co-polymerized with the polymeric separation medium. In embodiments where the pH gradient is co-polymerized with the polymeric separation medium, the pH gradient may be substantially immobilized resulting in a separation medium having an immobilized pH gradient. In certain instances, the pH gradient includes a weak acid and/or a weak base (e.g., Immobilines), ampholytes, combinations thereof, and the like.

In certain embodiments, the IEF region includes two or more sub-regions. In some cases, the sub-regions of the IEF region are aligned perpendicular to the separation axis of the polymeric separation medium. In some instances, the IEF region includes a focusing sub-region, where isoelectric focusing takes place. As such, the sample to be analyzed may be applied to the polymeric separation medium in the focusing sub-region. The IEF region may also include an acidic sub-region, which can be positioned on one side of the focusing sub-region. The IEF region may also include basic sub-region, which can be positioned on a side of the focusing sub-region opposite from the acidic sub-region. As such, the focusing sub-region is positioned between the acidic sub-region and the basic sub-region. The acidic sub-region may be on the same side of the polymeric separation medium as the positive electrode of the device. The basic sub-region may be on the same side of the polymeric separation medium as the negative electrode of the device. Thus, the acidic and basic sub-regions can form the pH gradient used in the IEF analysis.

In certain embodiments, the buffer is configured to perform lysis of cells or a portion thereof (e.g., differential lysis of a sub-cellular compartment) and electrophoresis of the cellular components released by lysis of the cell or portion thereof (e.g., differential lysis of a sub-cellular compartment). For instance, the buffer may include a lysis reagent (e.g., a cell lysis reagent). In some cases, the buffer is a buffer sufficient to differentially lyse a sub-cellular compartment of a cell to produce a set of cellular components. For instance, the buffer may be configured to lyse a first sub-cellular compartment, such as the cell membrane, without causing significant lysis of other sub-cellular compartments, such as the nuclear membrane. In some cases, the buffer is configured to selectively lyse the cell membrane such that cytosol is released from the cell without causing significant lysis of other sub-cellular compartments, such as the nuclear membrane. In certain embodiments, the buffer may be configured to lyse a different sub-cellular compartment, such as the nuclear membrane. In certain embodiments, the buffer may not cause significant lysis of other sub-cellular compartments, such as mitochondria, plastids, or other organelles. In some cases, the buffer is configured to selectively lyse the nuclear membrane such that the contents of the cell nucleus are released from the nucleus without causing significant lysis of other sub-cellular compartments, such as mitochondria, plastids, or other organelles. Different buffers may be used sequentially in different steps of the methods described herein in achieve differential lysis of sub-cellular compartments of the cell, such that the contents of different sub-cellular compartments of a cell may be analyzed in series.

In some embodiments, the buffer may be heated to a temperature above room temperature. For instance, the buffer may be heated to a temperature of 25° C. or more, or 30° C. or more, or 35° C. or more, or 40° C. or more, or 45° C. or more, or 50° C. or more, or 55° C. or more, or 60° C. or more, or 65° C. or more, or 70° C. or more, or 75° C. or more. In some cases, the buffer is heated to 50° C.

In some cases, the buffer includes a lysis reagent, such as a detergent. In some cases, the detergent facilitates lysis of a cell or portion thereof as described above. In certain instances, the detergent is configured to provide analytes in the sample with substantially similar charge-to-mass ratios. Analytes with substantially similar charge-to-mass ratios may facilitate the separation of the analytes into one or more bands in the separation medium based on the molecular masses of the analytes in the sample. In certain cases, the detergent is a non-ionic detergent. For example, the detergent may be digitonin, Triton X-100, CHAPS (3-[(3-cholamidopropyl)dimethylammonio]-1-propanesulfonate), and the like. Combinations of detergents may also be included in the buffer.

In certain embodiments, the buffer is configured to selectively lyse the cell membrane such that cytosol is released from the cell without causing significant lysis of other sub-cellular compartments, such as the nuclear membrane; e.g., the buffer is a cytosol lysis buffer. Examples of cytosol lysis buffers include, but are not limited to, Triton X-100, Tris-glycine, CHAPS, combinations thereof, and the like. In some instances, the cytosol lysis buffer may include a detergent, such as, but not limited to digitonin and/or CHAPS. For example, a cytosol lysis buffer may include Triton X-100, digitonin and CHAPS.

In certain embodiments, the buffer is configured to selectively lyse the nuclear membrane such that the contents of the cell nucleus are released from the nucleus without causing significant lysis of other sub-cellular compartments, such as mitochondria, plastids, or other organelles; e.g., the buffer is a nuclear lysis buffer. Examples of nuclear lysis buffers include, but are not limited to, Triton X-100, Trisglycine, combinations thereof, and the like. In some instances, the nuclear lysis buffer may include a detergent as described above.

In certain embodiments, the separation devices are microfluidic separation devices. A "microfluidic device" is a device that is configured to control and manipulate fluids geometrically constrained to a small scale (e.g., sub-millimeter). Embodiments of the microfluidic devices include a polymeric medium, e.g., a polymeric separation medium as described herein. The polymeric separation medium may include a covalently bound capture member that specifically binds to an analyte of interest in a sample. The separation devices of the present disclosure may also be configured to perform assays on a larger scale, such as fluidic device configured to control and manipulate fluids on a milliliter (e.g., milliliter) scale, or larger.

In certain embodiments, the separation device includes a solid support. The solid support may be configured to support a polymeric medium (e.g., the polymeric separation medium). For example, the polymeric separation medium may be provided on the solid support, such that at least a portion of the polymeric separation medium is in contact with a surface of the solid support (e.g., the device includes a solid support carrying the polymeric medium). In some cases, the solid support is composed of a material that is inert (e.g., does not significantly degrade or react) with respect to the samples, buffers, detergents, reagents, analytes, etc. used in the subject devices and methods. For instance, the solid support may be made of a material, such as, but not limited to, glass, quartz, polymers, elastomers, paper, combinations thereof, and the like. In certain embodiments, the solid support is substantially transparent. By "transparent" is meant that a substance allows visible light to pass through the substance. In some embodiments, a transparent solid support facilitates detection of analytes bound to the polymeric medium, for example analytes that include, produce, or are labeled with a detectable label, such as a fluorescent label. In some cases, the solid support is substantially opaque. By "opaque" is meant that a substance substantially blocks visible light from passing through the substance. In certain instances, an opaque solid support may facilitate the analysis of analytes that are sensitive to light, such as analytes that react or degrade in the presence of light.

In certain embodiments, the solid support is sized to accommodate the polymeric separation medium. For example the solid support may have dimensions (e.g., length and width) such that the entire polymeric separation medium is supported by the solid support. In some cases, the solid support may have dimensions (e.g., length and width) larger than the polymeric separation medium. In some instances, the solid support has dimensions in the range of 10 mm×10 mm to 200 mm×200 mm, including dimensions of 100 mm×100 mm or less, such as 50 mm×50 mm or less, for instance 25 mm×25 mm or less, or 10 mm×10 mm or less, or 5 mm×5 mm or less, for instance, 1 mm×1 mm or less. In some cases, the solid support has a thickness ranging from 0.5 mm to 5 mm, or 1 mm to 4 mm, of 1 mm to 3 mm, or 1 mm to 2 mm. In certain instances, the solid support has a thickness of 1 mm.

As described herein, the subject devices include a polymeric separation medium that can be configured for multiplex separation of sample components of interest (e.g., two or more analytes of interest) from two or more samples in the polymeric separation medium. In some cases, the polymeric separation medium includes two or more isoelectric focusing regions. For a multiplex analysis, the two or more IEF regions can be arranged in series along an axis of the polymeric separation medium. For example, the IEF regions can be arranged along a separation axis of the polymeric separation medium. In some cases, the separation axis is aligned (e.g., substantially parallel) to the pH gradient of the IEF region. Stated another way, the IEF region can include a pH gradient along the axis (separation axis) of the polymeric separation medium. As such, sample components of interest are separated along the separation axis of the polymeric separation medium during an IEF analysis. Thus, as described above, two or more IEF regions can be arranged in series along an axis (the separation axis) of the polymeric separation medium, such that a multiplex analysis of two or more samples can be performed in the polymeric separation medium. For instance, a first sample may be subjected to IEF in a first IEF region, and a second sample may be subjected to IEF in a second IEF region. As such, the first and second samples can be subjected to IEF analysis at substantially the same time (e.g., in parallel). In some instances, two or more samples can be analyzed in each of the IEF regions in the polymeric separation medium. In some cases, each IEF region includes a pH gradient along the axis (separation axis) of the polymeric separation medium.

In certain embodiments, the polymeric separation medium includes a plurality of microwells in the polymeric separation medium. In some instances, the polymeric separation medium includes a substantially planar array of microwells in the polymeric separation medium. An "array of microwells" includes any two-dimensional or substantially two-dimensional arrangement of microwells. For example, a planar array of microwells may be arranged into one or more rows and/or columns of microwells.

In some instances, the plurality of microwells is arranged for parallel separations of sample components of interest along an axis (the separation axis) from each microwell. In these embodiments, multiplex separations can be performed, where sample components of interest at each microwell in the array of microwells are analyzed at substantially the same time (e.g., in parallel). As such, a sample can be provided in two or more of the microwells in the array of microwells (e.g., a sample in each of the microwells), and each sample can be analyzed at substantially the same time (e.g., in parallel). As described herein, the analysis can be an IEF analysis, such that each sample in the plurality of microwells is subjected to an IEF analysis.

In some cases, the polymeric separation medium includes an array of microwells arranged in two or more isoelectric focusing regions. For a multiplex analysis, the two or more IEF regions can be arranged in series along an axis (the separation axis) of the polymeric separation medium. As described above, the array of microwells can include an arrangement of microwells where the microwells are arranged in one or more rows and columns. For example, a "row" can be two or more microwells arranged along a line perpendicular to the separation axis of the polymeric separation medium, and a "column" can be two or more microwells arranged along a line parallel to the separation axis of the polymeric separation medium. In some cases, an IEF region is aligned with a row in the microwell array. Stated another way, the IEF region may be arranged perpendicular to the separation axis of the polymeric separation medium and may surround the microwells in one row of the microwell array. Where the polymeric separation medium includes two or more IEF regions, each IEF region may be associated with an individual row in the microwell array. As such, the polymeric separation medium may include two or more IEF regions arranged in series along the separation axis of the polymeric separation medium, where each IEF region is configured to perform IEF analysis for microwells in individual rows of the microwell array.

In certain embodiments, the device includes a cover (also referred to herein as a lid) configured to contact a top surface of the polymeric separation medium. In some instances, the cover is a polymeric gel cover that is composed of a polymeric gel. For example, the polymeric gel cover may include a polyacrylamide gel, an agarose gel, and the like. In some cases, the polymeric gel cover is a polyacrylamide gel.

In some instances, the polymeric gel cover includes a pH gradient. The pH gradient of the polymeric gel cover may be substantially aligned with the axis (the separation axis) of the polymeric separation medium. For example, the polymeric gel cover can include a pH gradient along an axis of the polymeric gel cover that is substantially parallel to the axis (separation axis) of the polymeric separation medium.

The polymeric gel cover may include a buffer. The buffer may be any convenient buffer suitable for the assays described herein, such as a buffer suitable for isoelectric focusing. In some instances, the buffer is a catholyte buffer, such as, but not limited to a sodium hydroxide buffer. In some instances, the buffer is an anolyte buffer, such as but not limited to, a phosphoric acid buffer. In certain embodiments, the polymeric gel cover includes a fluid-phase pH gradient. As such, in some instances, the polymeric gel cover includes a polybuffer, an ampholyte solution or an electrode-generated pH gradient.

Any other convenient buffer for gel electrophoresis may also be used as desired. For example, the buffer can be a Tris buffer, such as a Tris-glycine buffer (e.g., the buffer may include a mixture of Tris and glycine).

In certain instances, the polymeric gel cover includes a pH gradient. In some embodiments, the pH gradient is co-polymerized with the polymeric gel cover. In embodiments where the pH gradient is co-polymerized with the polymeric gel cover, the pH gradient may be substantially immobilized resulting in a polymeric gel cover having an immobilized pH gradient. In certain instances, the pH gradient includes a weak acid and/or a weak base (e.g., Immobilines), ampholytes, combinations thereof, and the like.

In certain embodiments, the polymeric gel cover includes two or more sub-regions. In some cases, the sub-regions of the polymeric gel cover are aligned perpendicular to the separation axis of the polymeric separation medium. In some instances, the polymeric gel cover includes a focusing sub-region. The sample to be analyzed may be applied to the polymeric separation medium in an area under the focusing sub-region of the polymeric gel cover. The polymeric gel cover may also include an acidic sub-region, which can be positioned on one side of the focusing sub-region. The polymeric gel cover may also include basic sub-region, which can be positioned on a side of the focusing sub-region opposite from the acidic sub-region. As such, the focusing sub-region is positioned between the acidic sub-region and the basic sub-region. The acidic sub-region may be on the same side of the polymeric gel cover as the positive electrode of the device. The basic sub-region may be on the same side of the polymeric gel cover as the negative electrode of the device. Thus, the acidic and basic sub-regions can form the pH gradient used in the IEF analysis.

In certain instances, the polymeric gel cover is configured to perform lysis of cells of a portion thereof (e.g., differential lysis of a sub-cellular compartment, as described above). For instance, the buffer of the polymeric gel cover may include a lysis reagent (e.g., a cell lysis reagent). In some cases, the buffer of the polymeric gel cover includes a lysis reagent, such as a detergent. In some cases, the detergent facilitates lysis of a cell or portion thereof as described above. For example, the detergent may be digitonin, Triton X-100, CHAPS, and the like. Combinations of detergents may also be included in the buffer of the polymeric gel cover.

In certain instances, the polymeric gel cover facilitates the transfer of one or more assay components (e.g., reagents) from the polymeric gel cover to the polymeric separation medium. In some cases, the assay components (e.g., reagents) are transferred from the polymeric gel cover to the polymeric separation medium by diffusion. For example, the polymeric gel cover may facilitate the transfer of a buffer and/or components contained therein from the polymeric gel cover to the polymeric separation medium. In some instances, the polymeric gel cover facilitates the transfer of a lysis reagent, such as a detergent as described above, from the polymeric gel cover to the polymeric separation medium. In this manner, lysis of a cell to be analyzed can be controlled by applying the cover to the polymeric separation medium at an appropriate time.

In certain embodiments, the polymeric gel cover contacts one or more electrodes configured to apply an electric field to the polymeric separation medium. For example, the polymeric gel cover, when applied to the surface of the polymeric separation medium, can contact the cathode. In addition, the polymeric gel cover, when applied to the surface of the polymeric separation medium, can contact the anode. In some cases, the polymeric gel cover, when applied to the surface of the polymeric separation medium, contacts the cathode and the anode. In these embodiments, the polymeric gel cover is configured to facilitate an electrophoretic separation (e.g., IEF) of sample components of interest in the polymeric separation medium. In some cases, the polymeric gel cover, when contacted to the surface of the polymeric separation medium completes an electrical circuit between the electrodes of the device. In some embodiments, the acidic sub-region of the polymeric gel cover contacts the cathode. In some embodiments, the basic sub-region of the polymeric gel cover contacts the anode.

In certain embodiments, the polymeric gel cover has dimensions in the range of 10 mm×10 mm to 200 mm×200 mm, including dimensions of 100 mm×100 mm or less, such as 50 mm×50 mm or less, for instance 25 mm×25 mm or less, or 10 mm×10 mm or less, or 5 mm×5 mm or less, for instance, 1 mm×1 mm or less. In some cases, the polymeric gel cover has a thickness ranging from 1 µm to 1000 µm, such as from 10 µm to 750 µm, or from 10 µm to 500 µm, or from 100 µm to 500 µm. In some cases, the polymeric gel cover has a thickness of 500 µm. In some embodiments, the polymeric gel cover has dimensions (length and width) that are substantially the same as the polymeric separation medium, such that when applied to a surface of the polymeric separation medium, the polymeric gel cover substantially covers the entire surface of the polymeric separation medium. In some instances, the polymeric gel cover has dimensions (length and width) greater than the corresponding dimensions of the polymeric separation medium, such that when applied to a surface of the polymeric separation medium, the edges of the polymeric gel cover extend beyond the edges of the polymeric separation medium. In some embodiments, the polymeric gel cover has a thickness greater than the thickness of the polymeric separation medium.

Polymeric Separation Medium

Additional aspects of the polymeric separation medium are described in more detail below. The polymeric separation medium may be configured to separate constituents of a sample from each other. In some cases, the separation medium is configured to separate constituents in a sample based on the physical properties of the constituents. For example, the separation medium may be configured to separate the constituents in the sample based on the molecular mass, size, charge (e.g., charge to mass ratio), isoelectric point, affinity interactions, etc. of the constituents.

In certain instances, the separation medium is configured to separate the components in the sample based on their size and/or charge. The separation medium may be configured to separate the constituents in the sample into distinct detectable bands of constituents. By "band" is meant a distinct detectable region where the concentration of a constituent is significantly higher than the surrounding area of the separation medium. Each band of constituent may include a single constituent or several constituents, where each constituent in a single band of constituents has substantially similar physical properties, as described above. For example, each band of constituent may include a single constituent or several constituents, where each constituent in a single band of constituents has a substantially similar isoelectric point.

In certain embodiments, the separation medium is configured to separate the constituents in a sample as the sample traverses the separation medium. In some cases, the separation medium is configured to separate the constituents in the sample as the sample flows through the separation medium. Aspects of the separation medium include that the separation medium has a separation axis (e.g., a directional separation axis), or in other cases a plurality of directional separation axes. In some instances, the directional separation axis is oriented in the direction the sample travels as the sample traverses the separation medium.

Polymeric Separation Medium with an Array of Microwells

In certain embodiments, the polymeric separation medium includes an array of microwells. In these embodiments, the directional separation axis is aligned with the length (or the width) of the separation medium. For instance, the directional separation axis may be substantially parallel to the length (or the width) of the separation medium. In some embodiments, the separation medium is square or rectangular in shape and the directional axis of the separation medium may be aligned with the length (or width) of the separation medium. In these embodiments, the sample traverses the separation medium along its length (or width). In some cases, where the sample traverses the length of the separation medium, the length of the separation medium is greater than the width of the separation medium, such as 2 times, 3 times, 4 times, 5 times, 10 times, 25 times, 50 times, 75 times, 100 times, 125 times, 150 times, 175 times, or 200 times or more the width of the separation medium. In some instances, a longer separation axis may facilitate an increase in resolution between bands of different analytes in the sample.

The microwells in the array of microwells may be individually addressable. A microwell is "addressable" when the array includes multiple microwells positioned at particular predetermined locations (e.g., "addresses") in the array. Microwells may be separated by intervening spaces. An array of microwells may include one or more, including two or more, four or more, eight or more, 10 or more, 25 or more, 50 or more, 100 or more, 200 or more, 300 or more, 400 or more, 500 or more, 750 or more, 1000 or more, 1500 or more, 2000 or more, 2500 or more, 3000 or more, 3500 or more, 4000 or more, 4500 or more, 5000 or more, 5500 or more, 6000 or more, 6500 or more, 7000 or more, 7500 or more, 8000 or more, 8500 or more, 9000 or more, 9500 or more, 10,000 or more, or 25,000 or more, or 50,000 or more, or 75,000 or more, or 100,000 or more microwells in a polymeric separation medium. In some cases, an array of microwells may include 10 or more microwells. Each polymeric separation medium may include one or more arrays of microwells, for example, 1 or more, 2 or more, 3 or more, 4 or more, 5 or more, 6 or more, 7 or more, 8 or more, 9 or more, 10 or more, 12 or more, 14 or more, 16 or more, 18 or more, 20 or more, 25 or more, 30 or more, 35 or more, 40 or more, 45 or more, 50 or more, 75 or more, or 100 or more arrays or microwells. In some cases, the polymeric separation medium includes 10 or more arrays of microwells. Depending upon the use, any or all of the microwells may be the same or different from one another and each may be configured to contain distinct samples or sample constituents. Aspects of individual microwells are described in more detail below, but may be applied to any or all of the microwells in the array of microwells.

In certain embodiments, the polymeric separation medium includes an array of microwells as described above. The array of microwells may be arranged such that each microwell has an open end provided on a surface of the separation medium (e.g., on a top surface of the separation medium). In these embodiments, the interior volume of each microwell may extend from the open end of the microwell on the surface of the polymeric separation medium into the polymeric separation medium. In certain embodiments, the open end of the microwell (and thus the interior volume of the microwell) is in fluid communication with a fluid provided on the surface of the separation medium (e.g., buffer, sample, etc.). In some instances, the bottom (i.e., closed end) of the microwell is formed by the solid support supporting the polymeric separation medium, e.g., in embodiments where the interior volume of the microwell extends all the way through the separation medium, such as where the depth of the microwell equals the thickness of the polymeric separation medium. In other instances, the bottom (i.e., closed end) of the microwell is formed by the polymeric separation medium, e.g., in embodiments where the interior volume of the microwell does not extend all the way through the separation medium, such as where the depth of the microwell is less than the thickness of the polymeric separation medium.

In certain embodiments, the microwell is configured such that an axis of the microwell from the closed end to the open end of the microwell is substantially perpendicular to the surface of the separation medium (e.g., the surface of the separation medium having the open ends of the microwells). In certain embodiments, the walls (e.g., the side walls) of the microwell are formed by the polymeric separation medium, such as where the interior volume of the microwell extends into the polymeric separation medium and is surrounded by the polymeric separation medium.

Additional Aspects of Microwells

In certain embodiments, the microwell has an interior volume with a defined shape. For example, the interior volume of the microwell may have a shape of a cylinder, a cube, a rectangular cuboid, a frustum (e.g., a square frustum, a rectangular frustum, a conical frustum, etc.), and the like.

In certain embodiments, the open end of the microwell has dimensions greater than the closed end of the microwell. For instance, the open end of the microwell may have dimensions (e.g., width and/or length, or diameter, depending on the shape of the microwell) that are 1.1 times greater than the dimensions of the closed end of the microwell, such as 1.2 times, or 1.3 times, or 1.4 times, or 1.5 times, or 1.6 times, or 1.7 times, or 1.8 times, or 1.9 times, or 2 times the dimensions of the closed end of the microwell. In other embodiments, the open end of the microwell and the closed end of the microwell have the same dimensions.

A "microwell" is a well that has dimensions in the micrometer scale. While the dimensions may vary, in some instances, the open end of the microwell has a width of 100 µm or less, such as 90 µm or less, or 80 µm or less, or 70 µm or less, or 60 µm or less, or 50 µm or less, or 40 µm or less, or 30 µm or less, or 20 µm or less, or 10 µm or less. For example, the open end of the microwell may have a width ranging from 10 µm to 100 µm, such as 10 µm to 90 µm, or 10 µm to 80 µm, or 10 µm to 70 µm, or 10 µm to 60 µm, or 10 µm to 50 µm, or 10 µm to 40 µm, or 10 µm to 30 µm, or 10 µm to 20 µm. In certain embodiments, the microwell is dimensioned to accommodate a single cell, such that a single cell is in an individual microwell. For example, the microwell may have an open end dimensioned to accommodate a single cell in the microwell (e.g., a single cell in an individual microwell).

In some cases, the closed end of the microwell has a width of 100 µm or less, such as 90 µm or less, or 80 µm or less, or 70 µm or less, or 60 µm or less, or 50 µm or less, or 40 µm or less, or 30 µm or less, or 20 µm or less, or 10 µm or less. For example, the closed end of the microwell may have a width ranging from 10 µm to 100 µm, such as 10 µm to 90 µm, or 10 µm to 80 µm, or 10 µm to 70 µm, or 10 µm to 60 µm, or 10 µm to 50 µm, or 10 µm to 40 µm, or 10 µm to 30 µm, or 10 µm to 20 µm. In certain embodiments, the microwell may have a closed end dimensioned to accommodate a single cell in the microwell (e.g., a single cell in an individual microwell).

In certain embodiments, the microwell has a depth (e.g., the distance from the open end to the closed end of the microwell) of 100 µm or less, such as 90 µm or less, or 80 µm or less, or 70 µm or less, or 60 µm or less, or 50 µm or less, or 40 µm or less, or 30 µm or less, or 20 µm or less, or 10 µm or less. For example, the microwell may have a depth ranging from 10 µm to 100 µm, such as 10 µm to 90 µm, or 10 µm to 80 µm, or 10 µm to 70 µm, or 10 µm to 60 µm, or 20 µm to 60 µm, or 20 µm to 50 µm, or 30 µm to 50 µm. In certain embodiments, the microwell may have a depth dimensioned to accommodate a single cell in the microwell (e.g., a single cell in an individual microwell).

The microwells in the polymeric separation medium may be substantially uniform. For example, the shape and size of the microwells in the separation medium may be substantially uniform. In other embodiments, the microwells may be different, such as having a different shape, a different size, combinations thereof, and the like. A separation medium that includes different microwells may facilitate the analysis of different sample constituents at the same time. For instance, microwells that have different shapes and/or sizes may preferentially capture different shaped or sized sample components (e.g., different shaped or sized cells in the sample).

Additional Aspects of the Separation Medium

In certain embodiments, the separation medium includes a polymer, such as a polymeric gel. The polymeric gel may be a gel suitable for gel electrophoresis. The polymeric gel may include, but is not limited to, a polyacrylamide gel (e.g., methacrylamide gel), an agarose gel, and the like. The resolution of the separation medium may depend on various factors, such as, but not limited to, pore size, total polymer content (e.g., total acrylamide content), concentration of cross-linker, applied electric field, assay time, and the like. For instance, the resolution of the separation medium may depend on the pore size of the separation medium. In some cases, the pore size depends on the total polymer content of the separation medium and/or the concentration of cross-linker in the separation medium.

In certain embodiments, the separation medium is configured to be formed from precursor moieties. For example, the separation medium may be a gel (e.g., a polyacrylamide gel) formed form gel precursors (e.g., polyacrylamide gel precursors, such as polyacrylamide gel monomers). The precursor moieties may be configured to react to form the separation medium. For instance, the gel precursors may be configured to react with each other to form the polyacrylamide gel separation medium. The reaction between the gel precursors may be activated by any suitable protocol, such as, but not limited to, chemical activation, light activation, etc. In some embodiments, the gel precursors are configured to be activated chemically, for example by contacting the gel precursors with an activation agent, such as, but not limited to, a peroxide. In some embodiments, the gel precursors are configured to be activated by light (i.e., photo-activated), for instance by contacting the gel precursors with light. The light may be of any wavelength suitable for activating the formation of the separation medium, and in some instances may have a wavelength associated with blue light in the visible spectrum. For example, the light used to activate formation of the separation medium may have a wavelength ranging from 400 nm to 500 nm, such as from 410 nm to 490 nm, including from 420 nm to 480 nm, or from 430 nm to 480 nm, or from 440 nm to 480 nm, or from 450 nm to 480 nm, or from 460 nm to 480 nm, or from 465 nm to 475 nm. In certain cases, the light used to activate formation of the separation medium has a wavelength ranging from 465 to 475 nm. In some instances, the light used to activate formation of the separation medium has a wavelength of 470 nm.

In some instances, the separation medium has dimensions in the range of 10 mm×10 mm to 200 mm×200 mm, including dimensions of 100 mm×100 mm or less, such as 50 mm×50 mm or less, for instance 25 mm×25 mm or less, or 10 mm×10 mm or less, or 5 mm×5 mm or less, for instance, 1 mm×1 mm or less. In some cases, the separation medium has a thickness ranging from 1 µm to 100 µm, such as from 10 µm to 75 µm, or from 10 µm to 50 µm, or from 20 µm to 50 µm. In some cases, the separation medium has a thickness of 50 µm.

In certain embodiments, the separation medium is configured to separate the constituents in the sample based on the isoelectric point (pI) of the constituents (e.g., isoelectric focusing, IEF). In some cases, the separation medium includes a polymeric gel as described above. For example, the polymeric gel may include a polyacrylamide gel, an agarose gel, and the like. In certain instances, the polymeric gel includes a pH gradient, which, in some embodiments, is co-polymerized with the polymeric gel. In embodiments where the pH gradient is co-polymerized with the polymeric gel, the pH gradient may be substantially immobilized resulting in a separation medium having an immobilized pH gradient. In certain instances, the pH gradient includes a weak acid or a weak base (e.g., Immobilines), ampholytes, combinations thereof, and the like. Additional aspects of devices configured for isoelectric focusing are described in WO 2012/177940, and U.S. Application Publication No. 2014/0332382, the disclosures of each of which are incorporated herein by reference.

In certain embodiments, the separation medium is configured to separate constituents in a sample based on size. For example, in some cases, the separation medium includes a polymeric gel having a pore size gradient. The pore size gradient may decrease along the directional axis of the separation medium. For example, the pore size gradient may have a pore size that decreases along the directional axis of the separation medium, such that a sample traversing the separation medium encounters progressively smaller and smaller pore sizes in the separation medium. As constituents in the sample traverse the pore size gradient, the constituents in the sample may be separated based on size. For example, larger constituents in the sample may be retained in the separation medium more readily than smaller constituents, which are able to traverse greater distances through the decreasing pore size gradient.

In some cases, the pore size of the separation medium depends on the total polymer content of the separation medium and/or the concentration of crosslinker in the separation medium. In certain instances, the separation medium pore size sufficient to resolve analytes with molecular mass differences of 50,000 Da or less, or 25,000 Da or less, or 10,000 Da or less, such as 7,000 Da or less, including 5,000 Da or less, or 2,000 Da or less, or 1,000 Da or less, for example 500 Da or less, or 100 Da or less. In some cases, the separation medium may include a polyacrylamide gel that has a pore size that depends on the total acrylamide content, T (T=total concentration of acrylamide and bisacrylamide monomer), where the total acrylamide content, T, ranges from 1% to 20%, such as from 3% to 15%, including from 5% to 10%. In some instances, the separation medium has pore size defined by a total acrylamide content of 7%. In certain cases, the separation medium has a pore size defined by a total acrylamide content of 6%. In certain embodiments, the separation medium includes a polyacrylamide gel that has a crosslinker content, C (% w/v), ranging from 1% to 10%, such as from 2% to 7%, including from 2% to 5%. In some instances, the separation medium has a total crosslinker content of about 3%.

In certain embodiments, the separation medium is configured to covalently bond to the constituents of interest. The covalent bond may be formed upon application of an applied stimulus. For example, the applied stimulus may include electromagnetic radiation, such as light. In some cases, the light is ultraviolet (UV) light. In some instances, the light used to covalently bond the constituents of interest to the separation medium has a wavelength ranging from 10 nm to 400 nm, such as from 50 nm to 400 nm, including from 100 nm to 400 nm, or from 150 nm to 400 nm, or from 200 nm to 400 nm, or from 250 nm to 400 nm, or from 300 nm to 400 nm, or form 325 nm to 375 nm, or from 350 nm to 365 nm. In certain cases, the light has a wavelength ranging from 350 to 365 nm.

In certain embodiments, the light used to covalently bond the constituents of interest to the separation medium has a wavelength different from the light used to activate formation of the separation medium. For example, as described above, the light used to activate formation of the separation medium may have a wavelength of blue light in the visible spectrum. As described above, the light used to covalently bond the constituents of interest to the separation medium may have a wavelength of UV light. As such, in certain embodiments, the separation medium is configured to be formed upon application of a first wavelength of light, and configured to covalently bond the constituents of interest upon application of a second wavelength of light. The first and second wavelengths of light may be blue light and UV light, respectively, as described above.

In some cases, the separation medium includes functional groups that covalently bond to the one or more constituents of interest. For example, the constituents of interest may be an analyte of interest, such as, but not limited to, a protein, a peptide, and the like. The functional groups may include functional groups that are activated upon application of an applied stimulus, such as electromagnetic radiation (e.g., light) as described above. As such, in certain instances, the functional groups are light-activatable functional groups. Upon application of light, the light-activatable functional groups may form a reactive species capable of forming covalent bonds, such as a radical alkyl intermediate. Examples of functional groups that may covalently bond to the constituents of interest upon application of an applied stimulus (e.g., light) include, but are not limited to, benzophenone groups, and the like. Once activated by the applied stimulus, the functional group may bond to the constituent of interest (e.g., protein or peptide) forming a covalent bond between the separation medium and the constituent of interest. For example, the functional group may form a carbon-carbon bond between the functional group and the constituent of interest.

In some embodiments, the functional groups are co-polymerized with the separation medium. For example, the functional groups may include a linker group that is attached to the separation medium. The functional group may be bound to the linker group at a first end of the linker group, and a second end of the linker group may be bound to the separation medium, thereby indirectly bonding the functional group to the separation medium. In some instances, the second end of the linker group, which is bound to the separation medium, includes a co-monomer, such as, but not limited to, an acrylamide co-monomer, and the like. In some embodiments, the second end of the linker group includes a methacrylamide co-monomer. In certain cases, the functional group is a benzophenone functional group and the linker group includes a co-monomer, such as an acrylamide co-monomer. For example, the functional group (including the linker group) may be N-(3-[(4-benzoylphenyl)formamido]propyl) methacrylamide (also known as BPMA or BPMAC) or 3-benzoyl-N-[3-(2-methyl-acryloylamino)-propyl]-benzamide (BP-APMA); the structures of each of which are shown below. As described above, the linker group may have the functional group attached at a first end, and the second end of the linker group bound to the polymeric medium. In some instances, the linker group includes a spacer group, such as a spacer group between the first end and the second end of the linker group (e.g., a spacer group in the middle portion of the linker group between the functional group and the co-monomer). In some cases, the spacer group of the linker group between the first and second ends of the linker group includes an aliphatic group, such as, but not limited to, a $C_{1-10}$ alkyl group. In certain cases, the spacer group of the linker group includes a lower alkyl group (e.g., a $C_{1-6}$ alkyl group, or a $C_{1-5}$ alkyl group, or a $C_{1-4}$ alkyl group, or a $C_{1-3}$ alkyl group, or a $C_{1-2}$ alkyl group). For instance, the spacer group of the linker group may include a propyl group.

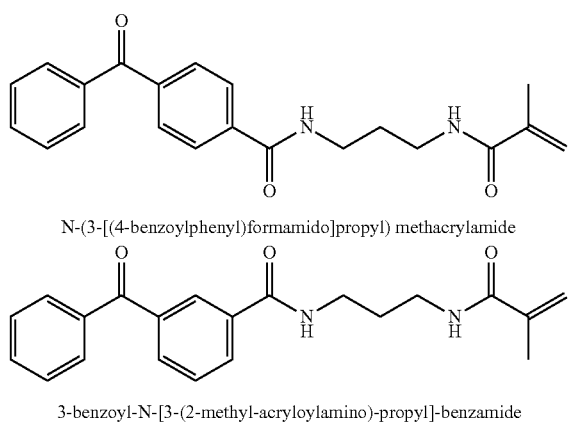

N-(3-[(4-benzoylphenyl)formamido]propyl) methacrylamide 3-benzoyl-N-[3-(2-methyl-acryloylamino)-propyl]-benzamide An embodiment of the functional groups that may be co-polymerized with the separation medium is a cross-linked polyacrylamide gel separation medium that includes photoactive benzophenone functional groups. The photoactive benzophenone groups may be activated by light to form covalent bonds to constituents of interest (e.g., proteins in the separated sample).

In certain embodiments, the separation medium is configured to bind to constituents in a sample at a minimum capture efficiency. The capture efficiency is the percentage of constituents in the sample that are bound by the separation medium. In some instances, the capture efficiency, $\eta$, is the ratio of fluorescence measured after gradient washout ($AFU_w$) to the fluorescence during focusing ($AFU_f$), corrected by a factor $\epsilon$ to account for the anticipated influence of pH on the species fluorescence signal. In certain embodiments, the separation medium is configured to have a capture efficiency of 1% or more, such as 5% or more, including 10% or more, or 20% or more, or 30% or more, or 40% or more, or 50% or more, or 60% or more, or 70% or more, or 80% or more, or 90% or more, or 95% or more. In some instances, the separation medium has a capture efficiency of 75% or more. In some instances, the separation medium has a capture efficiency of 90% or more. In some instances, the separation medium has a capture efficiency of 95% or more.

Additional aspects of the polymeric separation medium are described in U.S. Application Publication No. 2011/0177618, filed May 18, 2010, U.S. Application Publication No. 2012/0329040, filed Jun. 21, 2012, and WO 2014/138475, filed Mar. 6, 2014, the disclosures of each of which are incorporated herein by reference.

Methods

Embodiments of the methods are directed to separating constituents of a sample, such as constituents of a cell (e.g., cellular components). Aspects of the method include contacting a sample, such as a sample that includes a cell, with a polymeric separation medium as described above. The method also includes applying an electric field to the polymeric separation medium in a manner sufficient to move at least some of the components of interest in the polymeric separation medium to produce separated components of interest in the polymeric separation medium. In some cases, the electric field is applied in a manner sufficient to perform multiplex separations in the polymeric separation medium as described above. For example, the electric field can be applied in a manner sufficient to perform multiplex isoelectric focusing separations in the polymeric separation medium as described above.

The polymeric separation medium may include functional groups that covalently bond one or more components of interest (e.g., cellular components of interest) to the separation medium upon application of an applied stimulus, as described in more detail below. Additional aspects of the method include contacting the polymeric separation medium with a buffer sufficient to differentially lyse a cell and/or a sub-cellular compartment of the cell to produce a set of cellular components. These and other aspects of the methods according to embodiments of the present disclosure are described in the following sections.

As described above, methods of the present disclosure include contacting a sample, such as a sample that includes a cell, to a polymeric separation medium. In some instances, the polymeric separation medium includes a microwell or a plurality of microwells (e.g., an array of microwells). In certain embodiments, the sample may be contacted to the polymeric separation medium such that constituents of the sample (e.g., cells) are positioned in one or more microwells in the polymeric separation medium. For example, the sample may be applied to a surface of the separation medium and the constituents in the sample (e.g., cells) may be allowed to passively settle into the microwells, e.g., passively settle out of solution due to gravity. In some instances, as described above, the polymeric separation medium includes a planar array of microwells, and in some cases the sample constituents may be positioned in the planar array of microwells by applying the sample to the separation medium and allowing the constituents in the sample to passively settle into the planar array of microwells. In certain embodiments, the array of microwells may include microwells that have substantially uniform, or in other embodiments non-uniform, shapes and/or sizes as described above. In embodiments, where the polymeric separation medium includes non-uniform microwells, the method may include size selected settling using different shaped and/or sized microwells. For example, a sample may be applied to the separation medium and sample constituents (e.g., cells) may preferentially settle into certain corresponding microwells depending on the shape and/or size of the cells and microwells. Cells that do not settle into microwells may be washed away from the surface of the separation medium.

As described above, in certain embodiments a microwell of the polymeric separation medium is dimensioned to accommodate a single cell in the microwell, e.g., an individual microwell is dimensioned to accommodate a single cell. As such, embodiments of methods of the present disclosure may include contacting a sample that includes a cell (or a plurality of cells) to a microwell such that an individual microwell contains a single cell. In some embodiments, each microwell of the polymeric separation medium is dimensioned such that a single cell will fit in each individual microwell. Thus, a sample containing a plurality of cells may be contacted to a polymeric separation medium that includes an array of a plurality of microwells, such that individual microwells of the polymeric separation medium may contain a single cell from the sample. Depending on factors, such as how fast the cells passively settle into the mirowells, one or more individual microwells of the polymeric separation medium may contain a single cell.

As described above, the method includes contacting the polymeric separation medium with a buffer sufficient to differentially lyse a cell and/or a sub-cellular compartment of the cell to produce a set of cellular components. By "differentially lyse" or "differential lysis" is meant that the buffer is capable of selectively lysing a specific sub-cellular compartment of the cell without causing significant lysis of other sub-cellular compartment(s) of the cell. For instance, a buffer may be configured to lyse a first sub-cellular compartment, such as the cell membrane, without causing significant lysis of other sub-cellular compartments, such as the nuclear membrane. In some cases, the buffer is configured to selectively lyse the cell membrane such that cytosol is released from the cell without causing significant lysis of other sub-cellular compartments, such as the nuclear membrane. The released cellular components (e.g., cytosol and cellular components contained therein) of the first sub-cellular compartment may then be analyzed (e.g., separated) in the polymeric separation medium. For example, as described herein, the method may include applying an electric field to the polymeric separation medium in a manner sufficient to move at least some of the first set of cellular components (e.g., cytosol components) into the polymeric separation medium to produce a first set of separated cellular components (e.g., a set of separated cytosol components) in the polymeric separation medium. In certain embodiments, the same is buffer sufficient for differentially lysing a sub-cellular compartment and for performing the separation in the polymeric separation medium. Stated another way, the same buffer may be used to lyse the first sub-cellular compartment and also may be used for the electrophoretic separation of the first set of cellular components (e.g., cytosol components) in the polymeric separation medium.

In certain embodiments, the method includes contacting the polymeric separation medium with a second buffer sufficient to differentially lyse a second sub-cellular compartment of the cell to produce a second set of cellular components. For instance, a second buffer may be configured to lyse a second sub-cellular compartment, such as the nuclear membrane. In certain embodiments, the second buffer does not cause significant lysis of other sub-cellular compartments, such as mitochondria, plastids, or other organelles. In some cases, the second buffer is configured to selectively lyse the nuclear membrane such that the contents of the cell nucleus are released from the nucleus without causing significant lysis of other sub-cellular compartments, such as mitochondria, plastids, or other organelles. The released cellular components of the second sub-cellular compartment (e.g., nucleus) may then by analyzed (e.g., separated) in the polymeric separation medium. For example, as described herein, the method may include applying an electric field to the polymeric separation medium in a manner sufficient to move at least some of the second set of cellular components (e.g., nuclear components) into the polymeric separation medium to produce a second set of separated cellular components (e.g., a set of separated nuclear components) in the polymeric separation medium. In certain embodiments, the same is buffer sufficient for differentially lysing a sub-cellular compartment and for performing the separation in the polymeric separation medium. Stated another way, the same buffer may be used to lyse the second sub-cellular compartment and may also be used for the electrophoretic separation of the second set of cellular components (e.g., nuclear components) in the polymeric separation medium. In certain cases, the second buffer is different from the first buffer described above.

In certain embodiments, the method includes further lysis of additional sub-cellular compartments in series, such that cellular components of the additional sub-cellular compartments may be analyzed (e.g., separated) in series. The other sub-cellular compartments that may be differentially lysed and analyzed using the methods and systems of the present disclosure may include, but are not limited to mitochondria, plastids, and other organelles. In certain embodiments, each set of cellular components is separated in the polymeric separation medium in a different direction in the polymeric separation medium.

In certain embodiments, contacting the polymeric separation medium with a buffer includes contacting a surface (e.g., a top surface) of the polymeric separation medium with a cover (e.g., a polymeric gel cover as described herein) that includes the buffer. The cover may be configured to act as a carrier for the buffer. For example, the cover may include a polymeric gel that includes the buffer. The cover may be applied as a layer on the surface (e.g., top surface) of the polymeric separation medium, for example as a cover or lid on the surface of the polymeric separation medium. As such, in some instances, the method includes contacting a surface of the polymeric separation medium (e.g., a top surface) with a cover (e.g., a polymeric gel cover) that includes the buffer. The cover may be applied to the surface of the polymeric separation medium after contacting the polymeric separation medium with the sample (e.g., after a cell from the sample becomes positioned in a microwell). In some embodiments, the cover is applied to the surface of the polymeric separation medium such that substantially the entire surface of the polymeric separation medium in in contact with the cover. The cover may be in fluidic communication with the surface of the polymeric separation medium. For instance, the cover may be in fluidic communication with the surface of the polymeric separation medium such that buffer from the cover may diffuse from the cover into the polymeric separation medium and/or into the microwells of the polymeric separation medium. As described above, the buffer may lyse (e.g., differentially lyse) a sub-cellular compartment of a cell in the microwell to produce a set of cellular components that may be analyzed (e.g., separated) in the polymeric separation medium. As described herein, the buffer may be configured as a pH gradient sufficient for performing IEF analysis in the polymeric separation medium. In addition, as described herein, the buffer may include a lysis reagent, which may diffuse from the cover to the polymeric separation medium for lysis of the sample cells to be analyzed in the polymeric separation medium.

In certain embodiments, the polymeric gel cover contacts one or more electrodes configured to apply an electric field to the polymeric separation medium. In some instances, the cover both delivers reagents to the polymeric separation medium and completes an electrical circuit on the device (e.g., an electrical circuit used for applying an electric field to the polymeric separation medium). In some cases, a cover that contacts both the polymeric separation medium and the electrodes facilitates a rapid transition between assay steps (e.g., lysis step to separation step, such as IEF), which in turn may facilitate a reduction in diffusional losses. In certain instances, due to a low starting protein mass in single-cell protein measurements, minimizing losses throughout the assay may facilitate maintaining concentrations of the analytes to be detected above the lower detection limit of the assay.

Other methods of positioning sample constituents into a microwell are also possible. For example, sample constituents may be positioned in one or more microwells of the polymeric separation medium by one or more or the following: applying an electric field to the sample; applying a density gradient, physically positioning the sample constituents into the microwell using a positioning device, such as but not limited to a micropipetter, a nozzle, optical tweezers, and the like; applying a pressure force; applying a magnetic force (e.g., where the sample constituents of interest are bound to magnetic beads); convection flow; size selected settling using different sized microwells; positioning droplets of sample containing cells or cell lysates into microwells; applying a centrifugal force; angling, moving or shaking the polymeric separation medium; combinations thereof, and the like.

In certain embodiments, the sample and/or sample components may be manipulated prior to or after positioning the sample components into the microwells. For example, the sample and/or sample components may be manipulated prior to positioning into the microwells. In other embodiments, the sample and/or sample components may be manipulated after positioning into the microwells. In some instances, the sample may include one or more cells of interest. As such, the method may include manipulating the cell to produce cellular components. For instance, the method may include lysing the cell to release cellular components from the cell. In some instances, the cellular components may be produced by differential lysis of specific cellular compartments. For example, differential lysis of specific cellular compartments may facilitate the individual analysis of the contents of different cellular compartments. In certain cases, the cellular components may be produced from the cell by treating the cell such that the cell releases the cellular component of interest (e.g., without lysing the cell). For example, the cell may be treated (e.g., incubated in a warmer or cooler temperature, treated with an active agent, etc.) such that the cell secretes one or more cellular components of interest. In certain embodiments, the cell may be encapsulated in a sample droplet and the sample droplet may be treated as described above such that cellular components are produced. The droplets may be positioned in the microwells and then treated as described above, or the droplets may be treated prior to positioning the droplets in the microwells.

Once the sample constituents are positioned in the microwells, the method may further include separating the sample constituents in the separation medium to produce separated sample constituents. In some cases, the separated constituents are produced by gel electrophoresis as the sample traverses from the microwell through a wall of the microwell and through the separation medium. In other cases, the separated sample is produced by isoelectric focusing in the separation medium. The separated sample may include distinct detectable bands of constituents (e.g., analytes), where each band includes one or more constituents that have substantially similar properties, such as molecular mass, size, charge (e.g., charge to mass ratio), isoelectric point, affinity interaction, etc. depending on the type of separation performed.

For example, in embodiments where the polymeric separation medium includes an array of microwells as described herein, the method may include separating the sample constituents by applying an electric field across the polymeric separation medium in a manner sufficient to move at least some of the sample constituents through a side wall of the microwell and into the polymeric separation medium to produce separated sample constituents in the polymeric separation medium as the sample constituents traverse through the separation medium.

In certain embodiments, the device is configured to subject a sample to an electric field. The electric field may facilitate the movement of the sample through the device (e.g., electrokinetic transfer of the sample from one region of the device to another region of the device). The electric field may also facilitate the separation of the analytes in the sample by electrophoresis (e.g., polyacrylamide gel electrophoresis (PAGE), SDS-PAGE, isoelectric focusing, etc.), as described above.

For instance, separating the analytes in a sample may include applying an electric field configured to direct the analytes in the sample through the separation medium of the device. The electric field may be configured to facilitate the separation of the analytes in a sample based on the physical properties of the analytes. For example, the electric field may be configured to facilitate the separation of the analytes in the sample based on the molecular mass, size, charge (e.g., charge to mass ratio), isoelectric point, etc. of the analytes. In certain instances, the electric field is configured to facilitate the separation of the analytes in the sample based on the molecular mass of the analytes. In other embodiments, the electric field is configured to facilitate separation of the analytes in the sample based on the isoelectric point (pI) of the analytes.

In some instances, the methods further include immobilizing the separated sample components in the polymeric separation medium. Immobilizing may be accomplished using any convenient approach, e.g., covalently bonding the separated sample components to the polymeric separation medium, such as by exposing the polymeric separation medium to ultra-violet (UV) light. For example, after the constituents in the sample have been separated, the method may further include applying a stimulus to the separation medium to covalently bond the constituents to the separation medium. In some cases, the applying the stimulus includes applying electromagnetic radiation to the separation medium. For instance, the method may include exposing the separation medium to light, such as, but not limited to, visible light, UV light, infrared light, etc. In certain cases, the method includes applying light (e.g., UV light) to the separation medium to covalently bond the constituents to the separation medium.

As such, in certain embodiments, the method includes immobilizing the set of separated cellular components in the polymeric separation medium as described above. The set of separated cellular components may be the set of cellular components produced by differential lysis of a sub-cellular compartment (e.g., cytosol) as described above. In some instances, following immobilization of a first set of cellular components in the polymeric separation medium, the polymeric separation medium is contacted with a second buffer sufficient to differentially lyse a second sub-cellular compartment of the cell to produce a second set of cellular components, as described above. The second set of cellular components may be analyzed (e.g., separated) in the polymeric separation medium as described above. In some cases, the method further includes immobilizing the second set of separated cellular components in the polymeric separation medium. The second set of separated cellular components may be the set of cellular components produced by differential lysis of a sub-cellular compartment (e.g., nucleus) as described above.

In certain embodiments, the light used to covalently bond the constituents of interest to the separation medium has a wavelength different from the light used to activate formation of the separation medium. For example, as described herein, the light used to activate formation of the separation medium may have a wavelength of blue light in the visible spectrum. As described above, the light used to covalently bond the constituents of interest to the separation medium may have a wavelength of UV light. As such, in certain embodiments, the method includes exposing the separation medium to a first wavelength of light to form the separation medium, and exposing the separation medium to a second wavelength of light to covalently bond the constituents of interest to the separation medium. The first and second wavelengths of light may be blue light and UV light, respectively, as described herein.

In certain embodiments, the method includes determining whether an analyte of interest is present in a sample, e.g., determining the presence or absence of one or more analytes of interest in a sample. In some instances, the devices are configured to detect the presence of one or more analytes in a sample. In certain embodiments of the methods, the presence of one or more analytes in the sample may be determined qualitatively or quantitatively. Qualitative determination includes determinations in which a simple yes/no result with respect to the presence of an analyte in the sample is provided to a user. Quantitative determination includes both semi-quantitative determinations in which a rough scale result, e.g., low, medium, high, is provided to a user regarding the amount of analyte in the sample and fine scale results in which a measurement of the concentration of the analyte is provided to the user.

In certain embodiments, the method includes detecting an analyte of interest bound to the separation medium. Detectable binding of an analyte of interest to the separation medium indicates the presence of the analyte of interest in the sample. In some instances, detecting the analyte of interest includes contacting the analyte of interest with a label configured to specifically bind to the analyte of interest, e.g., as may be present in an analyte detection reagent. The analyte detection reagent can be any molecule that specifically binds to a protein or nucleic acid sequence or biomacromolecule that is being targeted (e.g., the analyte of interest). Depending on the nature of the analyte, the analyte detection reagent can be, but is not limited to: single strands of DNA complementary to a unique region of the target DNA or RNA sequence for the detection of nucleic acids; antibodies against an epitope of a peptidic analyte for the detection of proteins and peptides; or any recognition molecule, such as a member of a specific binding pair. For example, suitable specific binding pairs include, but are not limited to: a member of a receptor/ligand pair; a ligand-binding portion of a receptor; a member of an antibody/antigen pair; an antigen-binding fragment of an antibody; a hapten; a member of a lectin/carbohydrate pair; a member of an enzyme/substrate pair; biotin/avidin; biotin/streptavidin; digoxin/antidigoxin; a member of a DNA or RNA aptamer binding pair; a member of a peptide aptamer binding pair; and the like. In certain embodiments, the analyte detection reagent includes an antibody. The antibody may specifically bind to the analyte of interest.

In certain embodiments, the analyte detection reagent includes a detectable label. Detectable labels include any convenient label that may be detected using the methods and systems, and may include, but are not limited to, fluorescent labels, colorimetric labels, chemiluminescent labels, multi-color reagents, enzyme-linked reagents, avidin-streptavidin associated detection reagents, radiolabels, gold particles, magnetic labels, mass labels (e.g., mass tags configured to be detectable by a mass cytometry device), and the like. In certain embodiments, the analyte detection reagent includes an antibody associated with a detectable label. For example, the analyte detection reagent may include a labeled antibody (e.g., a fluorescently labeled antibody) that specifically binds to the analyte of interest. As such, the method may include detecting the labeled analyte of interest. In other embodiments, mass spectrometry may be used to detect an analyte of interest.

As described above, detecting the analyte of interest includes contacting the analyte of interest with an analyte detection reagent (e.g., a label) configured to specifically bind to the analyte of interest (e.g., an antibody that specifically binds to the analyte of interest). For example, contacting the analyte of interest with an analyte detection reagent may include applying a solution of analyte detection reagent to the polymeric separation medium. The analyte detection reagent may be contacted to any surface of the polymeric separation medium, such as the top or one or more sides of the polymeric separation medium. In some cases, the analyte detection reagent may be moved through the polymeric separation medium such that the analyte detection reagent contacts analytes of interest immobilized within the polymeric separation medium. For instance, the analyte detection reagent may be moved through the polymeric separation medium by applying an electric field to the polymeric separation medium, applying a pressure, applying a centrifugal force, passive diffusion, and the like.

In certain embodiments, detecting the analyte of interest includes contacting the analyte of interest with a primary label that specifically binds to the analyte of interest. In certain embodiments, the method includes enhancing the detectable signal from the labeled analyte of interest. For instance, enhancing the detectable signal from the labeled analyte of interest may include contacting the primary label with a secondary label configured to specifically bind to the primary label. In certain instances, the primary label is a primary antibody that specifically binds to the analyte of interest, and the secondary label is a secondary antibody that specifically binds to the primary antibody. As such, enhancing the detectable signal from the labeled analyte of interest may include contacting the primary antibody with a secondary antibody configured to specifically bind to the primary antibody. The use of two or more detectable labels as described above may facilitate the detection of the analyte of interest by improving the signal-to-noise ratio.

In certain embodiments, the analyte detection reagent may not specifically bind to an analyte of interest. In some cases, the analyte detection reagent may be configured to produce a detectable signal from the analyte of interest without specifically binding to the analyte of interest. For example, the analyte of interest may be an enzyme (e.g., a cellular enzyme) and the analyte detection reagent may be a substrate for the enzyme. In some cases, contacting the analyte detection reagent (e.g., enzyme substrate) to the analyte of interest (e.g., enzyme) may produce a detectable signal as the substrate is converted by the enzyme.

In certain embodiments, the method includes removing the analyte detection reagent and then contacting the analyte of interest with another analyte detection reagent (e.g., stripping and reprobing). For instance, the method may include contacting the labeled analyte of interest with a buffer (e.g., a stripping buffer) configured to dissociate the analyte detection reagent from the analyte of interest. The dissociated analyte detection reagent may then be washed from the polymeric separation medium. In some cases, the analyte of interest may then be contacted with a subsequent analyte detection reagent. The subsequent analyte detection reagent may be the same or different from the initial analyte detection reagent. Stripping and reprobing may facilitate contacting analytes of interest with different analyte detection reagents.

In certain embodiments, detecting the analyte of interest includes imaging the polymeric separation medium to produce an image of the separated cellular components. Imaging the polymeric separation medium may be performed using any convenient imaging device, such as, but not limited to, a camera, a UV detector, a fluorescent detector, combinations thereof, and the like.

In certain embodiments, the method includes storing the polymeric separation medium. For example, the method may include storing the polymeric separation medium by dehydrating the polymeric separation medium. The polymeric separation medium may be stored for an extended period of time, such as, but not limited to, 1 day, 2 days, 3 days, 4 days, 5 days, 6 days, 1 week, 2 weeks, 3 weeks, 1 month, 2 months, 3 months, 4 months, 5 months, 6 months or more. In some embodiments, the method further includes rehydrating the polymeric separation medium (e.g., using a buffer). The rehydrated polymeric separation medium may be used in any of the assay steps described herein. For example, dehydrating and rehydrating the polymeric separation medium may be performed between any of the assay steps, such as, between producing the polymeric separation medium and performing an assay, between immobilizing the analytes of interest to the polymeric separation medium and contacting the analytes with an analyte detection reagent, between stripping and reprobing, etc.

Samples that may be assayed with the subject methods may include both simple and complex samples. Simple samples are samples that include the analyte of interest, and may or may not include one or more molecular entities that are not of interest, where the number of these non-interest molecular entities may be low, e.g., 10 or less, 5 or less, etc. Simple samples may include initial biological or other samples that have been processed in some manner, e.g., to remove potentially interfering molecular entities from the sample. By "complex sample" is meant a sample that may or may not have the analyte of interest, but also includes many different proteins and other molecules that are not of interest. In some instances, the complex sample assayed in the subject methods is one that includes 10 or more, such as 20 or more, including 100 or more, e.g., $10^3$ or more, $10^4$ or more (such as 15,000; 20,000 or 25,000 or more) distinct (i.e., different) molecular entities, that differ from each other in terms of molecular structure or physical properties (e.g., molecular mass, size, charge, isoelectric point, affinity interaction, etc.).

In certain embodiments, the analyte of interest are cells and/or cellular components. In some cases, the cells are obtained from samples (e.g., biological samples), such as, but not limited to, urine, blood, serum, plasma, saliva, semen, prostatic fluid, nipple aspirate fluid, lachrymal fluid, perspiration, feces, cheek swabs, cerebrospinal fluid, cell lysate samples, amniotic fluid, gastrointestinal fluid, biopsy tissue (e.g., samples obtained from laser capture microdissection (LCM)), and the like. The sample can be a biological sample or can be extracted from a biological sample derived from humans, animals, plants, fungi, yeast, bacteria, tissue cultures, viral cultures, or combinations thereof using conventional methods for the successful extraction of DNA, RNA, proteins and peptides. In certain embodiments, the sample is a fluid sample, such as a solution of analytes (e.g., cells and/or cellular components) in a fluid. The fluid may be an aqueous fluid, such as, but not limited to water, a buffer, and the like.

As described above, the samples that may be assayed in the subject methods may include one or more analytes of interest. Examples of detectable analytes include, but are not limited to: nucleic acids, e.g., double or single-stranded DNA, double or single-stranded RNA, DNA-RNA hybrids, DNA aptamers, RNA aptamers, etc.; proteins and peptides, with or without modifications, e.g., antibodies, diabodies, Fab fragments, DNA or RNA binding proteins, phosphorylated proteins (phosphoproteomics), peptide aptamers, epitopes, and the like; small molecules such as inhibitors, activators, ligands, etc.; oligo or polysaccharides; mixtures thereof; and the like.

In certain embodiments, the method is configured to separate and/or detect constituents of interest in a sample, where the sample size is small. For example, the method may be configured to separate and/or detect constituents of interest in a sample, where the sample size is 1 mL or less, such as 750 µL or less, including 500 µL or less, or 250 µL or less, of 100 µL or less, or 75 µL or less, or 50 µL or less, or 40 µL or less, or 30 µL or less, or 20 µL or less, or 10 µL or less, or 5 µL or less, or 1 µL or less. In some instances, the method is configured to separate and/or detect constituents of interest in a sample, where the sample size is 20 µL or less. In some instances, the method is configured to separate and/or detect constituents of interest in a sample, where the sample size is 10 µL or less.

In certain embodiments, the method includes concentrating, diluting, or buffer exchanging the sample prior to directing the sample through the separation medium. Concentrating the sample may include contacting the sample with a concentration medium prior to contacting the sample with the separation medium. The concentration medium may include a small pore size polymeric gel, a membrane (e.g., a size exclusion membrane), combinations thereof, and the like. Concentrating the sample prior to contacting the sample with the separation medium may facilitate an increase in the resolution between the bands of analytes in the separated sample because each separated band of analyte may disperse less as the sample traverses through the separation medium. Diluting the sample may include contacting the sample with additional buffer prior to contacting the sample with the separation medium. Buffer exchanging the sample may include contacting the sample with a buffer exchange medium prior to contacting the sample with the separation medium. The buffer exchange medium may include a buffer different from the sample buffer. The buffer exchange medium may include, but is not limited to, a molecular sieve, a porous resin, and the like.

In certain embodiments, the method includes contacting the separated analytes bound to the separation medium with a blocking reagent prior to detecting the analyte of interest. In some cases, contacting the separated analytes with a blocking reagent prior to detecting the analyte of interest may facilitate a minimization in non-specific binding of a detectable label to the separated analytes. For example, contacting the separated analytes with the blocking reagent prior to detecting the analyte of interest may facilitate a minimization in non-specific binding of a labeled antibody to the separated analytes. The blocking reagent can be any blocking reagent that functions as described above, and may include, but is not limited to, bovine serum albumin (BSA), non-fat dry milk, casein, and gelatin. In other embodiments, no blocking step is required. Thus, in these embodiments, the method does not include a blocking step prior to detecting the analyte of interest.

In certain embodiments, the method also includes optional washing steps, which may be performed at various times before, during and after the other steps in the method. For example, a washing step may be performed after binding the separated sample to the separation medium, after contacting the separated sample with the blocking reagent, after contacting the separated sample with the detectable label, etc. In some instances, the method does not include a washing step.

Embodiments of the method may also include releasing the analyte bound to the separation medium. The releasing may include contacting the bound analyte with a releasing agent. The releasing agent may be configured to disrupt the binding interaction between the analyte and the separation medium. In some cases, the releasing agent is a reagent, buffer, or the like, that disrupts the binding interaction between the analyte and the separation medium causing the separation medium to release the analyte. After releasing the analyte from the separation medium, the method may include transferring the analyte away from the separation medium. For example, the method may include directing the released analyte downstream from the separation medium for secondary analysis with a secondary analysis device such as, but is not limited to, a UV spectrometer, and IR spectrometer, a mass spectrometer, an HPLC, an affinity assay device, a second microfluidic device as described herein, and the like. In embodiments where the analyte is covalently bound to the polymeric separation medium, releasing the bound analyte may include disrupting the polymers in the polymeric separation medium, such as by breaking one or more bonds between the polymers in the polymeric separation medium. Disrupting the bonds between the polymers in the polymeric separation medium may be achieved by dissolving the polymeric separation medium, for example by heating the polymeric separation medium or by contacting the polymeric separation medium with a reagent that dissolves the polymeric separation medium.

In certain embodiments, the method is an automated method. As such, the method may include a minimum of user interaction with the devices and systems after introducing the sample into the device. For example, the steps of separating the sample constituents in the separation medium to produce a separated sample and applying the stimulus to the separation medium to covalently bond the constituents to the separation medium may be performed by the device and system at predetermined intervals, such that the user need not manually perform these steps. In some cases, the automated method may facilitate a reduction in the total assay time. For example, embodiments of the method, including the separation and detection of analytes in a sample, may be performed in 240 minutes or less, e.g., 180 minutes or less, 120 minutes or less, such as 90 minutes or less, or 60 minutes or less, or 45 minutes or less, or 30 minutes or less, such as 20 minutes or less, including 15 minutes or less, or 10 minutes or less, or 5 minutes or less, or 2 minutes or less, or 1 minute or less.

Aspects of embodiments of the present disclosure further include methods of making the above polymeric separation medium. In some instances, the methods include positioning a monomeric precursor composition of the polymeric separation medium between a first surface and second surface comprising one or more structural features; irradiating the monomeric precursor composition with light having a wavelength sufficient (e.g., blue light) to initiate polymerization of the precursor composition so as to produce the desired composition. The method may further include removing the second surface comprising the one or more structural features such that the first surface (e.g., the solid support) carries a polymeric separation medium that includes a plurality of microwells as described herein. In certain embodiments, the structural features on the second surface include a plurality of posts. The posts on the second surface may include shapes and sizes that correspond to the desired shapes and sizes of the interior volumes of the microwells. In embodiments that include a plurality of posts on the second surface, a polymeric separation medium may be produced that includes a planar array of microwells.

Systems

Aspects of certain embodiments include a system configured to perform methods of the present disclosure. In some instances, the system includes a device as disclosed herein. For instance, the system can include a device that includes a separation medium as described herein. In certain embodiments, the system includes a buffer as described herein. In some embodiments, the system includes an electric field source for applying an electric field to the polymeric separation medium as described herein.

The system may also include a source of electromagnetic radiation (i.e., an electromagnetic radiation source). In some cases, the electromagnetic radiation source is a light source. For example, the light source may include a visible light source, a UV light source, an infrared light source, etc. In some instances, the electromagnetic radiation source includes a light source, such as a UV light source. As described above, the electromagnetic radiation source may be used to apply electromagnetic radiation to the separation medium in the microfluidic device to immobilize (e.g., covalently bond) sample constituents to the separation medium.

In certain embodiments, the system also includes a detector. In some cases, the detector is configured to detect a detectable label. The detector may include any type of detector configured to detect the detectable label used in the assay. As described above, detectable label may be a fluorescent label, colorimetric label, chemiluminescent label, multicolor reagent, enzyme-linked reagent, avidin-streptavidin associated detection reagent, radiolabel, gold particle, magnetic label, etc. In some instances, the detectable label is a fluorescent label. In these instances, the detector may be configured to contact the fluorescent label with electromagnetic radiation (e.g., visible, UV, x-ray, etc.), which excites the fluorescent label and causes the fluorescent label to emit detectable electromagnetic radiation (e.g., visible light, etc.). The emitted electromagnetic radiation may be detected by the detector to determine the presence of the labeled analyte bound to the separation medium.

In some instances, the detector may be configured to detect emissions from a fluorescent label, as described above. In certain cases, the detector includes a photomultiplier tube (PMT), a charge-coupled device (CCD), an intensified charge-coupled device (ICCD), a complementary metal-oxide-semiconductor (CMOS) sensor, a visual colorimetric readout, a photodiode, and the like. The system may be configured to produce an image of the separated cellular components based on a signal obtained from the detector.

Systems of the present disclosure may include various other components as desired. For example, the systems may include fluid handling components, such as microfluidic fluid handling components. The fluid handling components may be configured to direct one or more fluids through the device. In some instances, the fluid handling components are configured to direct fluids, such as, but not limited to, fluid samples, buffers (e.g., electrophoresis buffers, wash buffers, release buffers, lysis buffers, pH gradient buffers, etc.), and the like. In certain embodiments, the fluid handling components are configured to deliver a fluid to the separation medium of the device, such that the fluid contacts the separation medium. The fluid handling components may include pumps (e.g., microfluidic pumps). In some cases, the pumps are configured for pressure-driven fluid handling and routing of fluids through the devices and systems disclosed herein. In certain instances, the fluid handling components are microfluidic fluid handling components configured to deliver small volumes of fluid, such as 1 mL or less, such as 500 μL or less, including 100 μL or less, for example 50 μL or less, or 25 μL or less, or 10 μL or less, or 5 μL or less, or 1 μL or less.

In certain embodiments, the systems include one or more electric field sources (e.g., one or more electrodes). An electric field source may be in contact with the separation medium and may be configured to apply an electric field to various regions of the device, e.g., to the separation medium. The system may be configured to apply an electric field such that the sample is electrokinetically transported through the device. For example, the electric field source may be configured to apply an electric field to the separation medium. In some cases, the applied electric field may be aligned with the directional separation axis of the separation medium. As such, the applied electric field may be configured to electrokinetically transport the analytes and components in a sample through the separation medium. In some instances, the electric field source is configured to apply an electric field with a strength ranging from 10 V/cm to 1000 V/cm, such as from 100 V/cm to 800 V/cm, including from 200 V/cm to 800 V/cm, or from 400 v/cm to 800 V/cm.

In certain embodiments, the system includes an electric field source configured to apply an electric field such that analytes and/or constituents in the sample are isoelectrically focused in the separation medium. For instance, an applied electric field may be aligned with the directional axis of the separation medium and configured to isoelectrically focus the sample constituents along the directional axis of the separation medium.

In some embodiments, the electric field may be directionally distinct. For example, the electric field may be aligned with the directional separation axis of the separation medium. The electric field may be configured to direct the sample or analytes through the separation medium along the directional axis of the separation medium.

In certain embodiments, the system includes one or more electric field generators configured to generate an electric field. In certain instances, the electric field generators may be proximal to the device, such as arranged on the device. In some cases, the electric field generators are positioned a distance away from the device and are electrically connected to the electrodes. For example, the electric field generators may be incorporated into the system for use with the device.

Utility

The subject devices, systems and methods find use in a variety of different applications where determination of the presence or absence, and/or quantification of one or more analytes in a sample is desired, such as by isoelectric focusing. For example, the subject devices, systems and methods find use in the separation and detection of proteins, peptides, nucleic acids, and the like, which may be present in a cell or a sub-cellular compartment. In some cases, the subject devices, systems and methods find use in the separation and detection of cellular proteins. For example, the subject devices, systems and methods find use in the detection of proteins associated with the development of cancer treatments, for development of stem cell therapy, for high-throughput drug screening, for biological analyses regarding human aging, and the like.

The subject devices, systems and methods find use in development and validation of stem cell de-differentiation and differentiation protocols. For instance, induced pluripotent stem cells may be derived from somatic cells such as skin cells, which may involve reprogramming of somatic cells with various external stimuli (e.g., chemical or biological stimuli) to induce the cells to a pluripotent state. In some instances, when experimenting with new external stimuli to achieve pluripotency, it may be desirable to measure the response of the cell population to determine if pluripotency has been achieved. The subject devices, systems and methods find use in measuring these responses of the cell population to determine if pluripotency has been achieved. For example, the subject devices, systems and methods find use in measuring multiple protein targets that are known pluripotency indicators such as, but not limited to, Oct-3/4, Nanog, SSEA-4, and SOX2. The subject devices, systems and methods find use in determining the heterogeneity of the transformed cell population to determine the percentage of the cells that have been successfully transformed to a pluripotent state. Such induced pluripotent stem cells can then be differentiated via external chemical or biological stimuli to derive various cell types such as, but not limited to, cardiomyocytes, neurons, hepatocytes and endothelial cells. The subject devices, systems and methods find use in the validation of such differentiation protocols because, in certain embodiments, subject devices, systems and methods can simultaneously detect multiple protein markers that are indicative of successful differentiation to the target cell type. The subject devices, systems and methods find use in determining the heterogeneity of the transformed cell population to determine the percentage of the cells that have successfully differentiated to the target cell type.

The subject devices, systems and methods also find use in development and validation of "disease-in-a-dish" models. For example, it may be challenging for researchers to study diseases in the human brain since extracting neurons from living patients is difficult and risky. As an alternative, cellular models of disease may be created to allow basic scientific research and drug development. Such models can be created, for example, by differentiation of neurons from induced pluripotent stem cells (IPSCs) derived from skin cells donated by patients with a genetic neurodegenerative disease. To create these models, stem cell differentiation protocols may be developed and validated as previously described to de-differentiate skin cells to stem cells and then differentiate the stem cells to neurons. Once this transformation is successful, the model may be validated by determining that characteristics of the disease are present in the differentiated cells. For example, neurons can be created from the skin cells of patients with Huntington's disease. Once created, the derived cells may be tested for expression of the diseased form of the Huntingtin protein. The subject devices, systems and methods find use in detecting the presence and heterogeneity of the Huntingtin protein in the disease model and verifying similarity to primary cells. Disease-in-a-dish models may also be created through selection or genetic modification of cell lines. Such cells may be validated to ensure that the genetic modification results in stable expression of a diseased biomarker (e.g., a protein) that mimics what is seen in diseased primary cells. The subject devices, systems and methods find use in creating disease models of the liver, kidney, heart, brain, blood or other organs, tissues and cell types.

The subject devices, systems and methods also find use in measuring the heterogeneity of cancerous tumors. Specific biomarkers such as, for example, HER-2 and BRAF, are indicative of certain cancer mutations and are targets for drugs such as trastuzumab and vemurafenib, respectively. Cancer may be a highly heterogeneous disease and targets such as HER-2 and BRAF may not be expressed uniformly within a tumor. Such heterogeneity may have implications for clinical diagnosis and treatment. The subject devices, systems and methods find use in analyzing the heterogeneity of multiple targets in a cell population derived from a tumor biopsy. Such an approach may facilitate basic scientific research, drug discovery and development, and companion diagnostics for targeted therapeutics.

The subject devices, systems and methods also find use in the determination of the mechanism of action of drug compounds. For example, "disease-in-a-dish" models may be used as in vitro test platforms for drug development. Drugs can be developed to target specific targets and pathways that are present in both the disease and disease models. The subject devices, systems and methods find use in analyzing the heterogeneous response of a cell population after exposure to a drug candidate. Response to the drug can be correlated to the presence of the primary target and heterogeneous responses within the cell population not explained by the presence or absence of the primary target can be further correlated with other proteins and signaling pathways. In this way, the subject devices, systems and methods find use in determining the mechanism of action of the drug, which may facilitate more efficient research, development and eventual approval of the drug compound.

The subject devices, systems and methods also find use in the analysis of circulating tumor cells (CTCs) isolated from blood. CTCs are cancerous cells in circulation that are shed from primary tumors and may be used for early cancer diagnosis, prognosis, monitoring of treatment, detection of metastases, or other uses. Since the CTCs are heterogeneous, each individual cell may be tested for protein biomarkers that are indicative of invasiveness, proliferation, or other factors. Typical methods for enriching CTCs from whole blood yield a suspension of cells enriched in the target CTCs. The subject devices, systems and methods find use in analyzing such a cell suspension, for example using methods utilizing active settling of the cells to maximize the number of cells in the input suspension that are captured and analyzed. Analysis of CTCs by the subject devices, systems and methods find use for basic scientific research, management of minimum residual disease, and cancer diagnosis. In certain instances, active settling includes positioning the sample constituents in one or more microwells using one or more or the following: applying an electric field to the sample; applying a density gradient, physically positioning the sample constituents into the microwell using a positioning device, such as but not limited to a micropipetter, a nozzle, optical tweezers, and the like; applying a pressure force; applying a magnetic force (e.g., where the sample constituents of interest are bound to magnetic beads); convection flow; size selected settling using different sized microwells; positioning droplets of sample containing cells or cell lysates into microwells; combinations thereof and the like.

The subject devices, systems and methods also find use in analysis downstream of fluorescence activated cell sorting (FACS). FACS can sort millions of cells and isolate subpopulations as small as a few hundred cells. However, further analysis of such small subpopulations by flow cytometers may not be suitable because typical flow cytometers require a minimum of 10,000 or more cells. The subject devices, systems and methods find use in analyzing such small cell subpopulations, for example using methods utilizing active settling or placement of the cells to maximize the number of cells in the input suspension that are captured and analyzed. The subject devices, systems and methods find use in the further analysis of the subpopulation for protein targets that include targets in the FACS sort as well as targets that were not part of the FACS sort. For example, primary cells derived from cancerous human or animal tissue can be sorted by FACS to isolate a subpopulation of cells that are putative cancer cells based on one or more surface markers. The subject devices, systems and methods can then be used to confirm the presence of the one or more surface markers and assay for additional targets such as, for example, intracellular proteins and transcription factors that will further characterize the state and heterogeneous composition of the isolated subpopulation.

The subject devices, systems and methods find use in the detection of nucleic acids, proteins, or other biomolecules in a sample. The methods may include the detection of a set of biomarkers, e.g., two or more distinct protein biomarkers, in a sample. For example, the methods may be used in the rapid, clinical detection of two or more disease biomarkers in a biological sample, e.g., as may be employed in the diagnosis of a disease condition in a subject, or in the ongoing management or treatment of a disease condition in a subject, etc. In addition, the subject devices, systems and methods may find use in protocols for the detection of an analyte in a sample, such as, but not limited to, Western blotting, and the like.

The subject devices, systems and methods find use in detecting biomarkers. In some cases, the subject devices, systems and methods may be used to detect the presence or absence of particular biomarkers, as well as an increase or decrease in the concentration of particular biomarkers in blood, plasma, serum, or other bodily fluids or excretions, such as but not limited to urine, blood, serum, plasma, saliva, semen, prostatic fluid, nipple aspirate fluid, lachrymal fluid, perspiration, feces, cheek swabs, cerebrospinal fluid, cell lysate samples, amniotic fluid, gastrointestinal fluid, biopsy tissue, and the like.

The presence or absence of a biomarker or significant changes in the concentration of a biomarker can be used to diagnose disease risk, presence of disease in an individual, or to tailor treatments for the disease in an individual. For example, the presence of a particular biomarker or panel of biomarkers may influence the choices of drug treatment or administration regimes given to an individual. In evaluating potential drug therapies, a biomarker may be used as a surrogate for a natural endpoint such as survival or irreversible morbidity. If a treatment alters the biomarker, which has a direct connection to improved health, the biomarker can serve as a surrogate endpoint for evaluating the clinical benefit of a particular treatment or administration regime. Thus, personalized diagnosis and treatment based on the particular biomarkers or panel of biomarkers detected in an individual are facilitated by the subject devices, systems and methods. Furthermore, the early detection of biomarkers associated with diseases is facilitated by the high sensitivity of the subject devices and systems, as described above. Due to the capability of detecting multiple biomarkers on a single chip, combined with sensitivity, scalability, and ease of use, the presently disclosed microfluidic devices, systems and methods find use in portable and point-of-care or near-patient molecular diagnostics.

The subject devices, systems and methods find use in detecting biomarkers for a disease or disease state. In certain instances, the subject devices, systems and methods find use in detecting biomarkers for the characterization of cell signaling pathways and intracellular communication for drug discovery and vaccine development. For example, the subject devices, systems and methods may be used to detect and/or quantify the amount of biomarkers in diseased, healthy or benign samples. In certain embodiments, the subject devices, systems and methods find use in detecting biomarkers for an infectious disease or disease state. In some cases, the biomarkers can be molecular biomarkers, such as but not limited to proteins, nucleic acids, carbohydrates, small molecules, and the like.

The subject devices, systems and methods find use in diagnostic assays, such as, but not limited to, the following: detecting and/or quantifying biomarkers, as described above; screening assays, where samples are tested at regular intervals for asymptomatic subjects; prognostic assays, where the presence and/or quantity of a biomarker is used to predict a likely disease course; stratification assays, where a subject's response to different drug treatments can be predicted; efficacy assays, where the efficacy of a drug treatment is monitored; and the like. For example, one or more biomarkers may be detected and monitored over an extended period of time, such as over several days, several weeks or several years. Changes in the presence and/or quantity of the one or more biomarkers may be monitored over an extended period of time.

The subject devices, systems and methods also find use in validation assays. For example, validation assays may be used to validate or confirm that a potential disease biomarker is a reliable indicator of the presence or absence of a disease across a variety of individuals. The short assay times for the subject devices, systems and methods may facilitate an increase in the throughput for screening a plurality of samples in a minimum amount of time. For example, the subject devices, systems and methods find use in probed IEF separation medium for affinity reagent screening. High-throughput microfluidic devices that include a separation medium as described herein may be used to select biomarker isoform-specific affinity reagents, such as specific monoclonal antibodies. Such reagents may be used in ELISA assays for disease-specific biomarker isoforms present in clinical proteinaceous samples. In some cases, reagents may be screened in serial or for their multiplexed (parallel) capability for highly specific binding.

The subject devices, systems and methods also find use in a variety of different applications where separation of one or more constituents (e.g., analytes) in a sample is desired. The constituents in the sample may be separated based on a variety of different separation techniques, such as, but not limited to, electrochromotography, electrophoretic immunoassays, equilibrium separations (including isoelectric and temperature gradient focusing), micellar electrokinetic chromatography, chromatography variants, native electrophoresis, and separation by protein mass under denaturing conditions (e.g., SDS-PAGE). Any of the separation techniques may be coupled to subsequent analyte probing by, for example, antibodies (or variants), lectins, substrates, ligands, lipids, coated particles or dyes. For example, separation based on protein sizing with subsequent antibody probing provides an integrated microfluidic Western blotting device.

In some instances, the subject devices, systems and methods can be used without requiring a laboratory setting for implementation. In comparison to the equivalent analytic research laboratory equipment, the subject devices and systems provide comparable analytic sensitivity in a portable, hand-held system. In some cases, the mass and operating cost are less than the typical stationary laboratory equipment. The subject systems and devices may be integrated into a single apparatus, such that all the steps of the assay, including separation, transfer, labeling and detecting of an analyte of interest, may be performed by a single apparatus. For example, in some instances, there are no separate apparatuses for separation, transfer, labeling and detecting of an analyte of interest. In addition, the subject systems and devices can be utilized in a home setting for over-the-counter home testing by a person without medical training to detect one or more analytes in samples. The subject systems and devices may also be utilized in a clinical setting, e.g., at the bedside, for rapid diagnosis or in a setting where stationary research laboratory equipment is not provided due to cost or other reasons.

Kits

Aspects of embodiments of the present disclosure further include kits configured for use in the methods described herein. In some instances, the kits include a device as described herein, such as a device that includes a polymeric separation medium having a plurality of microwells. In certain embodiments, the kit may include a packaging configured to contain the device. The packaging may be a sealed packaging, such as a sterile sealed packaging. By "sterile" is meant that there are substantially no microbes (such as fungi, bacteria, viruses, spore forms, etc.). In some instances, the packaging may be configured to be sealed, e.g., a water vapor-resistant packaging, optionally under an air-tight and/or vacuum seal.

Aspects of the present disclosure additionally include kits that further include a buffer. For instance, the kit may include a buffer, such as an electrophoresis buffer, a sample buffer, a lysis buffer, and the like. In certain cases, the buffer is an electrophoresis buffer, such as, but not limited to, a Tris buffer, a Tris-glycine, and the like. In some instances, the buffer includes a detergent (such as sodium dodecyl sulfate, SDS).

The kits may further include additional reagents, such as but not limited to, release reagents, denaturing reagents, refolding reagents, detergents, detectable labels (e.g., fluorescent labels, colorimetric labels, chemiluminescent labels, multicolor reagents, enzyme-linked reagents, detection reagents (e.g., avidin-streptavidin associated detection reagents), e.g., in the form of at least one if not more analyte detection reagents (such as first and second analyte detection reagents), calibration standards, radiolabels, gold particles, magnetic labels, etc.), and the like.

In certain embodiments, the kit may include an analyte detection reagent, such as a detectable label, as described herein. The detectable label may be associated with a member of a specific binding pair. Suitable specific binding pairs include, but are not limited to: a member of a receptor/ligand pair; a ligand-binding portion of a receptor; a member of an antibody/antigen pair; an antigen-binding fragment of an antibody; a hapten; a member of a lectin/carbohydrate pair; a member of an enzyme/substrate pair; biotin/avidin; biotin/streptavidin; digoxin/antidigoxin; a member of a DNA or RNA aptamer binding pair; a member of a peptide aptamer binding pair; and the like. In certain embodiments, the member of the specific binding pair includes an antibody. The antibody may specifically bind to an analyte of interest in the separated sample bound to the separation medium. For example, the detectable label may include a labeled antibody (e.g., a fluorescently labeled antibody) that specifically binds to the analyte of interest.

In addition to the above components, the subject kits may further include instructions for practicing the subject methods. These instructions may be present in the subject kits in a variety of forms, one or more of which may be present in the kit. One form in which these instructions may be present is as printed information on a suitable medium, e.g., a piece or pieces of paper on which the information is printed, in the packaging of the kit, in a package insert, etc. Another form would be a computer readable medium, e.g., CD, DVD, Blu-ray, computer-readable memory (e.g., flash memory), etc., on which the information has been recorded or stored. Yet another form that may be used is a website address which may be accessed via the Internet to view the information at a removed site. Any convenient form of instructions may be present in the kits.

As can be appreciated from the disclosure provided above, embodiments of the present invention have a wide variety of applications. Accordingly, the examples presented herein are offered for illustration purposes and are not intended to be construed as a limitation on the invention in any way. Those of ordinary skill in the art will readily recognize a variety of noncritical parameters that could be changed or modified to yield essentially similar results. Thus, the following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by mass, molecular mass is mass average molecular mass, temperature is in degrees Celsius, and pressure is at or near atmospheric.

EXAMPLES

Example 1

Back-to-Back pH Gradients for Isoelectric Focusing Arrays
    Summary

Methods and devices to perform isoelectric focusing (IEF) in an array format by the formation of back-to-back pH gradients are described. Unlike size-based non-equilibrium polyacrylamide gel electrophoresis (PAGE) separations however, IEF separations can use a pH gradient. Thus, for the realization of a grid of separations, back-to-back pH gradient were used. Photopatterning was used to photopattern the boundary conditions for carrier ampholyte-based pH gradients to polymerize rows of alternating gel regions with Immobilines buffering at acidic pH values, carrier ampholyte, and Immobilines buffering at basic pH values. These Immobilines were weak acrylamido acids and bases that can be mixed at different concentrations to buffer at specific pH values.

Detailed Description

Introduced in the 1960's and currently regarded as a prominent separation technique, IEF remains an active area of fundamental research. IEF separates analytes by iseoelectric point (p1), making the assay useful for detection of protein post-translational modifications in 1D or 2D separations. Post-translational modifications such as ubiquitination, glycosylation, phosphorylation, truncation, etc. are of functional biological importance and might also serve as biomarkers for disease. These post-translational modifications typically result in charge changes to the modified proteins, but result only in small molecular mass changes making IEF separations preferable to size-based separations.

pI separation occurs when an electric field is applied along the axis of a stable pH gradient (formed by polyprotic amphoteric buffers). Amphoteric buffers with the desired properties for IEF are called carrier ampholytes. Carrier ampholytes are amphoteric buffers that have high buffering capacity and high conductivity at their pI. A pH gradient is formed by carrier ampholytes between terminal buffers at basic and acidic pH values upon application of an electric field. At equilibrium focused experience a balance between eletromigration and diffusion.

In addition to using carrier ampholytes, other approaches can be used to form pH gradients. pH gradients formed by the diffusion of non-amphoteric buffers are called "artificial pH gradients" and only result in quasi-equilibrium focusing. An immobilized pH gradient (IPG) can be formed by the incorporation of reagents called Immobilines on the gel matrix. These Immobilines are weak acrylamido acids and bases that can be mixed at different concentrations to buffer at specific pH values. By carefully choosing the concentrations of combinations of different Immobilines, IPGs can be formed via diffusion between two reservoirs.

Here, performing multiplexed IEF separations used a unique chemical environment (pH gradient, terminal buffers). To perform multiple parallel IEF separations in a given footprint, the axes of each individual separation were specified with these chemical conditions. While a row of IEF separations was performed by having one set of boundary conditions at each end, in order to perform a grid of IEF separations, back-to-back pH gradients were used. The devices and methods described herein used back-to-back pH gradients formed using immobilines as the boundaries.

Multiplex IEF Array

Figure 1:
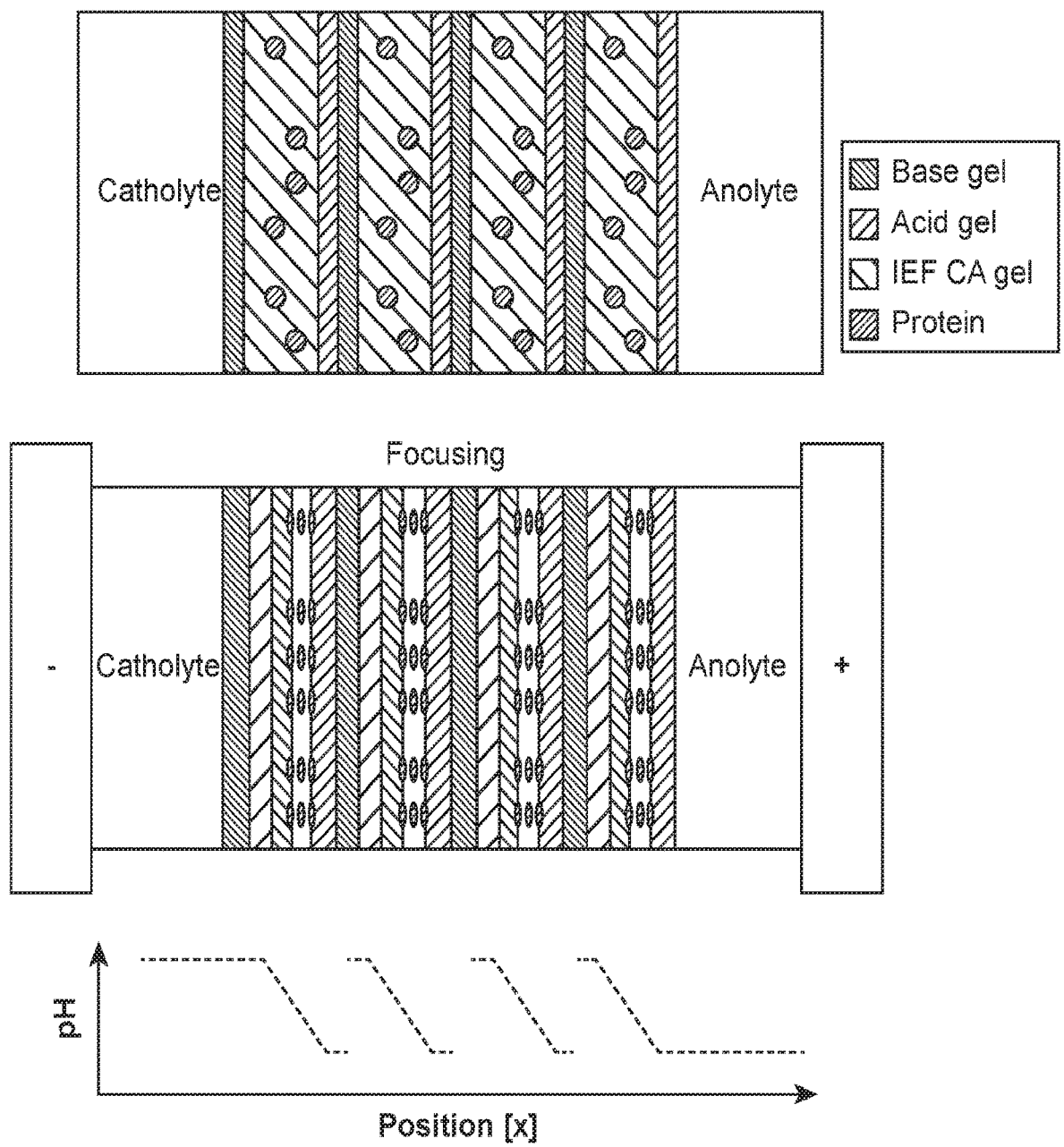
FIG. 1 shows a schematic of a device, according to embodiments of the present disclosure. Gels were photopolymerized on a slide containing immoblines to buffer at acidic and basic pH. Gels containing samples and carrier ampholytes were polymerized between the basic and acidic gels. Proteins were focused after application of an electric field which also led to the formation of pH gradients in each region.

Using this approach, loaded samples did not have to necessarily be arrayed at regular well spacings because IEF would lead to protein focusing at the same pH values regardless of the starting position of the sample (FIG. 1).

FIG. 1 shows a schematic of a device according to embodiment of the present disclosure. Gels were photopolymerized on a slide containing immoblines to buffer at acidic and basic pH. Gels containing samples and carrier ampholytes were polymerized between the basic and acidic gels. Proteins were focused after application of an electric field which also led to the formation of pH gradients in each region.

A key demonstration towards IEF arrays was the ability to form rows of gels of different compositions on a glass slide (FIG. 2). The next capability that was demonstrated was the ability to realize uniform and linear pH gradients on a glass slide (FIG. 3). A polyacrylamide gel containing carrier ampholytes was formed between two glass slides. Interfacing was done with platinum wires in catholyte and anolyte buffers as the boundary conditions.

Figure 4:
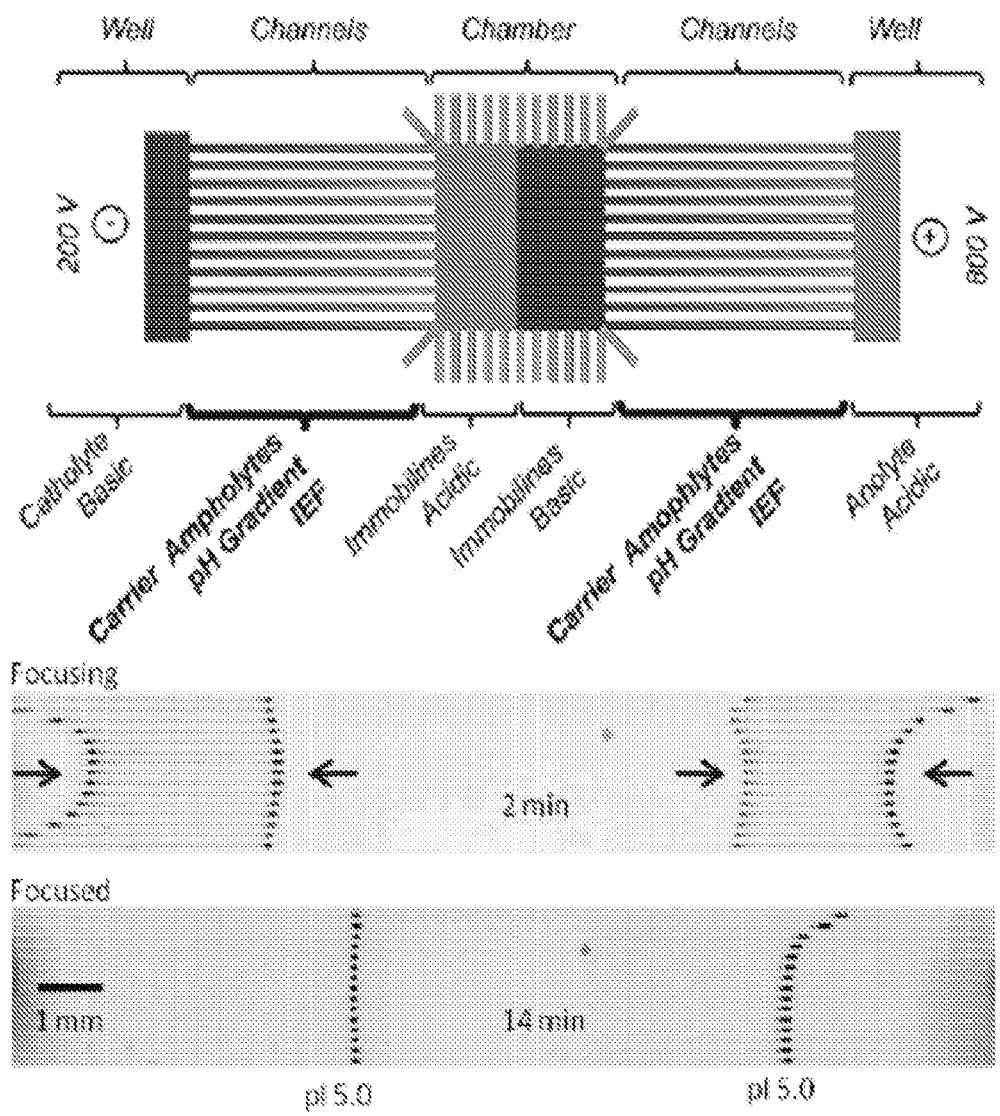
FIG. 4 shows an example of back-to-back pH gradients using Immobiline boundaries, according to embodiments of the present disclosure; Device schematic and inverted fluorescence micrographs of wtGFP focusing in back-to-back pH gradients using carrier ampholytes and photopatterned boundary conditions on a microfluidic chip.

To demonstrate this arrayed IEF approach using Immobiline gel boundaries, IEF was performed on back-to-back pH gradients on a microfluidic chip (FIG. 4). Gel containing Immobilines buffering at basic and acid pHs were photopolymerized at the intended boundaries of the pH gradients. With this approach, simultaneous focusing of wtGFP in back-to-back pH gradients was performed (FIG. 4).

This approach resulted in highly-multiplexed IEF separations resulting in higher-throughput. One advantage is that using this approach, the electrical interfacing was straightforward as only two terminal electrodes were required, instead of having to electrically address each individual separation (as would be the case in an array of individual channels).

This device can be used to perform parallel IEF separations of multiple types of samples including proteins, nucleic acids, metabolites, organelles form cell extracts, clinical samples, purified proteins, serum, subcellular compartments, single cells. Sample loading can be done manually or with automated mechanical pipetting systems. These back-to-back pH gradient arrays may be formed in closed microdevices, as demonstrated, but also on the surface of slides, open gel systems, etc.

The pH gradient can be formed using multiple types of carrier ampholytes such as Servalyte, Biolyte, Pharmalyte, Ampholine, and Polybuffer. The boundary conditions can be formed using other reagents other than immobilines to buffer at the acidic and basic boundary conditions. Both the immobiline and carrier ampholyte composition can be tuned for a desired pH gradient range. The protein samples analyzed could be in native or denatured states. The samples and focusing regions could contain urea, detergents, and other chemicals used for denaturing samples.

After completion of separations, the resolved species can be immobilized onto the gel matrix via N-[3-[(4-benzoyl-phenyl)formamido]propyl] methacrylamide (BPMA) mediated photocapture for subsequent probing for readout with antibodies, aptamers, lectins, Fab fragments, etc.

These probing species may be labeled with fluorophores, linked to enzymes or DNA for signal amplification, etc. Readout can also be done by staining techniques such as silver staining, Coomasie Brilliant Blue, etc. Proteins can also be labeled prior to separation or fluorescent proteins can be expressed transgenically and non-fluorescent proteins could be fusions to fluorescent proteins. Separated species can be transferred to blotting membranes instead of being photocaptured. Readout of separating and resolved species can be done with methods other than fluorescence such as electrochemically, using capacitively coupled contactless conductivity, using UV absorption, etc. IEF could be used as the first step for subsequent separations such as native PAGE, SDS-PAGE, etc. Activity assays can be performed after separation. Resolved species can also be analyzed via mass spectrometry for protein sequencing or further inquiry using matrix-assisted laser desorption/ionization or similar techniques.

Example 2

Single Cell Isoelectric Focusing Arrays

Summary

Isoelectric focusing (IEF) of the protein contents from single cells in an array format are described in this example. Utilizing a gel patterned with Immobilines to both interface with the electrodes and deliver non-ionic cell lysis reagents were some aspects of the present devices that were used for single-cell IEF.

Detailed Description

Variations in cell populations are of biological importance in cancer and developmental biology. This heterogeneity is expressed at the level of post-translational modifications. These posttranslational modifications are of functional biological importance and might also serve as biomarkers for disease. IEF is a separation tool for the separation of post-translational modifications as these typically result in charge changes to the modified proteins.

The devices of the present disclosure provide for IEF separation of the contents of single cells in a multiplexed manner. These devices facilitate the analysis of cell heterogeneity while retaining the analytical performance to resolve small charge differences resulting from post-translational modifications.

Figure 5:
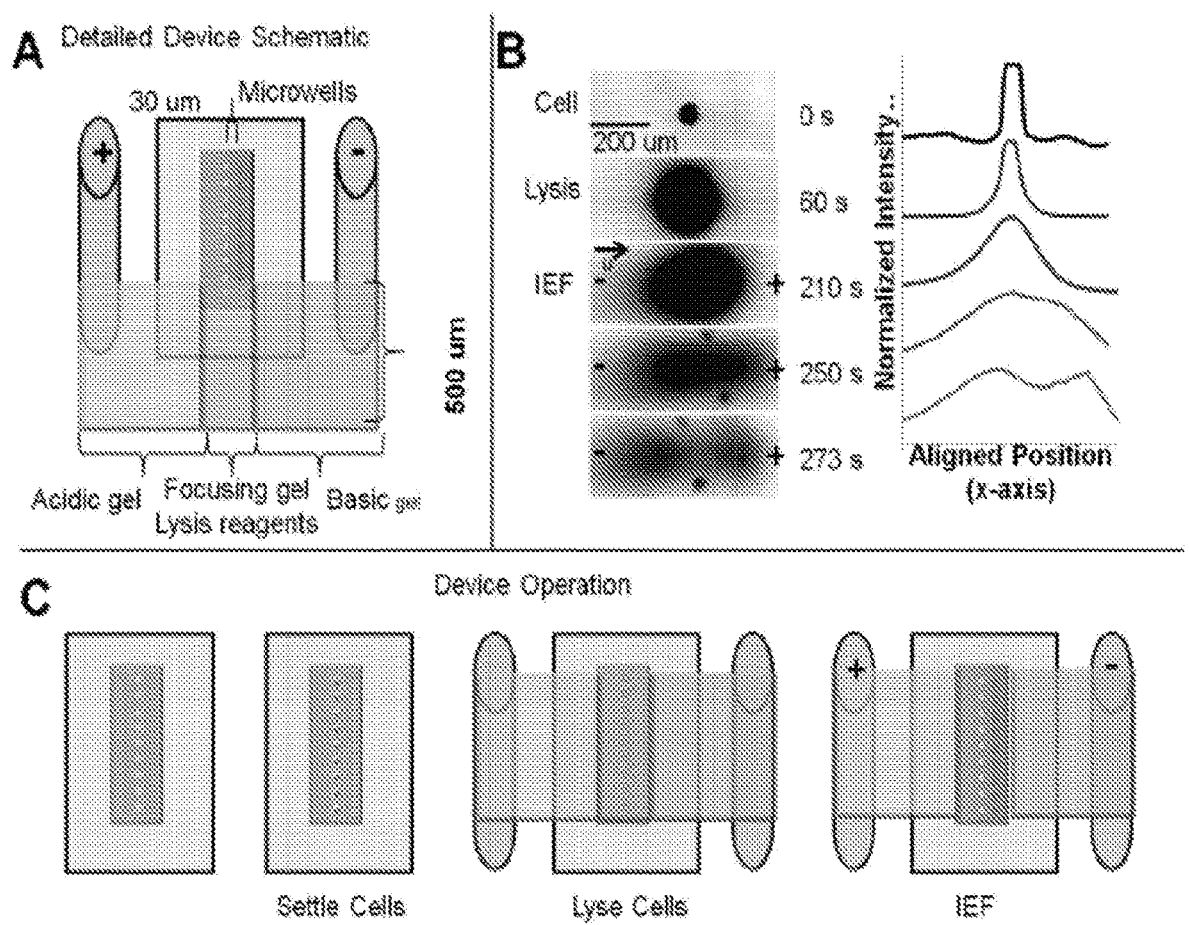
FIG. 5, panels A-C, are related to a single-cell IEF (scIEF) with a multi-patterned gel lid, according to embodiments of the present disclosure.

To provide for IEF while delivering cell lysis reagents, a multi-patterned, free-standing gel lid was used (FIG. 5). U373 cells expressing turboGFP were settled on a gel slide containing a row of 40 µm wells. Using the lid to interface with the electrodes directly at the Immobiline patterned regions obviated the need to use the catholyte and anolyte solutions. Additionally, by providing IEF current through the thicker lid instead of on the gel slide, the current path did not have large variations in cross-section.

Finally, the flexibility of the lid by being a free-standing gel structure removed bubbles trapped between lid and gel. The detergents used (digitonin, CHAPS, Triton-x100) were non-ionic therefore compatible with IEF.

Figure 6:
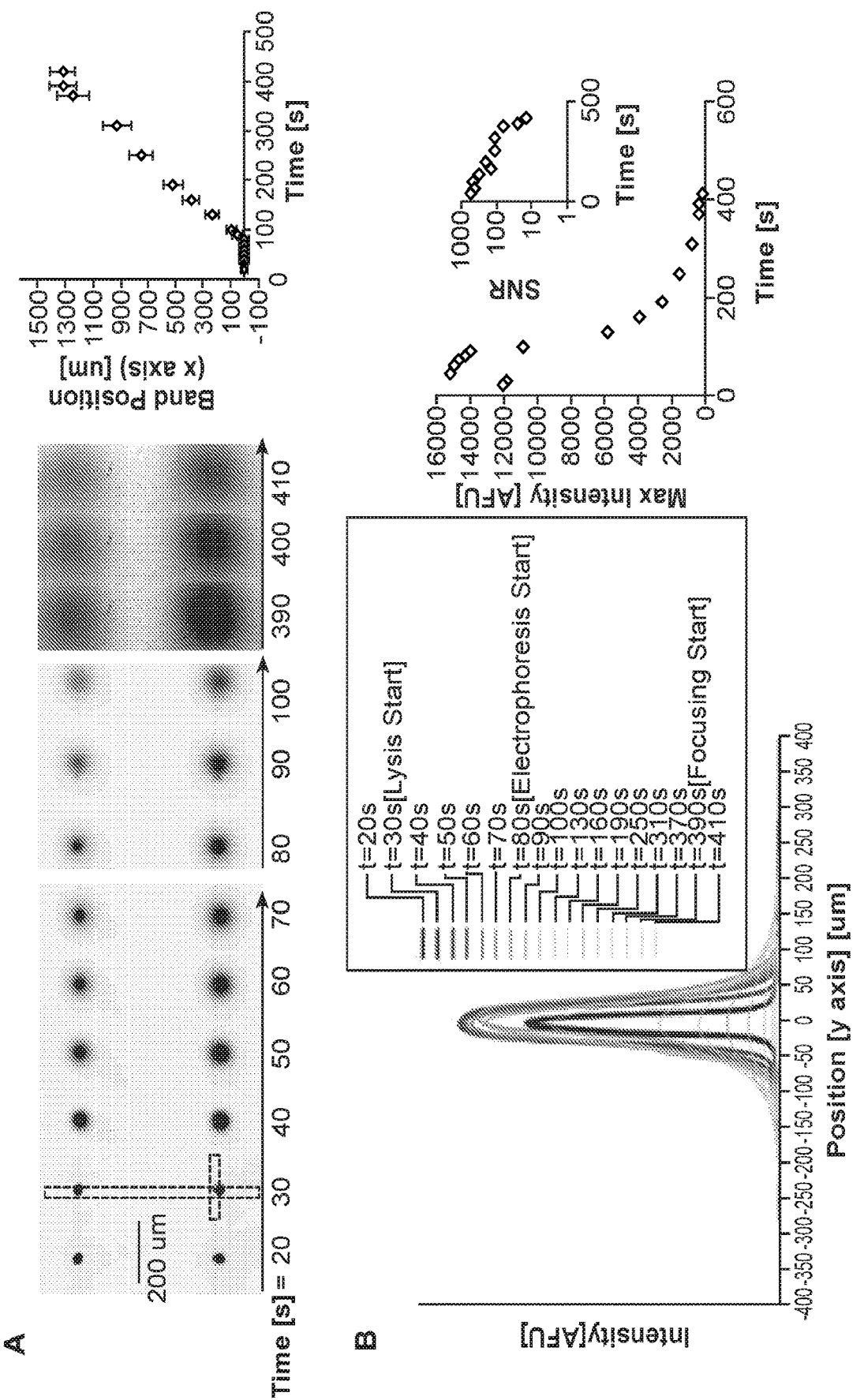
FIG. 6, panels A-D, show images and graphs of the characterization of scIEF, according to embodiments of the present disclosure.
Figure 6:
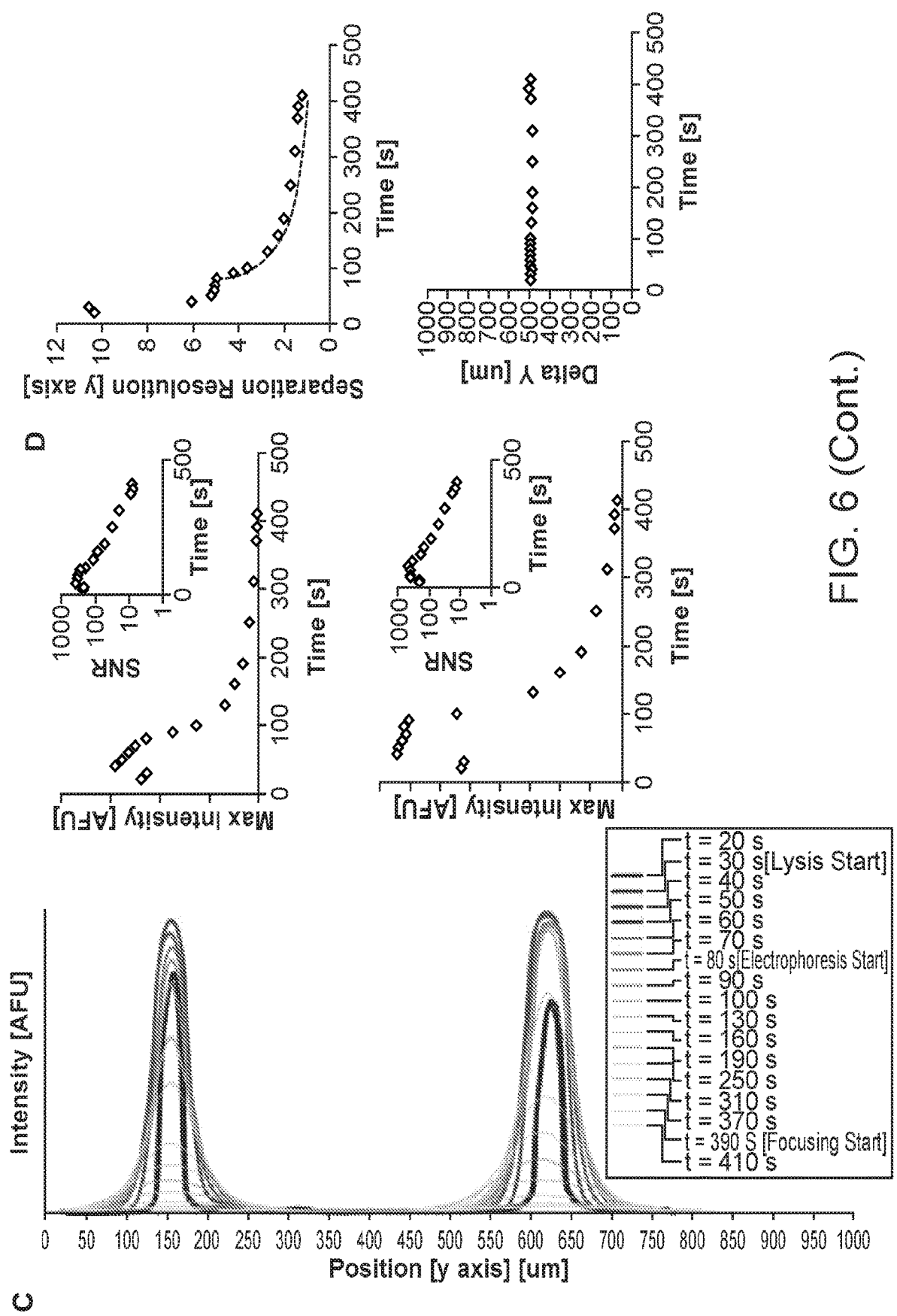

After this initial scIEF demonstration, the system was characterized by real-time tracking of the lysis of the U373 cells and focusing of turboGFP (FIG. 6). Cells were originally settled in 4° C. 1×PBS for ~10 min. Gel slides were then rinsed with carrier ampholyte buffer for 10 s. After addition of the lid, lysis was performed for ~1 min. Turbo GFP reached its pI and focused at 390 s after the start of the experiment (~300 s after electric field application). Focusing was confirmed by the change in band migration and decrease in band width in the x-axis (FIG. 6, panel A).

The losses in the system occurred in two different stages:

Stage 1: proteins in the well. The x- and y-axis losses were diffusion mitigated by partitioning between well and separation gel (free solution to 6% T). Losses in the z-axis were diffusion mitigated by diffusion between well/separation gel and lid (free solution/6% T and 15% T, respectively).

Stage 2: after proteins were loaded onto separation gel x-axis, losses were countered by electrofocusing. Losses in the y-axis were approximately free 1D diffusion. Losses in the z-axis were diffusion mitigated by portioning between the separation gel and lid (6% T and 15% T). These two stages were visible in FIG. 6, panel D. During lysis, losses in the y-axis were mitigated by partitioning and then separation resolution in the y-axis increased proportional to ~t1/2 as expected for free diffusion. The increase in separation resolution in the y-axis was due to diffusion only (as shown in the second graph, the spacing between the two bands was maintained showing uniform migration). The wells were spaced 500 µm. Average band spacing for shown time points was ~495 µm (varied ~1%). When cells were in the wells, the lane spacing resulted in a separation resolution of ~10.3 and while it decreased over the course of focusing due to diffusion, it remained above 1 (~1.2 at t=410 when the bands were focused).

Fluorescence in the x-axis decreased by ~2 orders of magnitude, but SNR remained high (~16) for the measured lane (FIG. 6, panel B). Fluorescence in the y-axis similarly decreased by ~2 orders of magnitude, but SNR also remained high (~13, ~8) for both lanes (FIG. 6, panel C). Fluorescence in both axes went up at the start of lysis.

Figure 7:
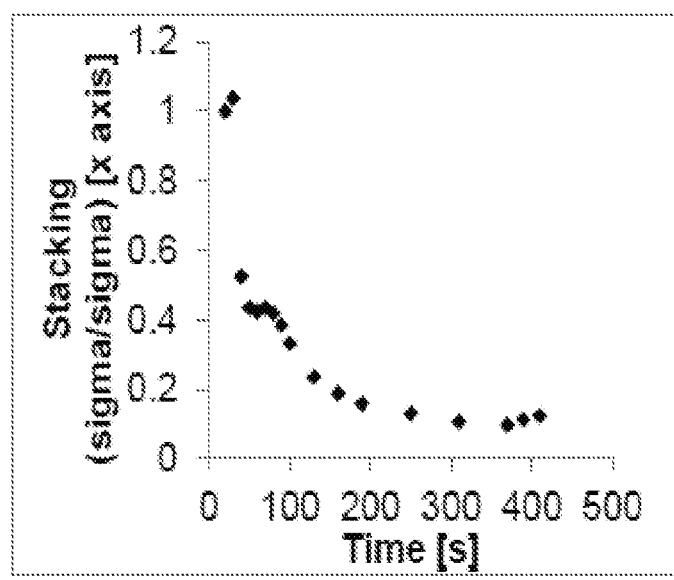
FIG. 7 shows a graph of the enrichment during scIEF, according to embodiments of the present disclosure. Data were from the same run as FIG. 6. Band width in the x-axis normalized by initial band width in the x-axis was plotted.

The size of the focused zones depended on system parameters. In this system, there were no observations of enrichment in the x-axis from the starting concentration in the cell, but focusing did help mitigate losses due to diffusion in the x-axis. In other words, the cells were smaller than the size of the focused zones. During loading, from well to separation gel, a small degree of stacking (measured as band width x-axis over initial band width) (~4%) was observed. Upon reaching the pI, the effective stacking went up from ~0.10 to ~0.12 (FIG. 7).

Figure 8:
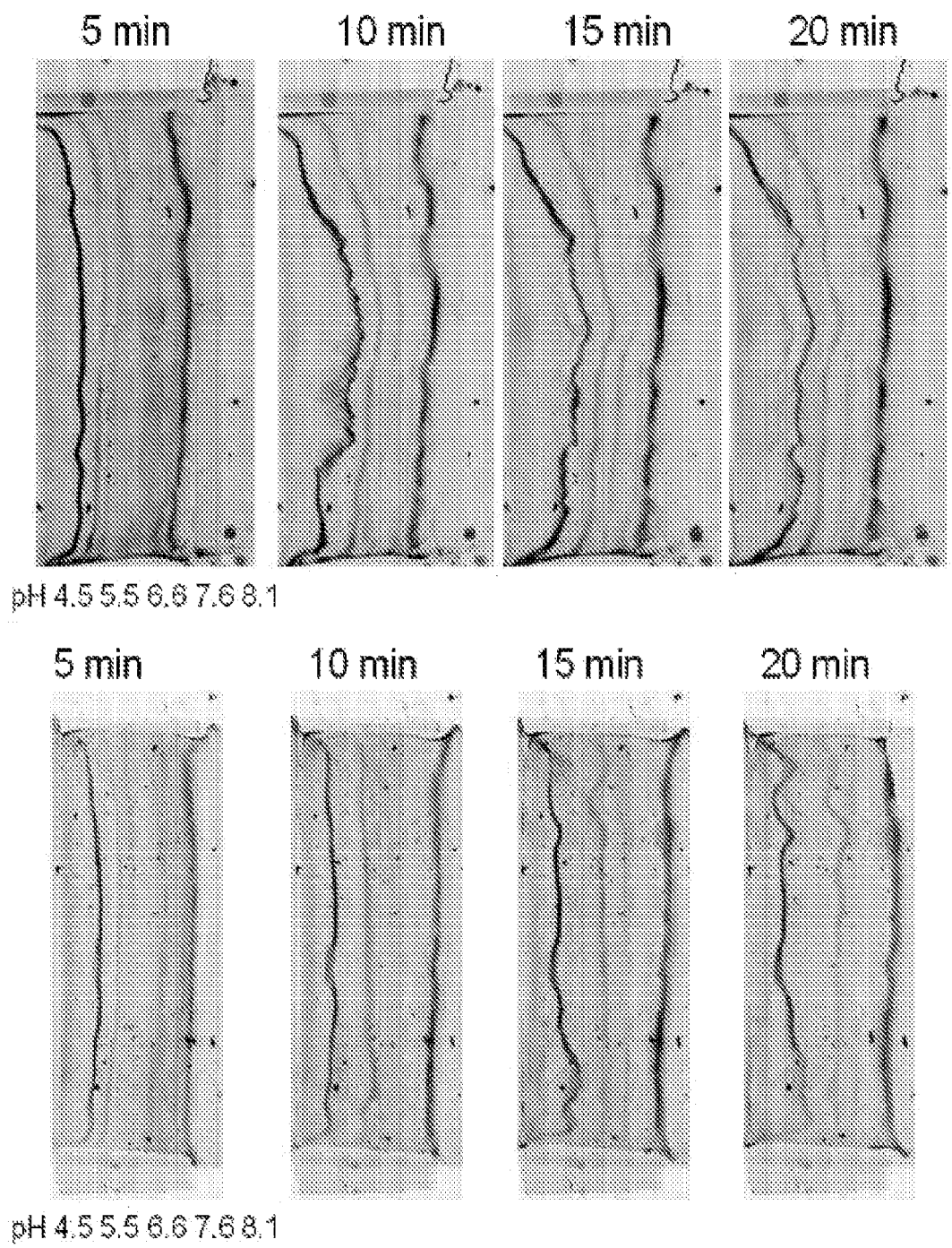
FIG. 8 shows images of pH gradient formation in a scIEF, according to embodiments of the present disclosure. Inverted fluorescence micrographs of whole-gel scans during scIEF are shown. Scans at 5 min intervals for two separate runs are included. pH markers 4.5, 5.5, 6.6, 7.6, and 8.1 were included. Gels were 25 mm high and 0.9 mm wide.

The formation of the pH gradient was observed using fluorescent pH markers (FIG. 8). pH markers were included in the precursor solution for the gel slide. Whole-slide scans were performed at 5 min intervals during focusing. The pH gradient was formed after ~5 min and was stable for <20 min. Non-uniformities in the y-axis likely arose from misalignment of the lid or from gel dehydration during IEF. Observing the pH gradient formation in this manner may facilitate a minimization in focusing times and help characterize well-to-well variability.

Figure 9:
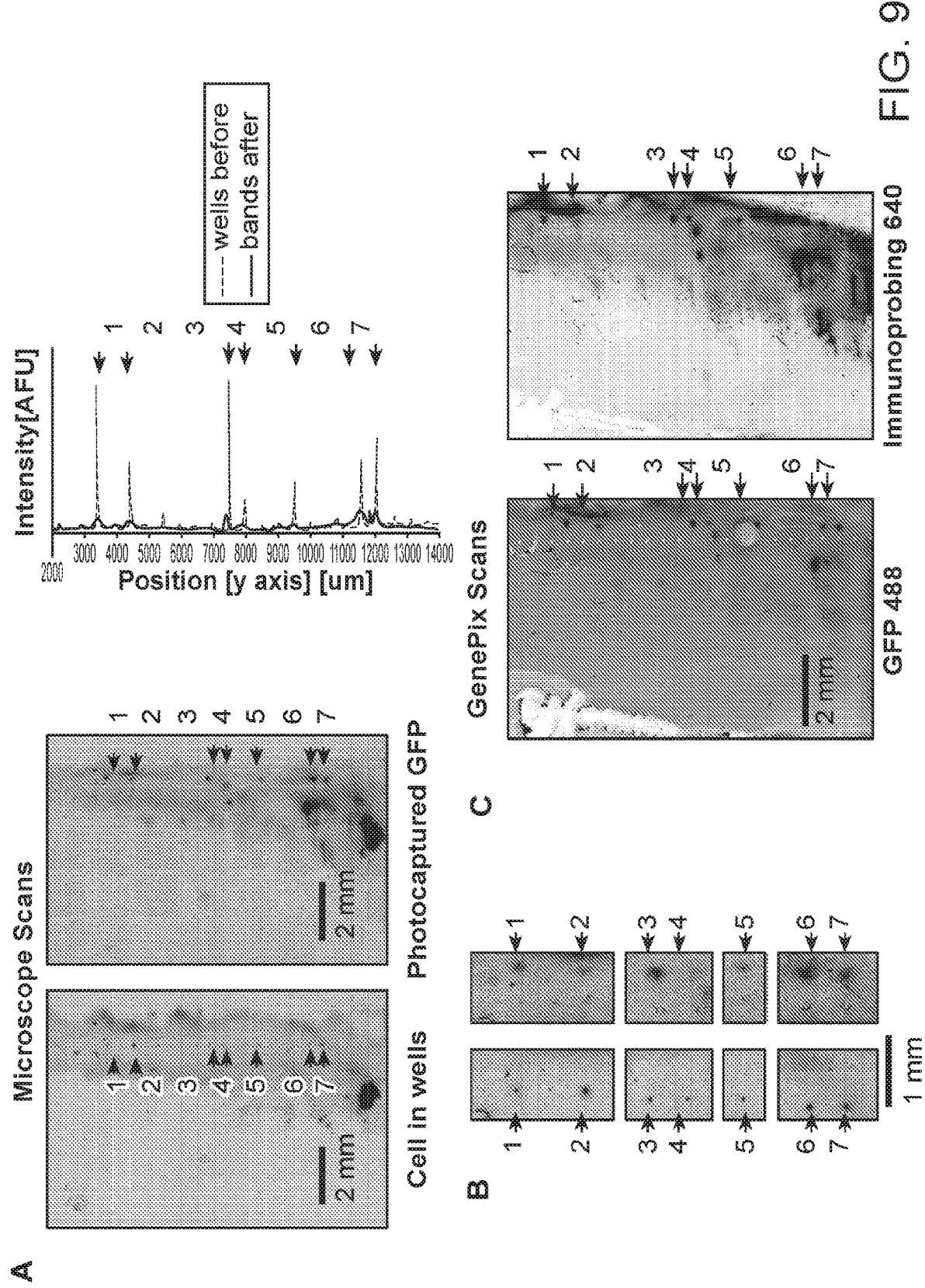
FIG. 9 shows images of TurboGFP immunoprobing after scIEF, according to embodiments of the present disclosure.

TurboGFP was a good model to characterize focusing in real-time. To be able to measure non-fluorescent endogenous proteins of interest, the immunoprobing capabilities of the device were tested. To shorten focusing times, devices were designed with wells on the acidic region (near the pI of turbo GFP), instead of at the center. Devices were scanned after cell settling and after BPMA mediated photocapture (FIG. 9, panel A). Because photocapture in IEF conditions was typically much lower than in SDS-PAGE conditions, photocapture was improved by increasing BPMA concentration from the typically used 3 mM, to 5 mM. Immunoprobing was performed via diffusive antibody introduction and washing to gel slides containing photocapture proteins (FIG. 9, panel C). Unlike with scWB, protein from cells not settled in wells was also focused, and may lead to background protein signal and contamination. In scWB, protein from lysed cells electromigrated, but was not focused at the same location as the protein from cells settled in wells.

This approach yielded parallel single cell IEF separations. Using this approach, the electrical interfacing was straightforward as only two terminal electrodes were needed, instead of having to electrically address each individual separation (as would be the case in an array of individual channels).

Cells can be loaded to the system in a variety of ways including using actively settling techniques such as the application of vacuum or centrifugation. Cell settling can also be directed via the use of microfluidics or other types of manifolds. Cells might be settled into wells of different sizes and geometries including channels patterned into the substrate. Wells might be avoided altogether, as IEF results in focusing, meaning cells could be loaded at random locations without needing the array of wells. The cells can come from cell lines, clinical samples, tissues, etc. In addition to cells, other types of samples can be tested such as organelles, whole microorganisms, small tissue sections, synthetic beads, vesicles, droplets, etc.

The pH gradient can be formed using multiple types of carrier ampholytes such as Servalyte, Biolyte, Pharmalyte, Ampholine, and Polybuffer. The boundary conditions can be formed using other reagents other than immobilines to buffer at the acidic and basic boundary conditions. Both the immobiline and carrier ampholyte composition can be tuned for the realization of the desired pH gradient range. The pH gradients can be formed using other approaches such as artificial pH gradients, immobilized pH gradients (IPGs), heating, etc. The protein samples analyzed can be in native or denatured states. The samples and focusing regions can contain urea, other detergent compositions, and other chemicals used for modification of samples. Delivery of lysis reagents can be performed with other approaches, such as using dried reagents on a different substrate, etc. Cell lysis can be performed via other approaches such as sonication, hydroxide generation, heating, mechanical lysis, etc. Arrays of pH gradients can be used for performing a grid of IEF separations.

Probing for detectable readout can be performed with antibodies, aptamers, lectins, Fab fragments, etc. These probing species may be labeled with fluorophores, linked to enzymes or DNA for signal amplification, etc. Readout can also be done by staining techniques such as silver staining, Coomasie Brilliant Blue, etc. Proteins can also be labeled prior to separation or fluorescent proteins can be expressed transgenically and non-fluorescent proteins can be fusions to fluorescent proteins. Readout of separating and resolved species can be done electrochemically, using capacitively coupled contactless conductivity, etc. IEF can be used as the first step for subsequent separations such as native PAGE, SDS-PAGE, etc. Activity assays can be performed after separation. Resolved species can also be analyzed via mass spectrometry for protein sequencing or further inquiry using matrix-assisted laser desorption/ionization or similar techniques.

Example 3

Single-Cell Isoelectric Focusing and pH Gradient Arrays
Summary

Immunoprobed isoelectric demonstration focusing of proteins from single cells is described in this example. Realization of these separations was made possible by development of an approach utilizing multifunctional hydrogels with the ability to spatially define pH gradient arrays. The isoelectric focusing was performed in thin 40 µm polyacrylidmide gel films bonded to glass slides. The polyacrylamide gel film contained molded microwells for single-cell settling and benzophenone groups for UV-mediated protein capture for downstream immunoprobing. The thin gel films were interfaced with a 500 µm thick free-standing gel structure containing photopatterned regions to spatially define the pH gradients necessary for isoelectric focusing, interface with electrodes, and deliver cell lysis reagents.

Detailed Description
Methods
Reagents and Materials 3-(Trimethoxysilyl)propyl methacrylate (98%), acetic acid (glacial, 99.7%, ACS grade), methanol (anhydrous, 99.8%), acrylamide/bis-acrylamide solution (29:1, electrophoresis grade), N,N,N',N'-tetramethylethylenediamine (TEMED, bioreagent, ~99%), ammonium persulfate (APS, ACS reagent, ≥98.0%), 3-[(3-Cholamidopropyl)dimethylammonio]-1-propanesulfonate (CHAPS, ≥98%, electrophoresis grade), digitonin (Used as non-ionic detergent), Triton™ X-100 detergent (laboratory grade), Polybuffer® 74 (PB74), Polybuffer® 96 (PB96), and fluorescent IEF markers were acquired from Sigma Aldrich (St. Louis, Mo.). The fluorescent pH markers used were pI 4.5 (1 mg/mL in 5 mM HCl), pI 5.5 (3 mg/mL in 15 mM HCl), pI 6.8 (1 mg/mL in 5 mM HCl), pI 8.1 (3 mg/mL in H2O). Polybuffers could also be used as a substitute for other carrier ampholytes such as Biolyte, Ampholine, Pharmalyte, and Servalyte. UV photoinitiator VA-086 was purchased from Wako Chemicals (Richmond, Va.). Immobiline II pK 3.6 and Immobiline II pK 9.3 were obtained from GE Healthcare Biosciences (Pittsburgh, Pa.). Trypsin:Ethylenediaminetetraacetic acid (EDTA) solution (0.05% trypsin and 0.53 mM EDTA) was acquired from Gemini Bio-Products (Sacramento, Calif.). 10×Phosphate-Buffered Saline (PBS) solutions (pH 7.4, MCB grade) was obtained from Mediatech (Manassas, Va.). N-[3-[(3-benzoylphenyl)formamido]propyl]methacrylamide (BPMAC) monomer was custom synthesized by PharmAgra Laboratories (Brevard, N.C.).

Purified recombinant wild-type GFP from Aequorea victoria (wtGFP) was sourced from Clontech (632373, Mountain View, Calif.). Purified recombinant TurboGFP was sourced from Evrogen (FP552, Moscow, Russia). Primary antibodies used in this study included rabbit anti-TurboGFP (PA5-22688, Pierce Antibody Products, Rockford, Ill.). Secondary antibodies used in this study include AlexaFluor 647-labeled donkey anti-rabbit IgG (1:30, A-31573, Life Technologies, Grand Island, N.Y.).

Cells Lines and Cell Culture

U373 MG human glioblastoma cells were obtained from the American Type Culture Collection via the UC Berkeley Tissue Culture facility and were stably transduced with TurboGFP by lentiviral infection (multiplicity of infection=10). Cells were cultured in house in high glucose DMEM (Life Technologies) supplemented with 1 mM sodium pyruvate (Life Technologies), 1×MEM non-essential amino acids (Life Technologies), 1% penicillin and streptomycin, and 10% fetal bovine serum (JR Scientific). Cells were grown at 37° C. with 5% CO2 in a humidified incubator. Prior to the experiment, cells were trypsinized, resuspended in 1×PBS, and kept on ice.

scIEF Device Fabrication

Covalent attachment of the PAG to plain glass microscope slides (VWR International, Radnor, Pa.) was achieved by acrylate-terminated silane monolayer formation using conventional techniques. Slides were used whole or cut to desired dimensions using a diamond scribe (Ted Pella Inc., Redding, Calif.) and Running and Nipping Pliers (Fletcher, East Berlin, Conn.).

SU8 2025 photoresist (Micro-Chem, Santa Clara, Calif.) molds on silicon wafers (University Wafer, Boston, Mass.) were fabricated as previously described (Hughes et al., 2014). The microposts were 32 μm in diameter and 40 μm tall. The row-to-row spacing was 500 μm. The gel slide used for containing samples and cells consisted of 40 μm thick 6% T (3.3% C) gel films containing 5 μM BPMAC with 32 μm diameter wells for cell settling and were fabricated using SU-8 wafers as molds and chemical PAG polymerization, as previously described (Hughes et al., 2014, Kang et al., 2014, Yamauchi et al., 2014). 1:100 dilutions of pI markers were included in the gel slide precursor when specified.

Figure 11:
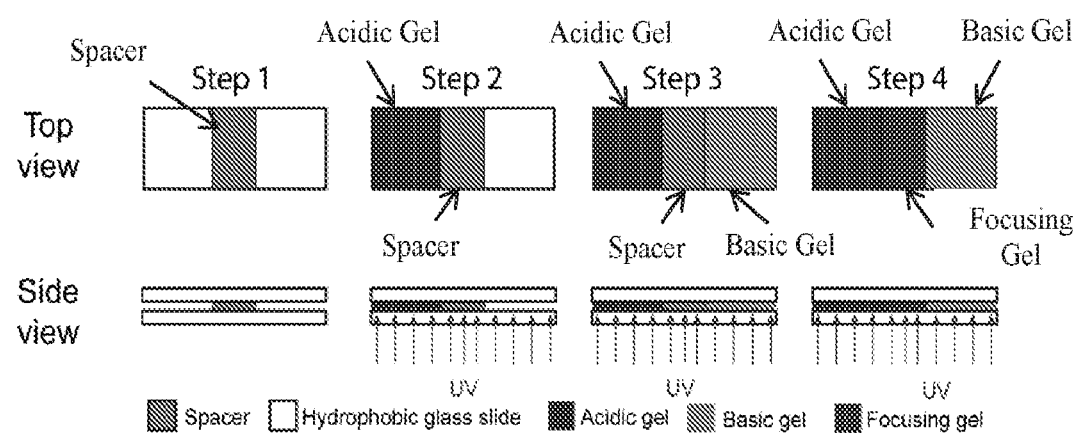
FIG. 11 shows a schematic of the molding protocol for gel lid fabrication. Step 1: a 0.5 mm thick spacer that is the width of the focusing region was placed between two hydrophobic glass plates. The glass plates were sized such that they match the size of the gel lid. Step 2: the acidic gel precursor was introduced between the glass plates on the acidic boundary of the gel lid. The acidic gel was polymerized with UV light. Step 3: the remaining acidic precursor was washed out and the basic precursor was introduced to the other side and photopolymerized. Step 4: the spacer was removed and the focusing region precursor was introduced and polymerized.

The free-standing 15% T (3.3% C) PAG lids were fabricated using two different multistep photopolymerization methods. The basic and acidic regions in the gel lid contained combinations of Immobilines to buffer at acidic and basic pH values. Using patterned PAG regions containing Immobilines obviated the use of liquid buffers which if introduced into the focusing region would disrupt pH gradient formation. The focusing region in the gel contained 1:10 dilutions of PB74 and PB96 as the carrier ampholytes, and 3.6% (w/v) CHAPS, 1% (v/v) Triton x-100, and 0.0125% (w/v) digitonin as detergents for cell lysis and protein solubilization, as specified in FIG. 10. Ionic detergents such as sodium dodecyl sulfate (SDS) were incompatible with IEF. For IEF with denaturing conditions urea could be used. PAG precursor was loaded between glass surfaces rendered hydrophobic with Gel Slick (Lonza, Rockland, Me.). Lids with a single 9 mm wide region were formed using molding with 500 μm thick, 9 mm wide spacers were obtained from C.B.S. Scientific (Del Mar, Calif.) (FIG. 11).

Figure 12:
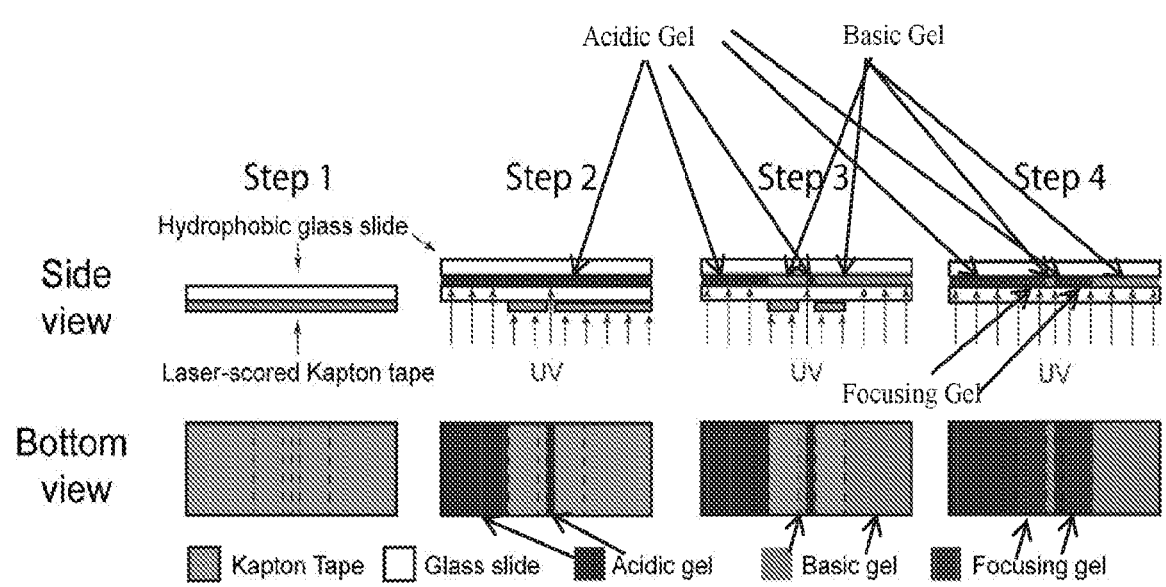
FIG. 12 shows a schematic of the photopatterning method for gel lid fabrication. Step 1: A hydrophobic glass plate is backed with UV-blocking Kapton tape. The outlines of the patterned regions were scored with a laser cutter. Step 2: a second glass plate was placed over the first glass plate, separated by two 0.5 mm spacers. The regions of the Kapton tape corresponding with the acidic gel were removed. The acidic gel precursor was introduced between the glass plates and photopolymerized. Step 3: the remaining acidic gel precursor was washed away and the Kapton tape corresponding with the basic gel regions was removed. The basic gel precursor was introduced between the glass plates and photopolymerized. Step 4: the remaining basic gel precursor was washed away and the Kapton tape corresponding with the focusing gel regions was removed. The focusing gel precursor was introduced between the glass plates and photopolymerized.

For the back-to-back pH gradient gel lids, a multistep photopolymerization process was used. First, an adherent polyimide film (Kapton tape, Dupont, Hayward, Calif.) was placed on the back of a glass plate rendered hydrophobic. Then the outline of all of the photopatterning regions was scored using a laser cutter (Full Spectrum Engineering, Las Vegas, Nev.). The polyimide film blocks ultraviolet light and thus acted as a photomasks at each exposure step for the specified regions (FIG. 12). UV excitation was provided by an OAI Model 30 Collimated UV light source (San Jose, Calif.). 4 min exposure times at 20 mW cm-2 powers attenuated through a 390 nm longpass UV filter (Edmund Optics, Barrington, N.J.) were used.

With the molding approach, the size of the specified gel regions could be affected by gel tearing when spacers were removed. With the photopatterning approach, the size of the resulting gel regions could be affected by light diffraction and free radical diffusion. All pH measurements were done with a Twin Compact pH Meter (Horiba Scientific, Edison, N.J.).

scIEF Experimental Protocols

Cell setting into the well arrays on the gel slide was performed by first creating a single cell suspension in 1×PBS phosphate-buffered saline (106 cells mL-1). Gel slides were dehydrated with a nitrogen stream and the cell suspension was pipetted directly over the microwells on the gel slide. Cells were settled in 4° C. 1×PBS for 10 min and then slides were rinsed twice with a buffer containing carrier ampholytes but no detergents. After the application of the gel lid over the gel slide, lysis was performed via diffusive introduction of detergents from the lid into the gel slide for 30-60 s, prior to electric field application.

Focusing was performed in a custom 3D-printed ABS electrophoresis chamber (MakerBot, New York, N.Y.). The lid was electrically addressed with graphite bar electrodes (McMaster Carr, Chicago Ill.) embedded in the floor of the electrophoresis chamber. A potential difference of 600 V was then applied for IEF using a PowerPac® high-voltage power supply (Bio-Rad).

Following IEF separation, BPMAC-mediated protein photocapture to the gel matrix in the gel slide was done using UV light exposure from a Hamamatsu Lightningcure LC5 unit (Bridgewater, N.J.) through a Lumatec series 380 liquid light guide (Deisenhofen, Germany) with an inline UV filter (300- to 380-nm bandpass, XF1001, Omega Optical) suspended approximately 5 cm above the slide for 45 s with powers of approximately 400 mW/cm2 at the slide surface (320-400 nm UV meter; C6080-365, Hamamatsu)., as previously described (Hughes et al., 2014, Kang et al., 2014).

Immunoprobing

Probing was done by first placing the gel slide face-down against glass, suspended by 80 μm thick spacers of Kapton tape from DuPont (Hayward, Calif.). The probing solution containing 1:30 (v/v) dilutions of antibodies in Tris-buffered saline with Tween 20 (Santa Cruz Biotechnology, Santa Cruz, Calif.) was then introduced in the space between the gel and the glass.

Imaging, Image Processing, and Data Analysis

Imaging was conducted using an Olympus IX71 inverted fluorescence microscope (Shinjuku, Tokyo) equipped with an EMCCD camera iXon3 885 (Andor, Belfast, Northern Ireland), a motorized stage (Applied Scientific Instrumentation, Eugene, Oreg.), an automated filter cube turret controlled by MetaMorph software (Molecular Devices, Sunnydale, Calif.), and an X-Cite Exacte mercury arc lamp illumination source coupled to an automated shutter and attenuation system (Lumen Dynamics, Mississauga, ON, Canada) through 4× (Olympus UPlanFI, NA 0.13) and 10× (Olympus UPlanFI, NA 0.3) objective lenses, as specified. UV channel imaging was performed with a custom UV-longpass filter cube (XF1001, excitation 300-380 nm; XF3097, emission >410 nm) and green channel imaging was done using a filter cube optimized for GFP (XF100-3, excitation 445-495 nm, emission 508-583 nm) (Omega Optical).

Whole-device imaging was conducted using the Scan Slide function in MetaMorph. Gel slides were scanned using a GenePix 4300A fluorescence microarray scanner (Molecular Devices) after protein photocapture, immunoprobing, and wash steps. TurboGFP was imaged with the 488 nm excitation laser and the AF488 emission filter. Anti-TurboGFP was imaged with the 635 nm excitation laser and the AF647 emission filter.

MATLAB (MathWorks, Natick, Mass.) and ImageJ (NIH, Bethesda, Md.) scripts for Gaussian curve fitting and peak tracking written in-house were used to determine analyte band positions, widths, and other conventional peak parameters.

pH Gradient Characterization pH gradient characterization experiments were imaged using slide scanning at 4× magnification. Protein band peak capacity and ΔpI error bars reflect the standard deviation of the average band width from 3 protein isoforms that did not have the same width and additionally band broadening occurred due to the 500 μm high window averaging (FIG. 14, panel D, FIG. 14, panel E). pH marker diffusion in the y-axis led to focusing outside of the height of the gel slide (FIG. 14, panel A, FIG. 16, panel A), however due to the lower diffusivity of wtGFP compared to the pH markers, less protein was observed outside of the height of the gel lid (FIG. 14, panel A, FIG. 15, panel A-B).

Figure 14:
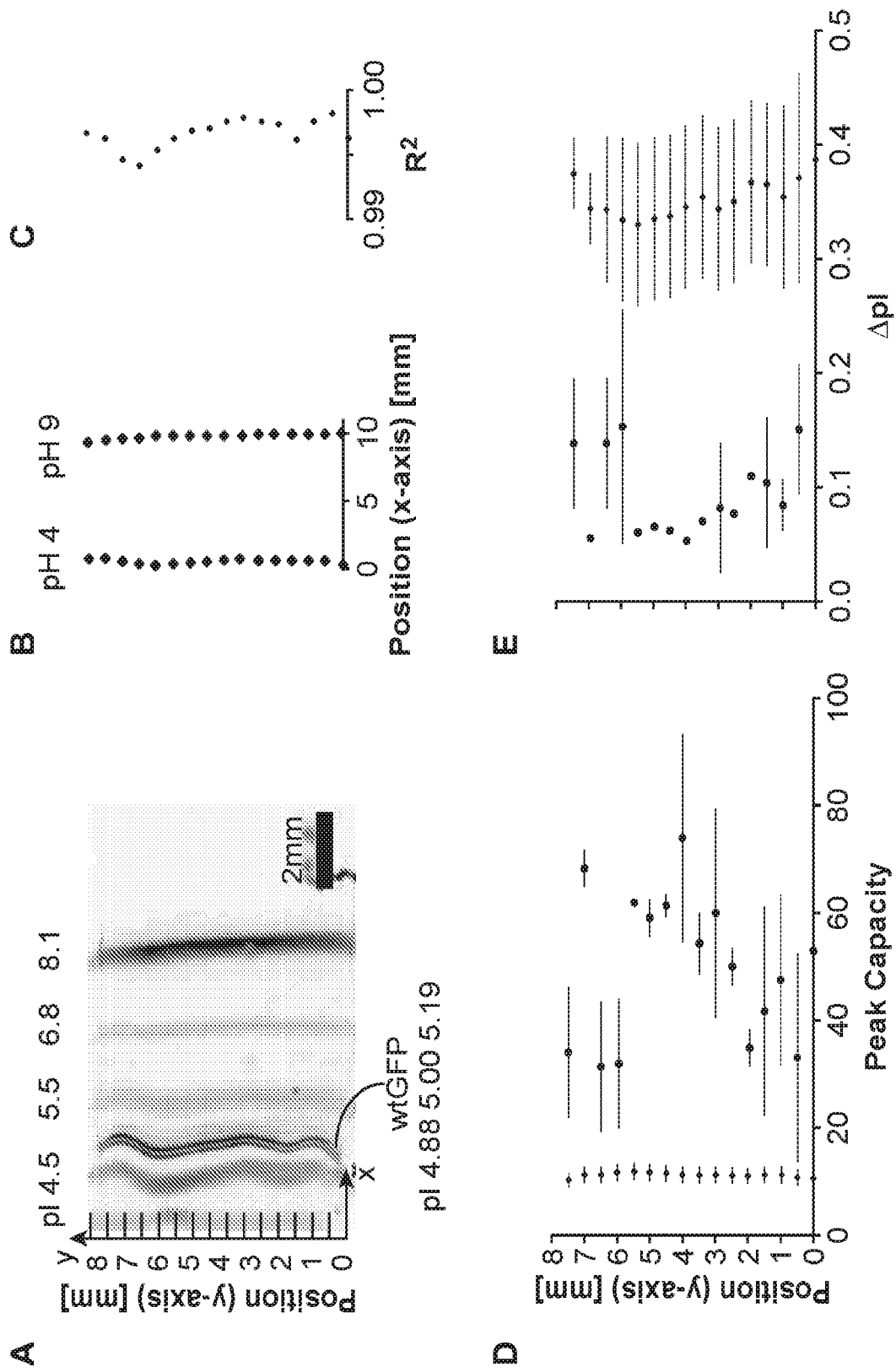
FIG. 14 shows the pH gradient characterization. The gel slide (25×8 mm) contained the fluorescent pH markers and wtGFP and the patterned lid was 50×25 mm with a 9 mm wide focusing region.
Figure 15:
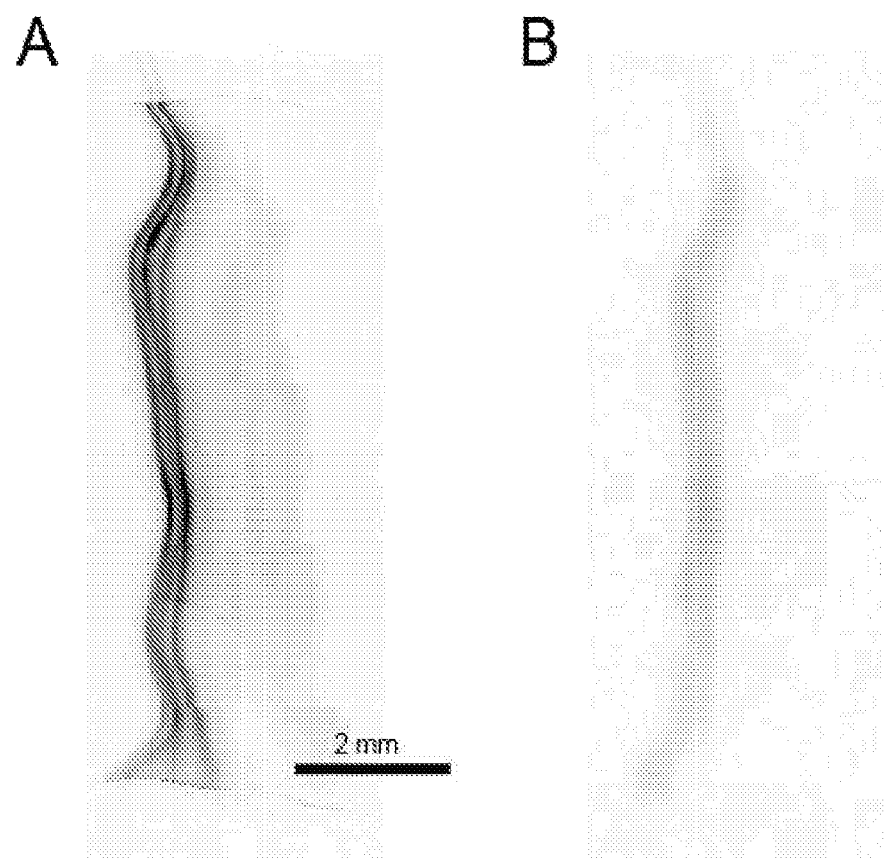
FIG. 15 shows turboGFP protein losses to gel lid during IEF.
Figure 16:
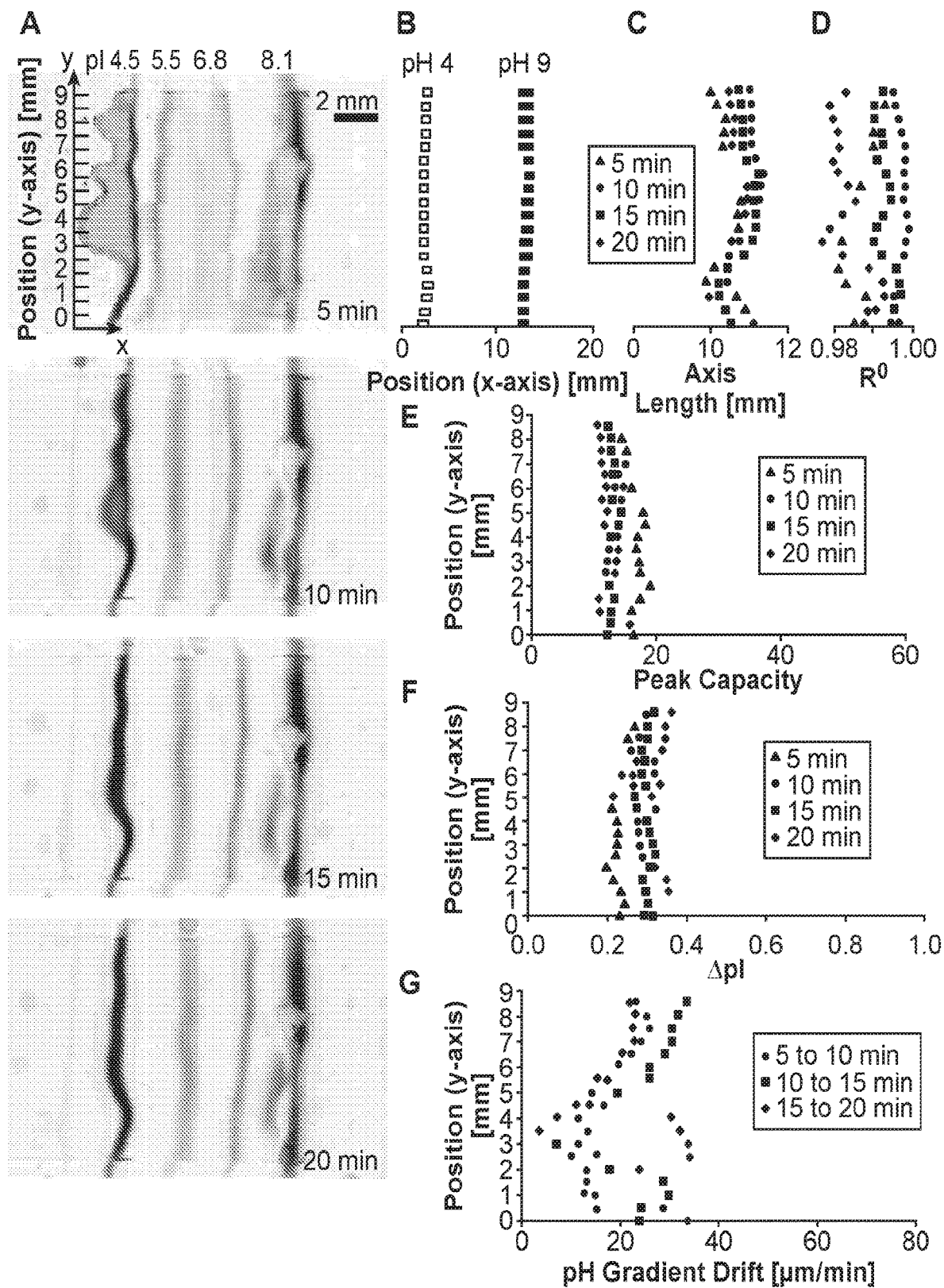
FIG. 16 shows the pH gradient characterization over time.

To characterize IEF over time, IEF was performed on the scIEF geometry using the same conditions as in FIG. 14 in the present disclosure (FIG. 16). wtGFP was not included in this experiment. The gel slide (25×9 mm) contained the pH markers (pH 4.5, pH 5.5, pH 6.8, pH 8.1, 1:100 dilution) and the patterned lid was 50×25 mm with a 9 mm wide focusing region. After a 1 minute incubation time after application of the gel lid on to the gel slide, 600 V was applied for IEF. 4× whole slide scans were taken every 5 min to track the position of the pH gradient using the fluorescent pH markers. The position and width of the pH markers was measured at every 500 μm and averaged in y direction. 500 μm corresponds to the spacing of the separate lanes for scIEF. The position, length, and linearity of the pH gradient along with peak capacity and minimum resolvable pI difference were determined from pH marker widths and positions. The bands were not aligned in the scan at 5 min because the pH markers were still focusing (FIG. 16, panel A). Drift was calculated by measuring average band position changes at the 5 min intervals. The average drift for the timepoints was determined to be 20.78±3.24 μm/min (FIG. 16, panel G).

Single-Cell TurboGFP Focusing Characterization

Figure 13:
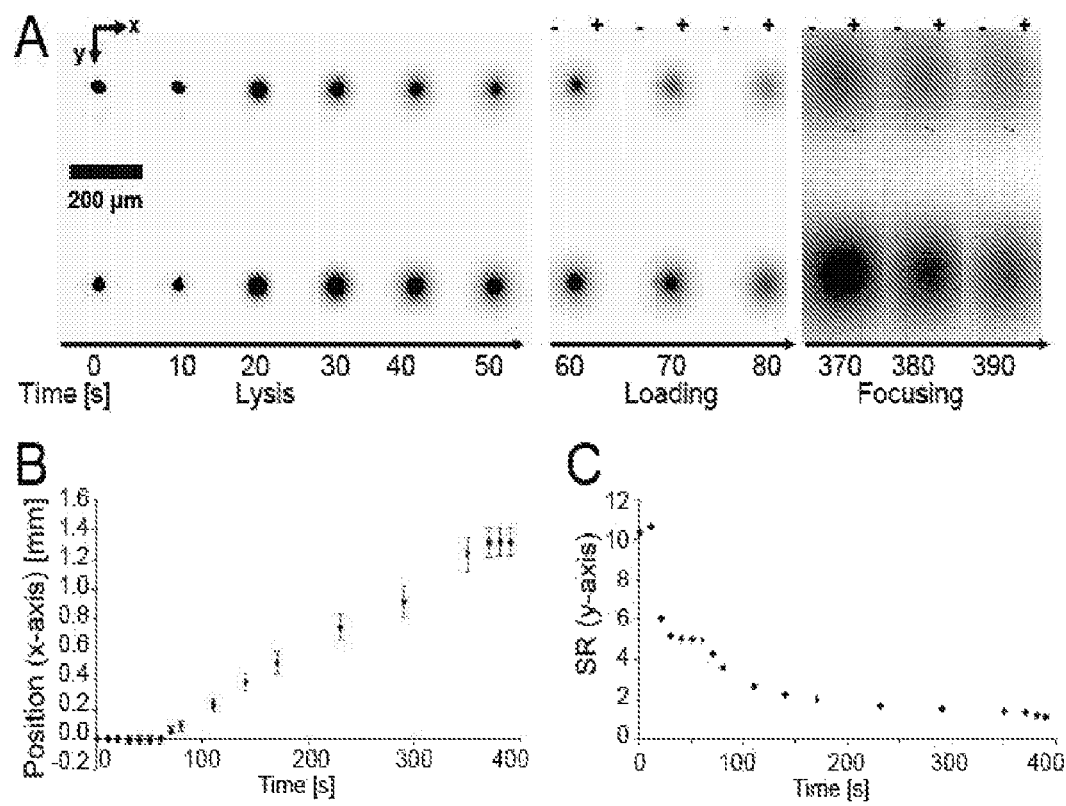
FIG. 13 shows characterization of single-cell lysis, protein loading, and protein focusing.
Figure 17:
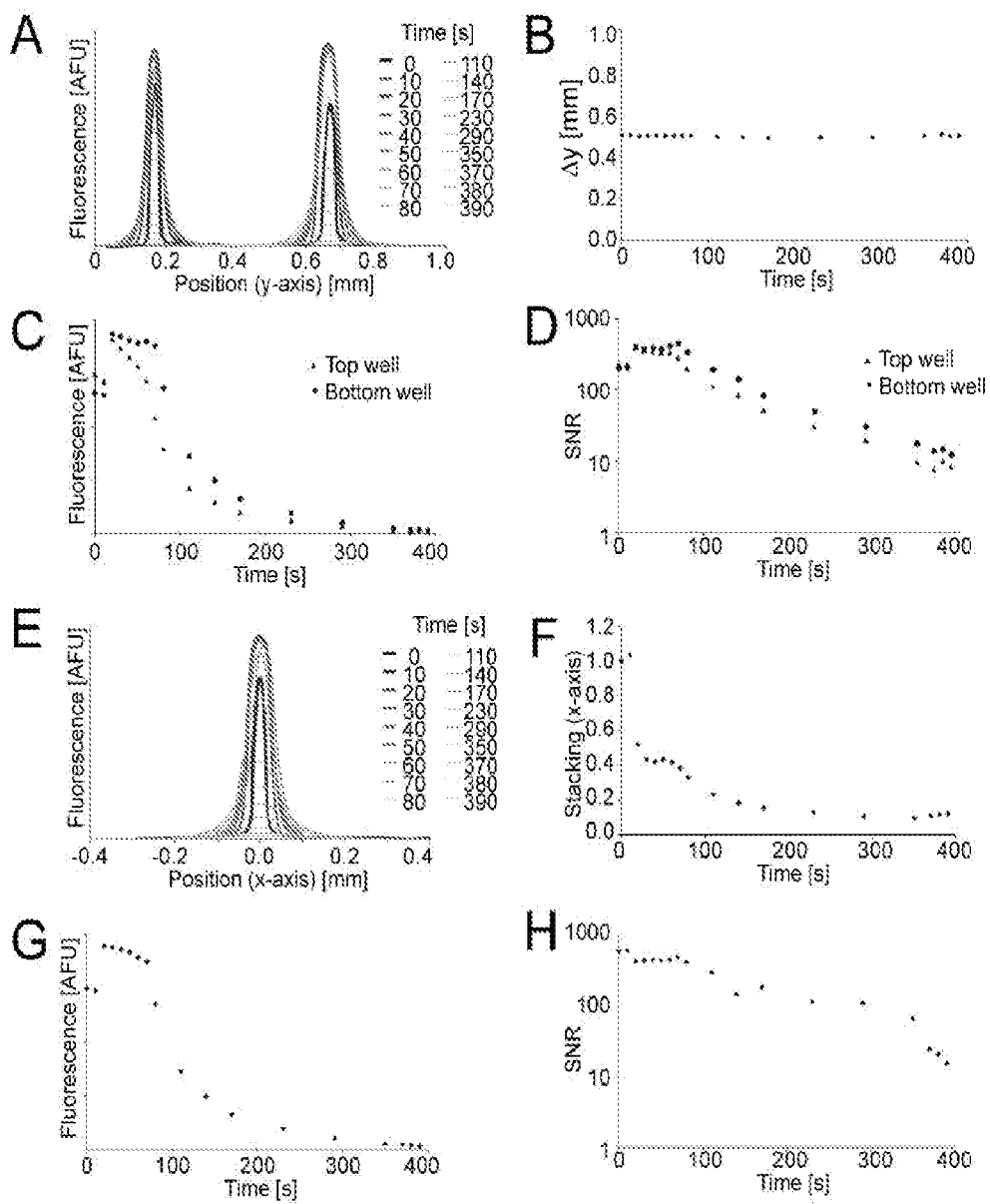
FIG. 17 shows additional characterization of single-cell lysis, protein loading, and protein focusing. Data collected from the same set as shown in FIG. 13. Intensity profiles obtained by averaging intensities in a window proportional to well width.

IEF from single cells was characterized using real-time imaging (10× magnification) of TurboGFP expressed in U373 cells (FIG. 13 and FIG. 17). During injection, ~4% stacking (measured as x-axis band width normalized by initial band width σx/σx0) was observed as the proteins entered the 6% T PAG gel from the free solution well (FIG. 17, panel F). Interestingly, in this system enrichment was not observed in the x-axis upon IEF completion from the starting concentration in the cell; the initial band width (dictated by well size) was narrower than the size of the focused zones. GFP band width (x-axis) from single cells after 5 min of focusing (FIG. 17, panel E) was within 50% of the band width from purified proteins after 10 min of focusing (FIG. 14, panel A).

Results

Variations in cell populations are of biological importance in cancer and developmental biology. This heterogeneity is expressed at the level of post-translational modifications. Thus, for many post-translational modifications, the single cell western blotting still relies on specific antibodies to resolve the different isoforms. Isoelectric focusing (IEF) separates analytes by isoelectric point (pI), making the assay useful for detection of protein isoforms and post-translational modifications with small differences in molecular weight, but detectable pI shifts. Protein pI is a physico-chemical property determined by amino acid composition, three-dimensional conformation, and modified chemical groups that affect protein charge. pI differences in protein isoforms are generally attributable to post-translational modifications including enzymatic glycosylation or primary sequence cleavage processes occurring within the cell. IEF can resolve a single electrostatic charge difference between protein isoforms, making IEF a powerful tool for the study of biophysical phenomena. IEF separation occurs when an electric field is applied along the axis of a stable pH gradient, commonly formed by polyprotic amphoteric buffers called carrier ampholytes. In the present disclosure, the realization of immunoprobed single-cell IEF (scIEF) from arrays of single cells was developed.

Figure 18:
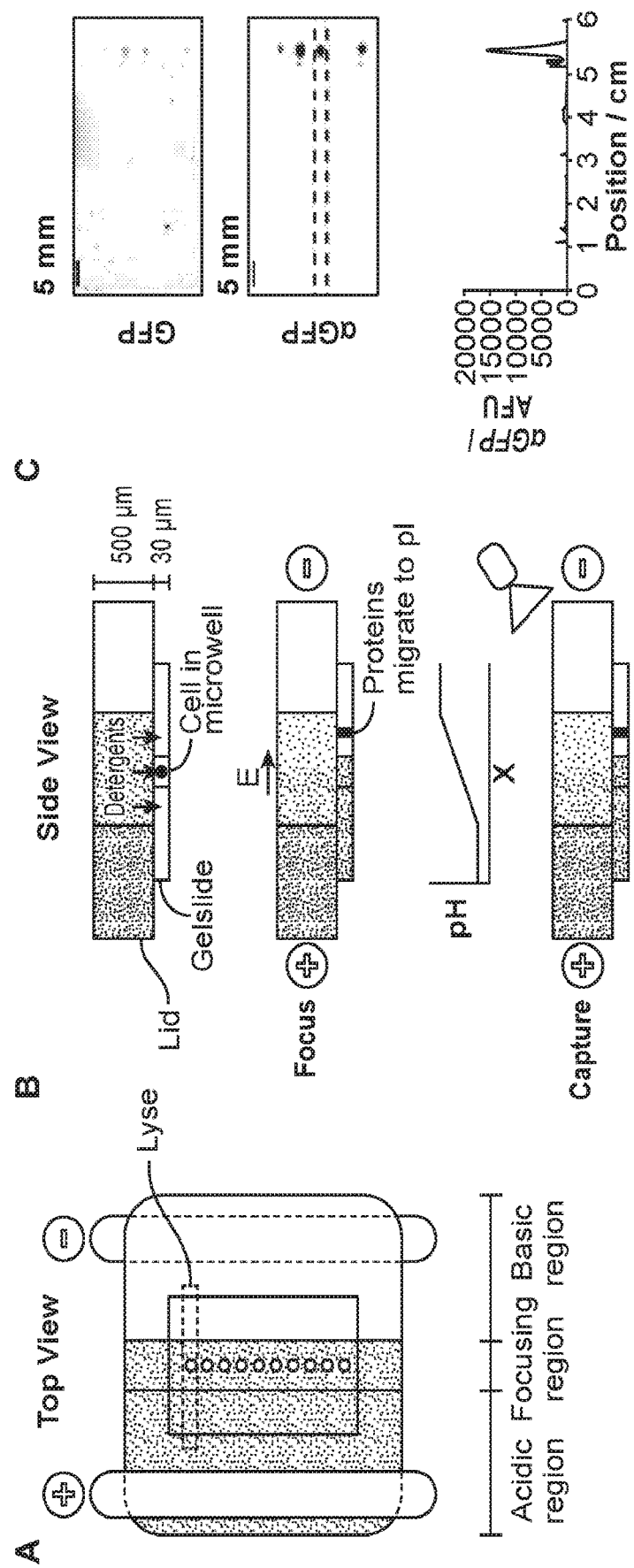
FIG. 18 shows the scIEF assay schematic.

In order to address the low sample mass in single-cell protein separations, a micropatterned, multifunctional polyacrylamide gel (PAG) was utilized with short separation axes (3-9 mm) for minimal lysis dilution and diffusive losses during the separation (FIG. 18). The PAG is a 40 μm thick film attached to a glass slide featuring molded microwells for spacing single-cell settling into an array via settling. The pH gradient necessary for IEF was generated in this PAG sieving matrix, (Vesterberg et al., 1972, Righetti et al., 1974), which was functionalized with benzophenone for UV-mediated photoimmobilization of the proteins after separation (Hughes et al., 2014, Kang et al., 2014).

Figure 20:
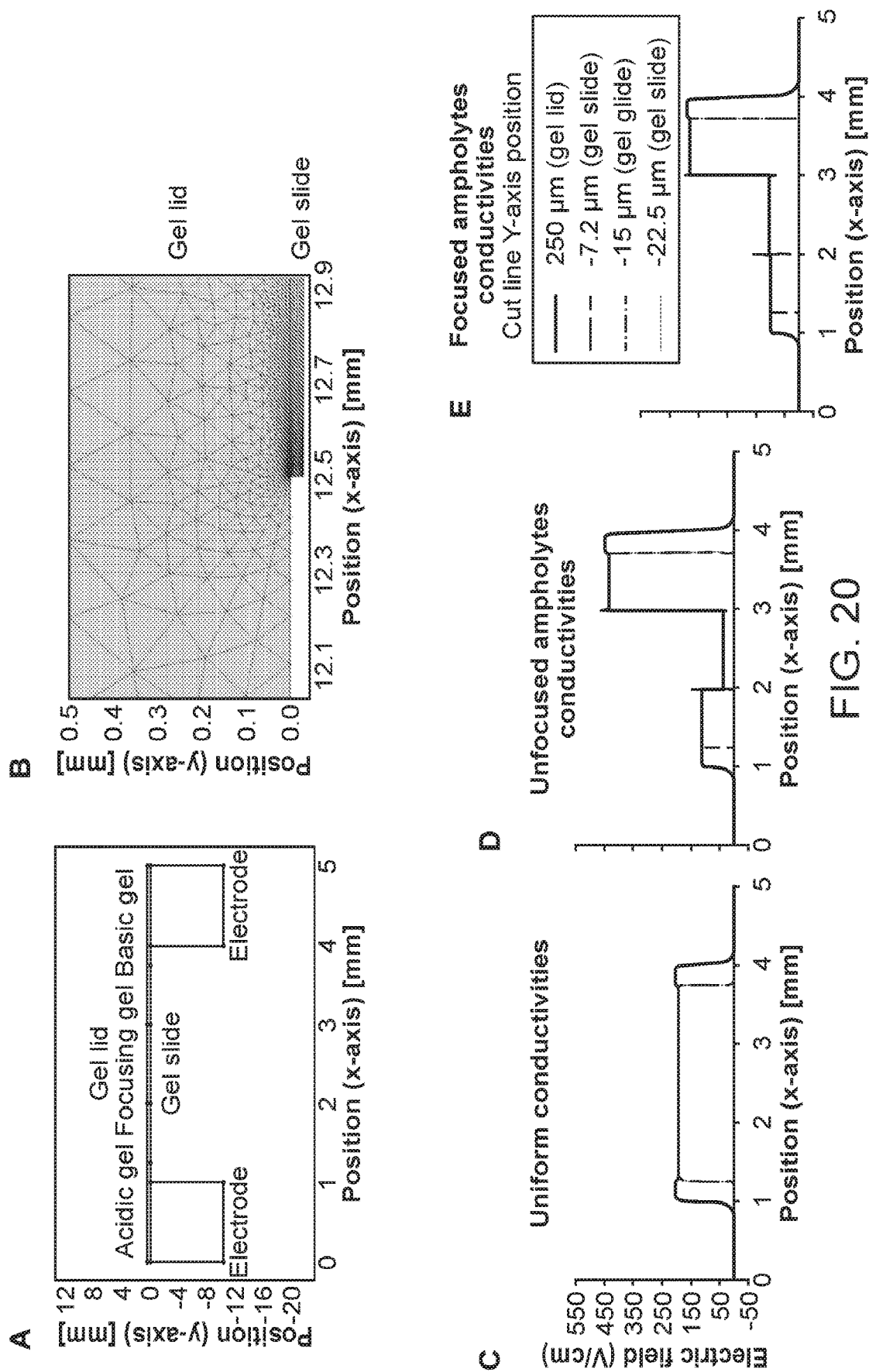
FIG. 20 shows the COMSOL simulations of the electric field in scIEF geometry.

To address the challenge of lysing cells without disrupting the pH gradient a second PAG lid was utilized to deliver the lysis reagents and form the pH gradient. The gel lid was patterned with the 3 distinct chemistries necessary for the formation of the pH gradient: a basic boundary, a focusing region with carrier ampholytes, and an acidic boundary. The basic and acidic boundary were specified using Immobilines. Immobilines were weak acrylamido acids and bases that were copolymerized at different stoichiometries into the PAG to buffer at specific pH values. The focusing region of the gel lid contains carrier ampholytes for the formation of the pH gradient and the lysis reagents. The basic and acidic regions in the gel lid were utilized to directly interface with the electrodes. Due to the lower conductivity of the regions not containing only a fraction of the applied potential difference dropping across the focusing region (FIG. 19). From COMSOL simulations of the electrical potential in on the system geometry, the electrical potential in the thin 40 μm gel slide was observed to be dominated by the thicker 500 μm gel lid, making the electric field the same in both gels (FIG. 20). The thinness of the gel slide enabled rapid (0.1 to 12 s) diffusive introduction of reagents with minimal dilution from gel lid (FIG. 21). Comparing the volumes of the gel lid and the gel slide, detergents get diluted by ~7.41%. from their initial concentration in the gel lid.

As a demonstration of the pH gradient patterning with the gel lid, isoelectric focusing of wtGFP and pH markers was performed (FIG. 14). The gel slide could be wider than the focusing region on the gel lid and making the gel lid taller (y-axis) than gel slide improved focusing uniformity since it avoids edge effects such as dehydration at the edges of the focusing region. The resulting pH gradients were linear and uniform at the measured y-axis positions that corresponded to individual scIEF lanes. The pH gradients had endpoints of pH 4 and pH 9 at the average position of 482.31±150.45 and 9772.63±162.98 μm, respectively, with an average length of 9290.33±262.15 μm (FIG. 14, panel B) and an average R2 of 1.00±0.00 (FIG. 14, panel D). Peak capacity, a metric used to determine the number of different bands that could be resolved in a given separation was determine using Equation 1, where the pH axis length L was the measured length of the pH gradient and σ is the standard deviation of the fitted Gaussian curve as a measure of band width:

$$\text{Peak Capacity} = \frac{L}{4\sigma}. \quad \text{(Equation 1)}$$

Average peak capacity of the 500 µm lanes was 11.14±0.46 calculated using the pH marker band widths and 49.62±13.86 calculated using the wtGFP isoform band widths (FIG. 14, panel D). Average minimum resolvable pI difference ΔpI of the 500 µm lanes was 0.35±0.02 calculated using the pH marker band widths and 0.09±0.03 calculated using the wtGFP isoform band widths in Equation 2 where dpH/dx is the slope of the pH gradient (FIG. 14, panel E):

$$\Delta pI = 3\sigma\left(\frac{dpH}{dx}\right). \quad \text{(Equation 2)}$$

The larger variability per lane in peak capacity and ΔpI for the wtGFP protein isoforms compared to the pH markers resulted from the y-axis averaging of the 500 µm lanes of the thinner bands. In windows where the focused bands were less vertical, the averaging in the window results in effective band width increases. The pH gradient was stable over the course of 20 min (FIG. 16). By taking scans at 5 min intervals after the start of focusing, it was determined that the gradient was stable with cathodic drifts 20.78±3.24 (FIG. 16, panel G), which were within the range of previously reported literature values of approximately 10 µm/min for confined microchamber IEF and approximately 70 µm/min for single channel IEF (Tentori et al., 2013). Utilizing a gel lid with patterned Immobiline acidic and basic regions enabled the formation of uniform pH gradients on the gel slide even if the gel slide was wider (x-axis) than the focusing region on the gel lid.

Figure 22:
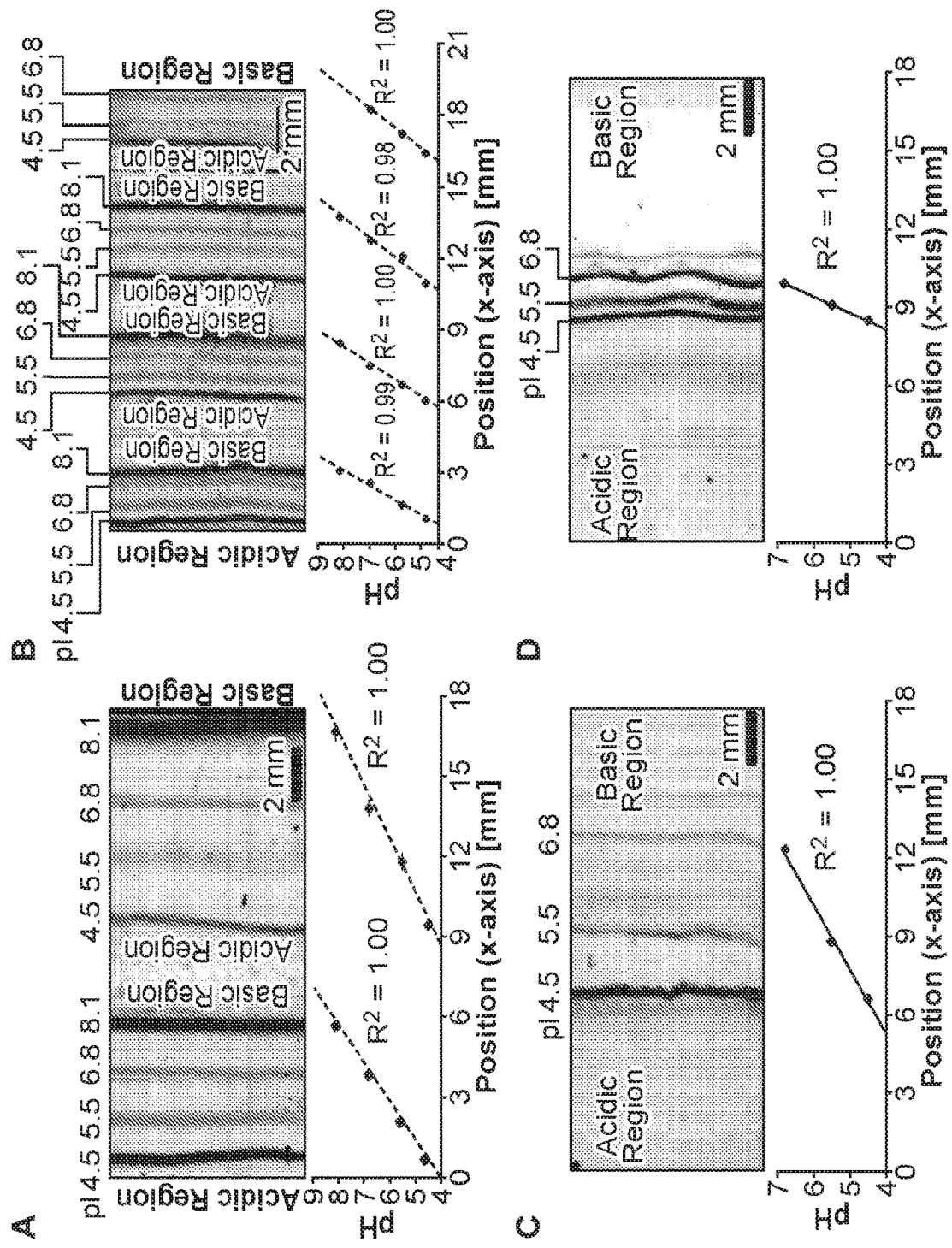
FIG. 22 shows gel lid-based pH gradient patterning. Photopatterning used to form pH gradients of different lengths and extent, including back-to-back pH gradients on the same slide. Inverted UV fluorescence micrograph fluorescent pH markers in the scIEF system with different pH gradients. Plots show the position of the pH markers obtained from a 500 µm high window at the center of the image. Dotted line is the linear fit and the error bars indicate the band width σ.

This pH gradient patterning approach was highly tunable, which enabled the creation of pH gradients of different lengths, slopes, and even back-to-back pH gradients for IEF arrays (FIG. 22). The back-to-back 4-9 pH 9 mm gradients (FIG. 22) had peak capacities of 9.05±2.72 and 13.48±8.20 and ΔpI 0.44±0.11 and 0.38±0.22, comparable to the individual pH gradient (FIG. 14). As an extension of this pH patterning approach, four 3 mm back-to-back pH gradients was formed (FIG. 14, panel B). The shallower 4-7 pH, 9 mm long had peak capacity of 17±2.41 and ΔpI of 0.13±0.02 (FIG. 22, panel C). The lower peak capacity compared to steeper 4-9 pH gradient in a 9 mm focusing region (FIG. 14) matched what was expected due to the wider bands predicted from theory:

$$\sigma = \sqrt{DE^{-1}\left(\frac{dpH}{dx}\right)^{-1}\left(-\frac{du}{dpH}\right)^{-1}} \quad \text{(Equation 3)}$$

where D is the diffusivity, E is the magnitude of electric field, and du/dpH is the mobility slope. From Equation 2, it was seen that the shallower slope does predict an overall decrease in ΔpI despite the wider bands. Confining the shallow 4-7 pH gradient to a 3 mm length resulted in peak capacity of 5.84±1.74 and ΔpI=0.41±0.15 (FIG. 22, panel D). The decrease in peak capacity and increase in ΔpI were predicted by Equations 1-3 due to the decrease in axis length that did not compensate for the narrower bands. This shallow and narrow pH gradient allowed to nearly match the resolution of the 9 mm long 4-9 pH regions (FIG. 14, panel E) in a 3× shorter region, which enabled faster focusing and higher multiplexing, while retaining the ability to focus most proteins since 70% of proteins have pIs below pH 7.

In order to characterize the losses in scIEF, real-time imaging of the lysis and focusing of TurboGFP was performed from TurboGFP-expressing U373 cells (FIG. 13). After a 60 s lysis and 310 s focusing time Turbo GFP reached its pI as confirmed by the halting of band migration (FIG. 13, panel B) and narrowing in band width by ~20% in the x-axis (FIG. 13, panel B and FIG. 17). The 500 µm spacing between the wells was chosen as the focusing bands remained resolved in the y-axis with separation resolution (SR) of ~1.2 at t=390 when the bands were focused, ensuring no overlap between the signals of each lane. SR was determined by comparing the difference in the position of the center of the bands in the y-axis Δy to band width σ:

$$SR = \frac{\Delta y}{4\sigma} \quad \text{(Equation 4)}$$

This change in SR was due to band broadening in the y-axis due to diffusion, as focusing only occurs in the x-axis. The spacing in the y-axis between the two bands was maintained with an average distance of ~495 µm with only ~1% variation showing uniform migration (FIG. 17, panel B).

Figure 23:
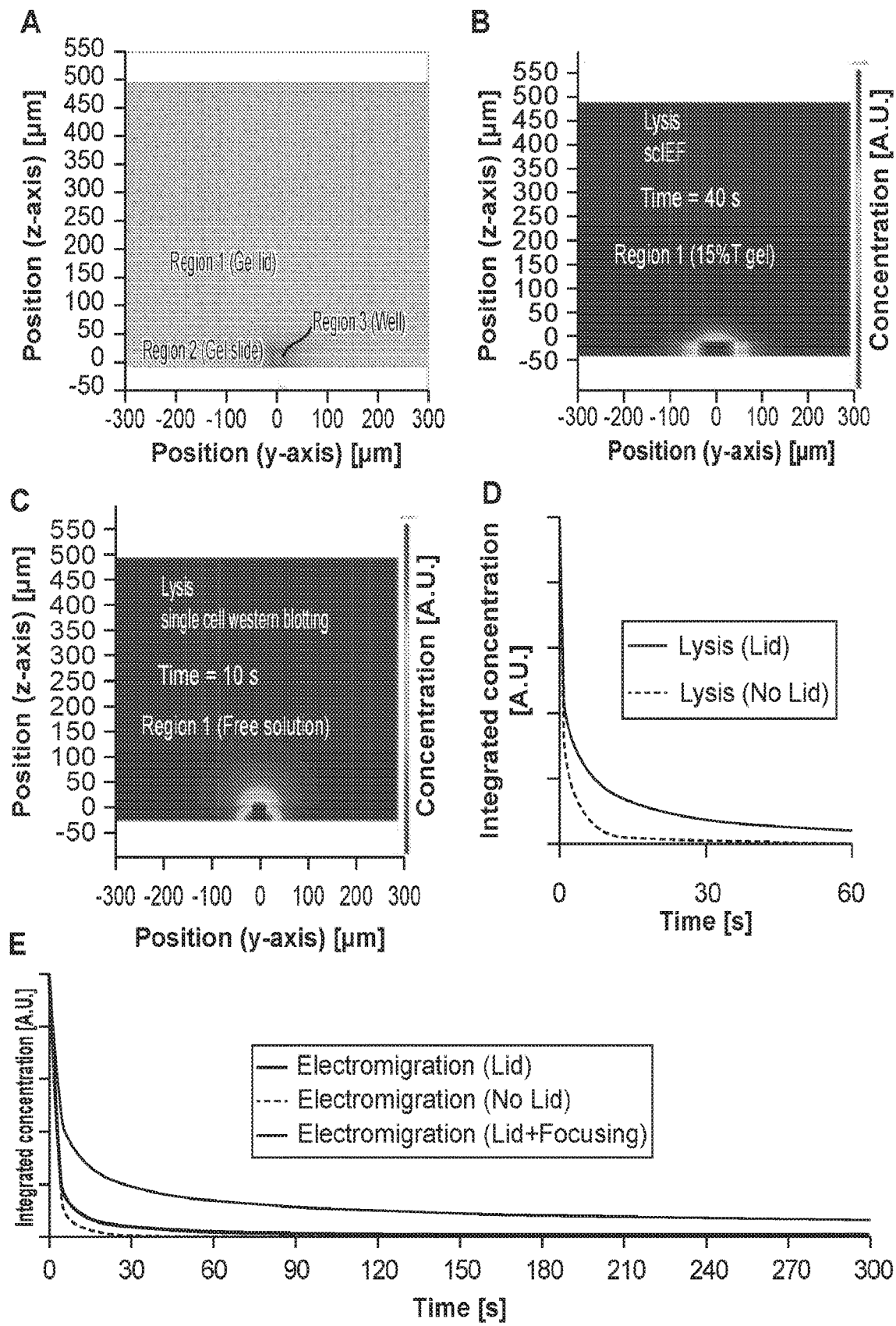
FIG. 23 shows COMSOL simulations of protein losses.

In single cell separations, losses were a primary concern due to the low starting protein mass (median protein expression: 50000-170000 copies cell-1). Despite starting out at a high concentration inside the cell (20 nM for a median expressed protein in a 30 µm diameter sphere) over time, diffusion will lead to losses. In the scIEF platform, there were several key differences in the losses that enabled the longer separations required for IEF (~minutes vs. ~10 s of seconds for single cell western blotting). First, despite the lower protein benzophenone-mediated capture efficiencies in IEF buffers vs. western blotting buffers, in IEF the gel matrix was not used for sieving thus permitting the increase in benzophenone concentration without worrying about altering the sieving properties of the gel matrix. Additionally, not having to use the PAG for sieving also allowed the use of lower density gels to facilitate diffusive antibody proving and avoids needing to tune gel density for specific molecular weight separations. Additionally, the focusing nature of IEF meant that injected proteins accumulated at the pI, thus not having to worry about streaky injections affecting sensitivity and resolving power. Losses during separation were also mitigated due the focusing in the x-axis, constraining diffusive losses to two dimensions, instead of three (FIG. 23). Losses during the two stages (lysis and focusing) in the z-axis out of the gel slide were mitigated by chemical partitioning into the denser gel lid, while in single cell western blotting a free solution bath was typically used, these two stages were visible in FIG. 13, panel C. During focusing fluorescence decreased by ~2 orders of magnitude, but SNR remained high (>8) for both cells (FIG. 6, panel A, FIG. 17). After 10 min of focusing, 15% of TurboGFP diffused into and focused on the gel lid (FIG. 15)

The present disclosure demonstrates the ability to perform parallel IEF separations from single cells for the first time. The method described in the present disclosure has a high degree of customization, as the pH gradient composition and length could easily be tuned for the desired application. Additionally, an approach for the formation of back-to-back pH gradients was showcased for increasing the multiplexing of IEF arrays.

Microfluidic Glass Device Fabrication and Operation

Various characterization studies and parameter estimations were done using microfluidic glass devices. Soda lime glass devices were designed, fabricated, functionalized with acrylate-terminated monolayers, and filled with photopolymerized PAG, using conventional methods. Chip layouts containing a 70 µm wide and 10.4 mm long channel between ~2 mm diameter well reservoirs were designed using AutoCAD 2011 (Autodesk Inc., San Rafael, Calif.). 20 µm deep features were fabricated on the glass chips using standard wet etching processing by Caliper Life Sciences (a PerkinElmer Company, Hopkinton, Mass.) using the designed chrome-glass photomask (Photo Sciences Inc., Torrance, Calif.). Fluid access well drilling and thermal bonding were done by Caliper.

Covalent attachment of the polyacrylamide gel to the channel walls was achieved by acrylate-terminated silane monolayer formation on the channel walls using conventional methods. Channels were first washed with 1 M NaOH for 10 min, then rinsed with DI water, and then purged by vacuum. A degassed 2:3:5 (v/v/v) mixture of 3-(trimethoxysilyl)-propyl methacrylate, acetic acid, and DI water was then introduced into the channels for the silane monolayer formation. After 30 min, the channels were rinsed with methanol and DI water and then purged by vacuum. An analogous protocol was used to form the silane monolayers on glass slides (Hughes et al., 2014, Kang et al., 2014).

Gels were photopolymerized inside the glass channels using the same UV exposure conditions described in the main text for gel lid fabrication. UV exposure to the well reservoirs was blocked to prevent gel formation in the wells. Press-fit pipette tips were inserted into the wells to be used as 10 µl reservoirs. Continuous monitoring and control of voltages and currents for on-chip electrophoresis was achieved using a custom built, eight-channel high voltage power supply.

Following assay completion, gels were removed from the glass chips allowing efficient recycling of glass chips by using an overnight incubation with a 2:1 perchloric acid and hydrogen peroxide solution heated to 75° C. following appropriate safety precautions.

Cell Lysate Microfluidic IEF

IEF of cell lysate was performed in microfluidic channels (FIG. 25) to determine the pI of TurboGFP (FIG. 26). U373 MG cells stably transfected with TurboGFP were lysed via the addition of the same detergent composition used for scIEF followed by vortexing (Analogue Vortex Mixer, VWR) and sonication (Aquasonic Model 50D, VWR). Extracts were then purified and exchanged to IEF buffer (1:10 PB74 and PB96, 3.6% (w/v) CHAPS) via centrifugation in Bio-Spin Columns with Bio-Gel P-30 (Bio-Rad) following manufacturer instructions.

6% T (3.3% C) gels containing IEF buffer and 1:100 dilution of pH markers were formed inside the channels of the microfluidic glass devices. Sample solution containing IEF buffer, 1:100 (v/v) dilutions of pI markers (pH 4.5, 5.5, 6.8, and 8.1), and a 1:20 (v/v) dilution of the purified cell extract was electrophoretically loaded from both wells into the device for 30 s by applying a potential difference of 600 V between reservoirs. After electrophoretic loading, the electric field application was stopped and the solutions in the terminal wells were replaced with 1× Cathode Buffer (20 mM arginine, 20 mM lysine) and 1× Anode Buffer (7 mM phosphoric acid), both acquired from Bio-Rad (Hercules, Calif.). A 600 V potential difference was then reapplied for the focusing step.

Profile plots of the focused bands were obtained by averaging intensities along the channel width in ImageJ. The position of the pH gradient was determined by linear regression of the position of the fluorescent pI markers. The pI of the TurboGFP isoforms was estimated using the linear fit of the pH gradient.

The pI values of the three TurboGFP isoforms matched the pattern for single charge differences resulting from differential C-terminal cleavage by non-specific proteases. For comparison, the isoforms of wtGFP have pI values of 4.88, 5.00, and 5.19.

Diffusivity and Relative Mobility Measurements

The diffusivities of the reagents used in the focusing region of the scIEF were given in FIG. 21. The diffusivities D of the reagents were estimated using the Stokes-Einstein relation given as $D=k_BT/6\pi\eta a$ where $k_B$ is the Boltzmann constant, T is the temperature, n is the dynamic viscosity, and a is the hydrodynamic radius. The hydrodynamic radii of the Polybuffers and pH markers were estimated by $a=0.595*mw0.427$ (Hughes et al., 2012) where mw is the molecular weight of the solute as specified by the manufacturer. The hydrodynamic radii of the CHAPS and digitonin micelles were obtained from literature (Lipfert et al., 2007, Bamber et al, 2006). The diffusivity of Triton X-100 was obtained from the literature (Leaist et al., 1991). Characteristic times of diffusion were estimated as $t=x^2/2D$ where x is the diffusion length and D is the diffusivity of the solute. The effect of the gel matrix on the diffusivity and partitioning coefficients of small molecules is negligible.

Measurements of the diffusivity of TurboGFP in free solution, 6% T (3.3% C), and 15% T (3.3% C) gels was done in microfluidic glass devices. Gels were formed inside the devices using the same procedure used for the cell lysate IEF. The same sample solution containing cell extract was electrophoretically loaded at 600 V for 20 s from the negative terminal. After loading, the solution in the loading well was replaced with 1× Cathode Buffer and a potential of 600 V was reapplied to load a band of TurboGFP into the channel. The electric field application was halted and the protein band was imaged at 10× magnification for 200 s with 20 s intervals. Profile plots of the band were obtained by averaging intensities along the channel width in ImageJ. Measured band widths σ were used to determine the diffusivity D of TurboGFP using the relationship $2Dt=\sigma^2$ for unconfined one-dimensional diffusion from a point source. The position of the band during loading was tracked across a distance of ~525 µm during the loading using ImageJ scripts written in house to calculate the relative mobility difference of TurboGFP at the two gel densities. 3 replicates where done for each condition. Custom in house written ImageJ script was used to track peak position during migration. TurboGFP mobility was 46.3±1.1% lower in 15% T gels compared to 6% T gels.

Conductivity Measurements

Conductivity measurements for use as parameters in simulations were done by tracking the voltages and current in the same microfluidic glass devices described previously. Measurements were done in microfludic glass devices instead of in a conductivity meter because measurements were made of the conductivity of focused carrier ampholytes and also for polymerized PAG. Gels containing the desired buffers were polymerized within the device channels and microfluidic IEF was conducted as described previously. For the conditions without carrier ampholytes, water was loaded into the well reservoirs. For the unfocused carrier ampholytes conditions, carrier ampholyte solution was loaded at the reservoirs. Current and voltage monitoring was done for ~30 s (20 timepoints) and for 3 technical replicates for each condition (different channels). A voltage of 600 V was applied, and DC voltage was used since only relative conductivity differences were important for the simulations. The conductivity was measured by using the potential difference (V) and the average of the absolute value of the current measured at both electrodes (I), and the cross sectional area (A) and channel length (L) from the channel geometry in the following expression: conductivity=I/V*L/A.

Chemical Partitioning Measurements

Partitioning measurements were performed using 2.5 cm2 (500 µm thick) pads of polyacrylamide. For the free solution to gel measurements, the appropriate gel composition was polymerized on a glass slide using molding as in FIG. 11. The gel was then allowed to equilibrate in a 1 µM solution of TurboGFP on a shaker overnight. After incubation the glass slide was removed and a second glass slide was placed on top, ensuring that the free solution of TurboGFP next to the gel pad was also 500 µm thick. The gel and free solution were then imaged using a widefield epifluorescent microscope focused on the bottom of the gel pad (4x/NA 0.13 objective). The chemical partitioning coefficient K was defined as:

$$K = \frac{[TurboGFP_{low\ free\ volume}]}{[TurboGFP_{high\ free\ volume}]} \quad (Equation\ 5)$$

The 15% T PAG to 6% T PAG partitioning measurement was performed in a similar manner as described previously. 6% T PAG and 15% T PAG pads (1 cm×2.5 cm×500 µm) were fabricated on separated glass slides. The 6% T PAG pad was incubated in 1 µM TurboGFP. Then the 6% T PAG and 15% T PAG pads were placed face-to-face. The edges of the sandwich were sealed with paraffin wax to prevent evaporation. The sandwich was allowed to equilibrate for 4 days then each PAG pad was imaged separately. The partition coefficient was assessed using Equation 5.

The partitioning coefficient of the 6% T PAG to free solution was measured to be 0.51±0.13 (FIG. 27). This was 13.7% higher than the previously measured value for EGFP in 8% T PAG (K=0.44±0.05). A higher partitioning coefficient for a lower % T gel was expected due to the increased free volume in the polymer matrix. Similarly, the partitioning coefficient for 6% T to free solution was higher than that for 15% T to free solution. Surprisingly, the 15% T PAG to 6% T PAG partitioning coefficient was lower than both the 6% T PAG and 15% T PAG to free solution partitioning coefficients (0.10±0.04). Nevertheless, a sensitivity analysis showed that the simulation results were not sensitive to the partitioning coefficients used.

Comsol Simulations

Electrical potential (FIG. 20) and mass transport simulations were performed in COMSOL Multiphysics 4.2a (Burlington, Mass.). Conductivities, diffusivities, and partitioning coefficients were experimentally determined or obtained from literature.

Electrical Potential in scIEF Device

The electrodes were modeled as squares in contact with the lid across an area of 10 mm (FIG. 20, panel A). The conductivities used were estimated experimentally (FIG. 19). The focusing region was modeled as 10 mm and the areas on the gel slide under the acidic and basic regions was assumed to contain no buffers, justified by the rapid diffusion and dilution of any carrier ampholytes initially contained (FIG. 21). Any carrier ampholytes present in the gel slide but not the gel lid get diluted by 92.59% in <0.22 s (FIG. 21). Because the potential and field on the gel slide were determined by the conductivities on the lid, this assumption was inconsequential. A 2D system (infinite y-axis) was utilized since potential variations in the y axis were not expected due to geometry. Evaporation and heating could affect y-axis uniformity, but these effects were not considered here. Corners contained fillets of 1 µm radii and the minimum and maximum mesh element sizes were set to 1 and 100 µm, respectively (FIG. 20, panel B). An electrical potential of 600 V was applied.

Three simulations were performed. For the first simulation, uniform conductivities were assumed to assess the effects of geometry alone (FIG. 20, panel C). With inform conductivity, ~33.3% of the voltage dropped over focusing region on gel slide due to the gel lid overhangs needed to interface with electrode. The electric field across the gel slide was ~200 V/cm. The small changes in current path cross section were due to the gel slide resulted in small electric field drops of 6% (proportional to cross section increase). For the second simulation, values of unfocused carrier ampholytes were used to look at the initial conditions upon field application (FIG. 20, panel D). With these conditions, ~6.7% of the voltage dropped over focusing region on gel slide and the electric field was ~40 V/cm. For the third simulation, conductivity values of focused carrier ampholytes were used to look at equilibrium conditions (FIG. 20, panel E). With these conditions, ~16.7% of the voltage dropped over focusing region on gel slide and the electric field was ~100 V/cm. In all three simulations, the potential in the thinner gel slide was dominated by the conductivity in the adjacent thicker gel lid regions, resulting in the same electric field in both regions. From these results, it was observed that the focusing region experienced an electric field ramp (~40-100 V/cm) during focusing under a constant 600 V, enabling the design of an optimal voltage trajectory to apply higher electric fields.

Negligible electric field nonuniformities were observed at the interfaces in the system. The angle of the electric field direction was calculated using the magnitude of the x- and y-axis components. Small (<2°) variations in electric field direction were present in the first 100 µm of the focusing region on the gel slide (data not shown). Variations in the magnitude of the x component of the electric field were present only in the initial 500 µm on the focusing region of the gel slide.

Protein Losses During scIEF

Mass transport COMSOL simulations were performed to estimate protein losses during lysis and electromigration in the scIEF setup reported in the present disclosure. (FIG. 23). During lysis and electromigration, losses occurred over time via diffusion and chemical partitioning between the different gel and free solution phases. For diffusion in three dimensions, a 2D axis-symmetric model was used, and for diffusion in two dimension, a 2D model was used. The gel lid was 500 µm high, the gel slide was 30 µm high, and the well was 30 µm wide. The maximum and minimum mesh element sizes were 30 and 0.3 µm, respectively. The timestep for lysis simulations was 1 s and 5 s for electromigration simulations. Initial conditions before lysis were modeled as an initial uniform starting concentration of TurboGFP in a 28 µm diameter cell inside the well. The used diffusivities (FIG. 28) and partitioning coefficients (FIG. 27) of TurboGFP in different gel densities were experimentally estimated. The configurations used for the different simulations were specified in FIG. 24. Losses were estimated by tracking the concentration over time. The concentration used was determined by integrating the protein concentration along a z-axis cutline through the center of the well on the gel slide.

For simplicity, the initial conditions used for the electromigration simulations were the same as used for the lysis simulations. Thus, proteins started from a uniform starting concentration instead of the Gaussian-like zone present at the end of focusing. As an additional simplification, the differential electromigration of protein in the different gel densities was ignored. During scIEF, proteins that diffused off the gel slide into the gel lid still experienced IEF and focus at the same position as on the gel slide (FIG. 15), while in single-cell western blotting, proteins that diffuse into the free solution bath do not focus. Proteins have a lower mobility at higher % T PAG, but in this study it was assumed that during focusing the position of the protein bands on the gel slide and gel lid coincide, justified by the rapid focusing times in the setup. Given that no focusing occurred in single-cell western blotting, these simulations underestimate the losses during electromigration. A third simplification was that the gel lid was 500 µm in height vs. the ~10 mm height of the free solution bath, thus providing a smaller volume reservoir for dilution. However, the diffusion time for TurboGFP across 500 µm of 15% T gel was ~17 hours, so the contribution from this difference was considered negligible.

The goal of the simulations was to estimate the diffusive protein losses during the scIEF assay and gain insight into the mechanisms that mitigate these diffusive losses in the scIEF setup that enable longer separations (>5 min) compared to single-cell western blotting (<1 min). There were two major differences regarding the protein losses in the setup developed here for scIEF and the setup typically used for single cell western blotting demonstrated previously. First, the use of the 15% T gel lid used in scIEF compared to the free solution bath used in single-cell western blotting for lysis reagent delivery and electrical actuation leads to loss mitigation by reducing diffusion in the z-axis. With the gel lid (scIEF), integrated concentration decreased by 90% after 20 s, while without the gel lid, integrated concentrated decreased by 90% after 5 s (FIG. 23, panel D). During electromigration losses were further mitigated due to focusing, which eliminates losses along the x-axis. By restricting diffusion to two dimensions, integrated concentrated decreased by 90% after 115 s (FIG. 23, panel E). Thus, while the gel lid did help mitigate losses during lysis and electromigration, focusing was the main reason for the reduction in protein losses in scIEF compared to single-cell western blotting.

A sensitivity analysis was performed to determine whether dense gels mitigated losses were due to partitioning or due to proteins having a lower diffusivity in these regions. The partitioning coefficient $K_{eq,15-6}$ was varied and measured changes in the resulting integrated concentration at the different times. Changing $K_{eq,15-6}$ from the measured to 0.1 to 0.24 and 0.51 in the scIEF simulations resulted in average changes of integrated concentration of <0.02 in the tested conditions (FIG. 23). Thus, the losses were not very sensitive to changes in the partitioning coefficient and any variations in the experimentally determined partitioning coefficients were not impactful. These results indicated that diffusive losses in the system were mitigated mostly due to the lower diffusivity in high density gel regions and not due to the partitioning behavior that happened at the interfaces.

Example 4

Detection of Isoforms Differing by a Single-charge Unit in Individual Cells

Summary

The present disclosure provides an example to measure protein isoforms in individual mammalian cells. The present disclosure reports single-cell resolution isoelectric focusing (scIEF) and high-selectivity immunoprobing. Microfluidic design and photoactivatable materials established the tunable pH gradients required by IEF and precisely controlled transport and handling of each 17 pL cell lysate during analysis. scIEF resolved protein isoforms with resolution down to single-charge unit differences, including both endogenous cytoplasmic and nuclear proteins from individual mammalian cells.

Mass spectrometry is currently the workhorse technology for proteomic analysis. As a complimentary approach to mass spectrometry, microfluidic separations facilitate selective profiling of proteoforms with single-cell resolution. In recent work, polyacrylamide gel electrophoresis (PAGE) was concatenated with a subsequent immunoassay for single-cell western blotting. Although western blotting is a high selectivity protein assay, post-translational modifications and alternative splicing do not always yield resolvable molecular mass differences. Fortunately, even proteoforms of similar mass often exhibit isoelectric point (pI, charge) differences that are readily detectable with another electrophoretic assay (i.e., isoelectric focusing, IEF). In fact, capillary IEF followed by immunoblotting resolved protein post-translational modifications in lysates pooled from as few as 25 cells.

To separate proteins by pI, IEF employs protein electromigration along a stable pH gradient. Proteins electromigrate until each species enters a region of the pH gradient where the local pH is equal to the pI of that species; at that location, the proteoform has no net mobility. Electromigration thus halts and the protein is "focused". IEF has immense resolving power and selectivity; even single-charge differences among proteoforms are detectable.

Figure 29:
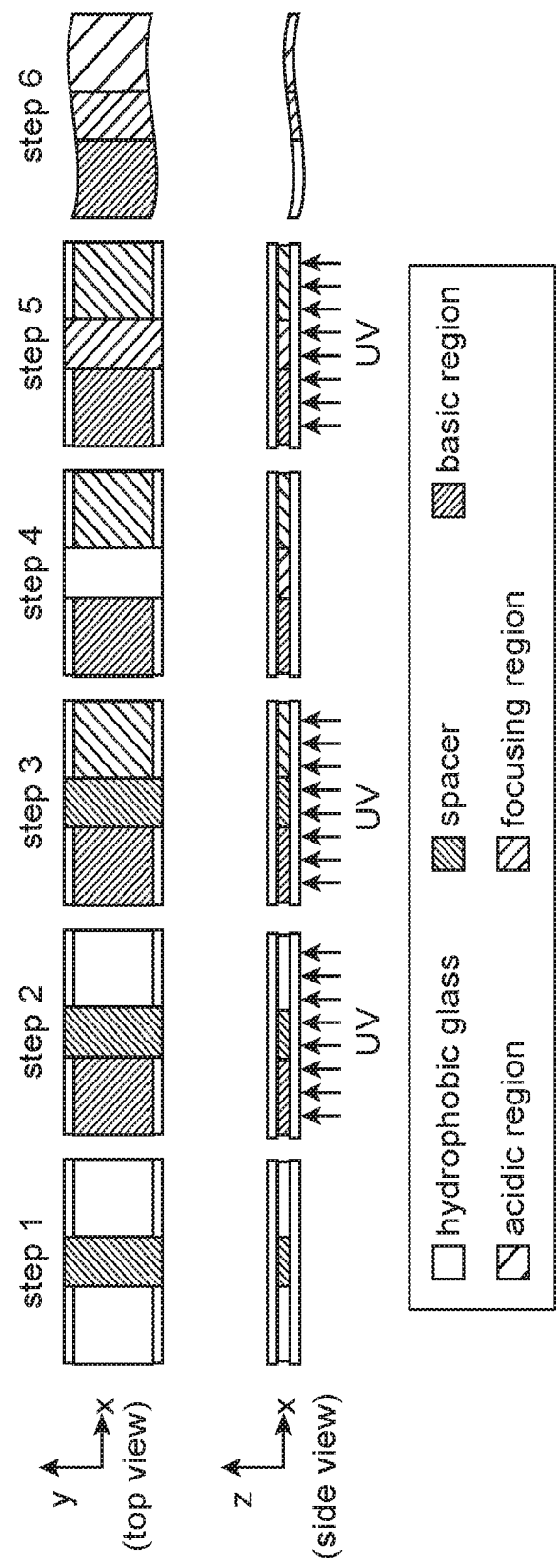
FIG. 29 shows Gel lid fabrication. Step 1: a 0.5 mm thick spacer that is the width of the focusing region is placed between two hydrophobic glass plates. The glass plates are sized such that they match the size of the gel lid. Step 2: the basic gel precursor is introduced between the glass plates on the basic boundary of the gel lid. The basic gel is polymerized with UV light. Step 3: the unpolymerized basic catholyte gel precursor is washed out and the acidic anolyte precursor is introduced to the other side and similarly photopolymerized. Step 4: the spacer is removed. Step 5: the focusing region precursor is introduced and polymerized. Step 6: the glass slides are removed leaving a free-standing gel structure.

To extend the power of IEF from pooled lysates to individual cells, a 3D microfluidic device was designed that integrated all preparatory and analytical stages for single-cell resolution IEF with in gel immunoprobing (cell isolation, lysis, IEF, UV-actuated blotting, probing). Microfluidic integration was used to overcoming diffusion-based dilution of lysate from a single cell; a loss mechanism exacerbated by handling in multi-stage assays, including immunoblotting. Although proteins can have appreciable intracellular concentrations (i.e., ~20 nM in a 30 µm diameter cell), just 5 s of diffusion can reduce the maximum protein concentration by 90% (FIG. 29). Microfluidic integration minimized the time allowed for diffusion-driven dilution, thus making isoform detection by electrophoretic analysis of single-cell lysates possible.

Detailed Description

Figure 30:
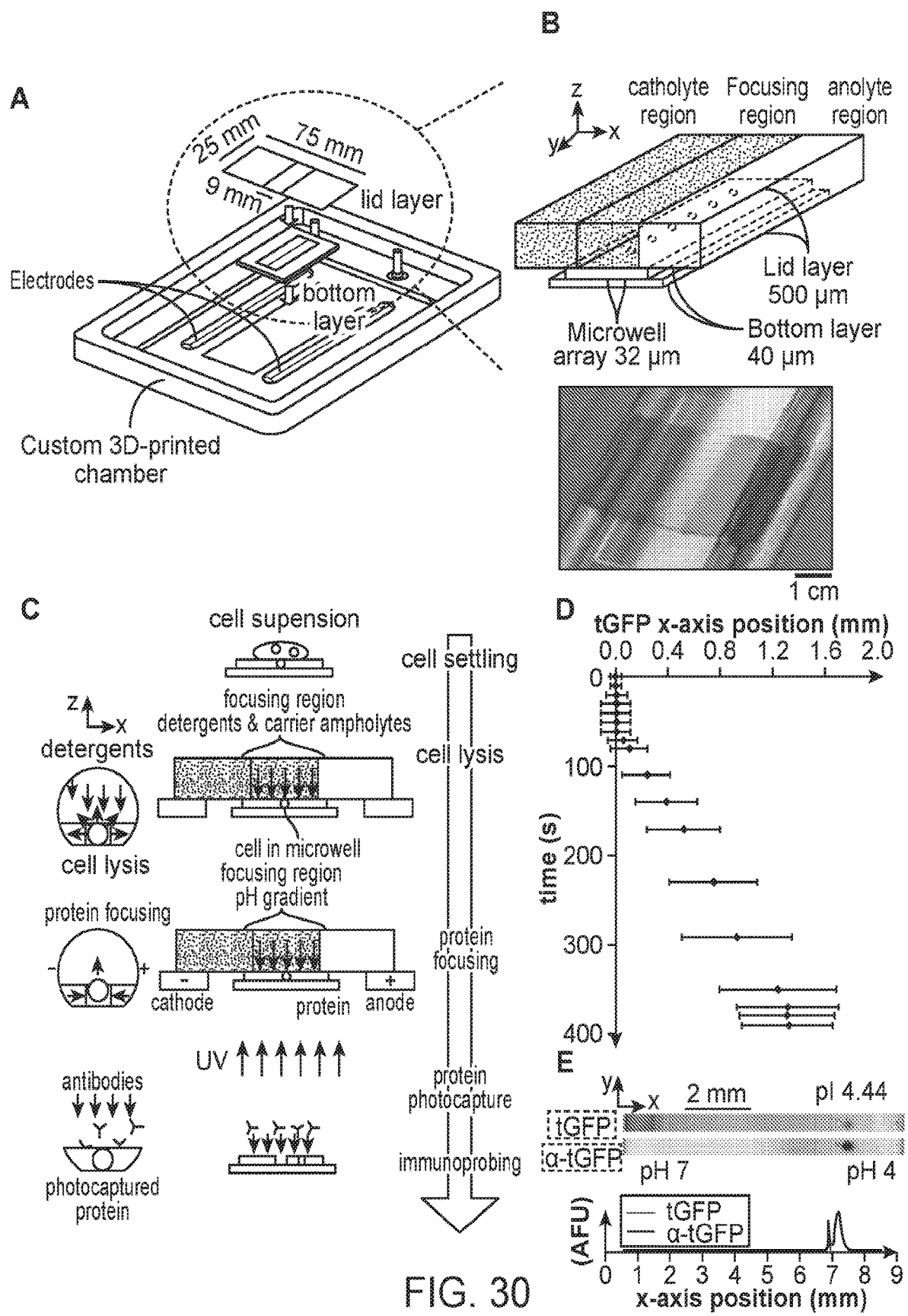
FIG. 30 shows a direct measurement of proteins using scIEF.

To control scIEF, a multilayered polyacrylamide gel device capable of integrating all required chemistries with no pumping or valving was designed (FIG. 30, panel A). The device comprised a glass slide coated with a "bottom" gel layer for isolating single cells in microwells via gravity sedimentation and was topped with a "lid" gel layer patterned with chemistries to control cell lysis and (after electric field application) the formation of pH gradients for scIEF (FIG. 30, panel B). The chemically patterned lid layer consisted of three different regions, with (i) a central focusing region containing both the non-ionic detergent cell lysis buffer and the mobile buffer species (carrier ampholytes) that formed the pH gradient and (ii) two flanking anolyte and catholyte regions created by copolymerizing weak acrylamido acids and bases at different stoichiometries into the polyacrylamide gel (i.e., Immobilines; FIG. 29, FIG. 31).

Figure 32:
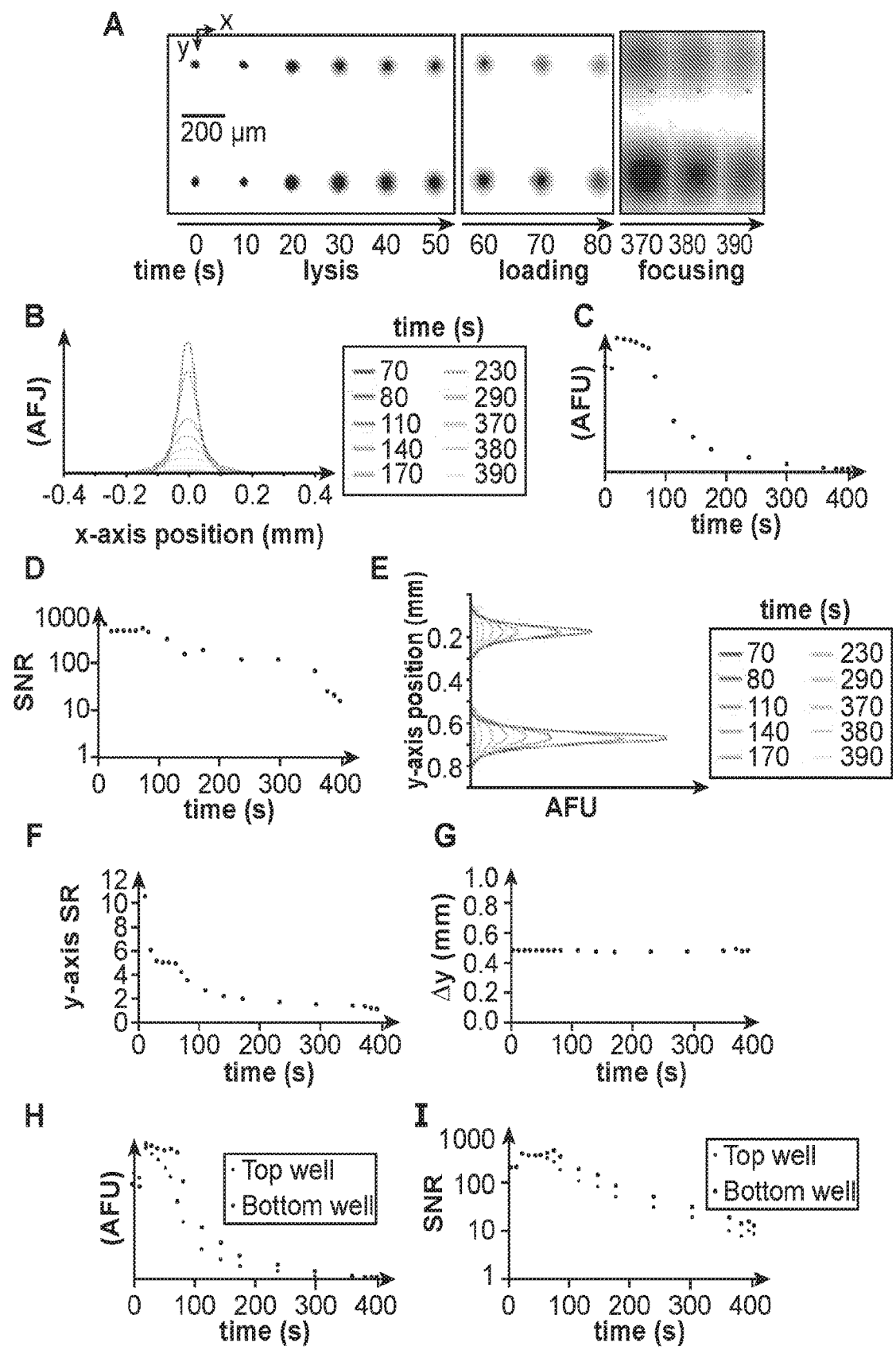
FIG. 32 shows scIEF characterization using real-time imaging.
Figure 33:
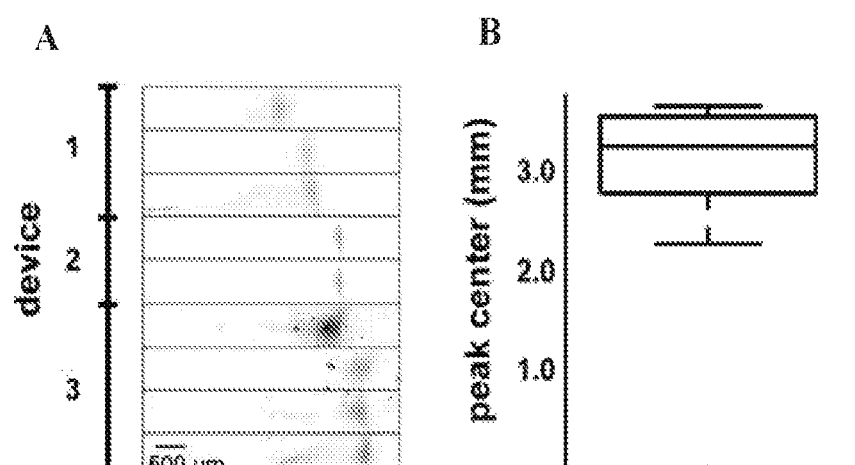
FIG. 33 shows characterization of lid placement repeatability.

Fluidic contact between the 500-µm thick lid layer and the 10× thinner bottom layer diffusively imprinted the chemical environment of the lid layer onto the bottom layer (FIG. 30, panel C). The free-standing lid layer was compliant (FIG. 30, panel B) and, as both the bottom layer and lid layer were fully hydrated when mated, a wetted layer at the interface ensures fluidic and electrical contact. Upon this first contact, cell lysis in each microwell was initiated by diffusion-driven release of the mobile non-ionic lysis reagents from the lid layer into the bottom layer. To minimize evaporation during the assay, an additional glass slide was placed on top of the lid layer. At this stage, no electric potential was applied. Human glioblastoma cells expressing TurboGFP (U373-tGFP) were monitored and initial release of tGFP within 10 s of lid application was observed, with fluorescence signal filling the 32 pL microwell volume within 20 s (FIG. 30, panel D; FIG. 32). Electrodes mated to the flanking anolyte and catholyte regions initiate and sustain IEF, with fluorescing tGFP peaks from each cell (signal-to-noise ratio, SNR >8) reaching a focused position ~310 s later (FIG. 30, panel D; FIG. 32). The repeatability of the lid placement was characterized relative to the microwells and determined the coefficient of variance of the lid position to be CV=14.87% (FIG. 33). Nevertheless, precise positioning of the lid would not affect the relative positions of the focused bands because the proteins would migrate to their pI regardless of the starting position of the microwell relative to the anolyte and catholyte boundaries.

Figure 34:
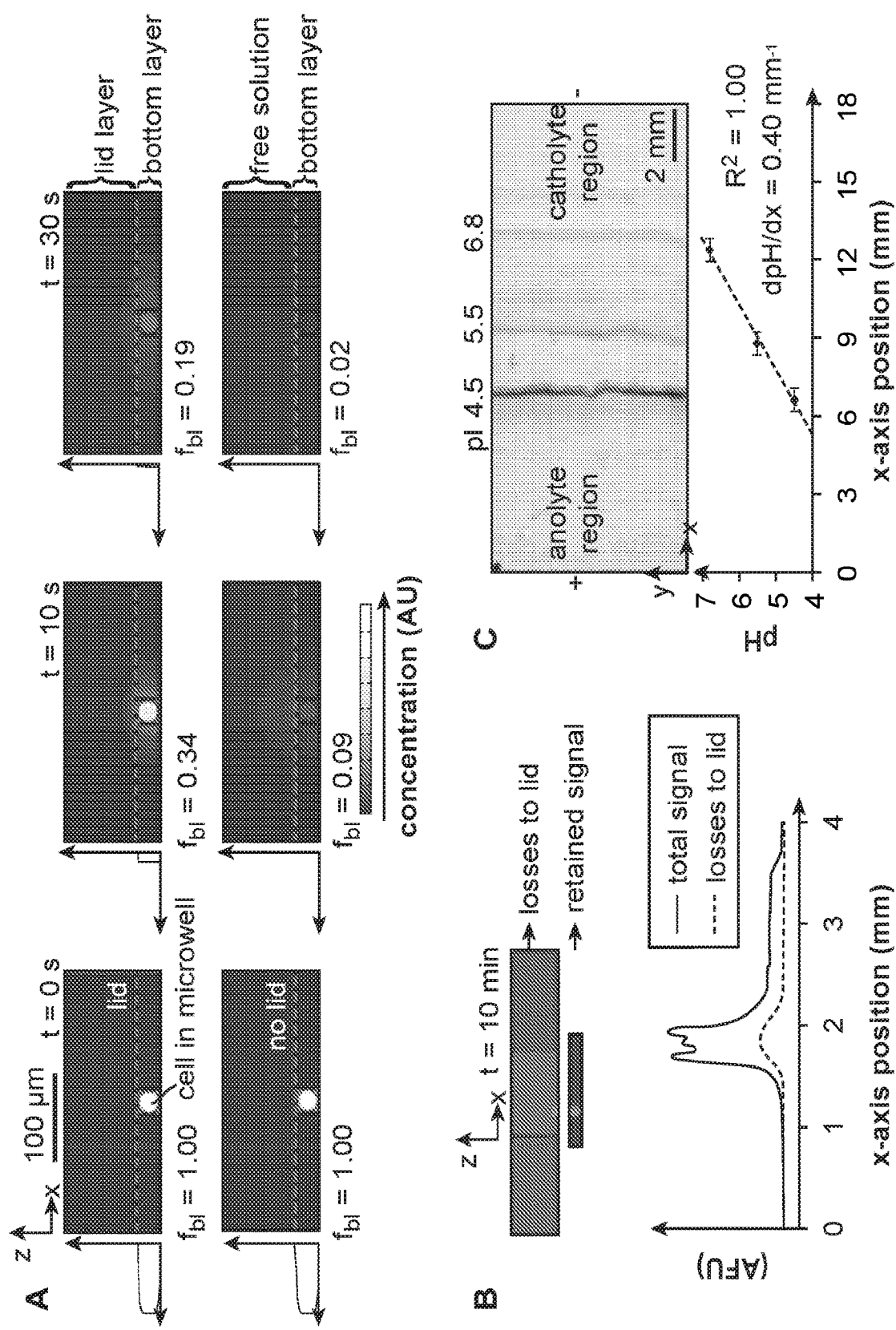
FIG. 34 shows control of diffusive and electrokinetic transport to establish robust, non-uniform chemistries for scIEF.

Two additional design considerations constrained diffusive losses, making the long duration (relative to fast-acting diffusion) separation possible. Firstly, diffusive losses were limited to two spatial dimensions due to the IEF occurring along the x-axis (FIG. 23). Secondly, diffusive losses in the out-of-plane dimension are notably reduced by the presence of the dense hydrogel lid layer. During both lysis and focusing, simulations show that analyte diffusivity is considerably lower into the dense gel lid, compared to free solution (FIG. 34, panel A, FIG. 23). Empirical results corroborate the reduced out-of-plane diffusive losses as just ~15% of the total protein signal after a remarkable 600 s of voltage application time (FIG. 34, panel B; FIG. 15). Note that the position of the microwells in the bottom layer could be optimized to reduce diffusive losses of specific proteins by reducing electromigration time from microwell to protein pI.

Figure 35:
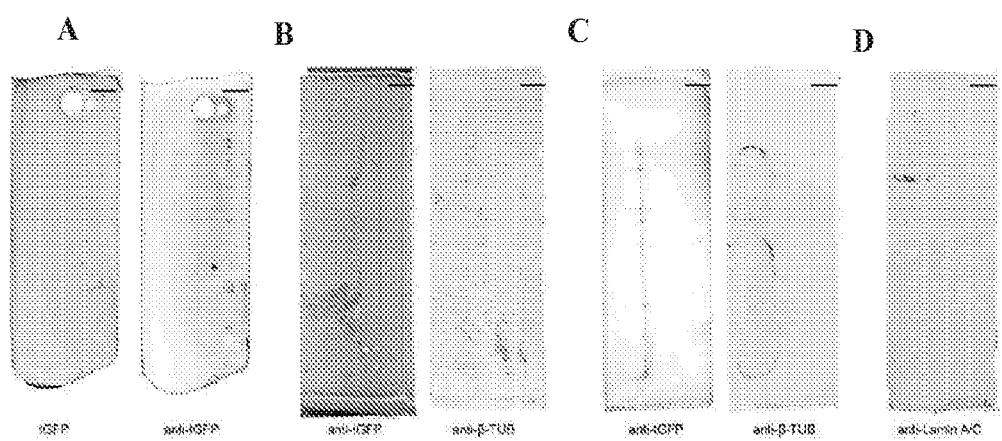
FIG. 35 shows scIEF with immunoblotting slidecans. Inverted fluorescence micrographs of slidescans of the bottom layer.

To detect endogenous isoforms, the hydrogel device was designed to support blotting of the scIEF separation and subsequent diffusive in-gel immunoprobing (FIG. 30, panel E; FIG. 35). By performing an immunoassay after a separation, a single antibody probe (e.g., pan-specific) could detect and discern multiple, spatially-separated isoforms. The present invention uses a photo-active monomer (benzophenone methacrylamide) cross-linked into the bottom layer to covalently immobilize protein peaks after brief UV exposure. The characteristic timescale of the immobilization reaction was 5.5 s. Photocapture was performed with the applied electric field set to electrically floating conditions, as peak drift during photocapture confounds the pI location and reduced separation resolution. It was estimated that diffusion-induced peak defocusing during the 5.5 s immobilization reaction did not confound pI location and reduces the separation resolution by ~20%, as was consistent with previous studies (FIG. 31). A longer 45 s UV exposure period was used to maximize immobilization efficiency. The capture efficiency was experimentally measured of the proteins in the system as 17.7±1.5% (FIG. 36), which leads to an estimated lower limit of detection of ~42,000 molecules needed in the bottom layer before photocapture for detection via immunoprobing (FIG. 29). Immunoprobing using primary and fluorescently-labeled secondary antibodies reported a major tGFP band with an SNR of 51.87±39.10 (n=9, FIG. 30, panel E; FIG. 35, panel A). Importantly, covalent immobilization of resolved proteins to the gel decouples time-dependent dilution considerations from all subsequent assay stages, archival storage, and multiple reprobing rounds.

The next step included optimizing scIEF resolving power to enhance the selectivity of isoform detection (FIG. 34, panel C). Adjusting the design of the chemically patterned lid layer imprints pH gradients of different length and steepness on the bottom layer, determining the focusing time and separation resolution. Fluorescence flow cytometry and mass cytometry measured up to ~12 and ~34 targets in a single cell respectively, but both techniques were unable to distinguish isoforms that lack highly selective antibodies. In contrast, in-gel immunoprobing assays with separations multiplex the product of the resolvable proteins (peak capacity, ~17 for scIEF, FIG. 29) with ~4 spectrally distinct fluorescent dyes (labeled secondary antibodies) and 2-20 stripping/re-probing cycles (depending on physicochemical properties of target).

The next step included scrutinizing the capability of scIEF to concurrently measure endogenous cytoskeletal and nuclear targets, for proteins with known isoforms. The tGFP (~pI 4.5), β-tubulin (β-TUB, ~pI 5.5), and lamin A/C was assayed in individual glioblastoma cells (FIG. 37). In this study, secondary antibodies each labeled with a different fluorophore (AlexaFluor 555 and 647) were used to discriminate between the signal from mouse (lamin A/C) and rabbit (tGFP and β-TUB) primary antibodies, demonstrating the utility of spectral multiplexing (FIG. 37). Using a four-color laser scanner, multiplexing could be further increased using commercially available dyes (e.g., AlexaFluor). Both native and denaturing scIEF were studied, as isoform state was sensitive to sample preparation conditions. Under native scIEF, tGFP and β-TUB were well-resolved with separation resolution of 1.91±0.36 (nN=9 cells), yielded a conservative peak capacity of 9.0±3.1 (based on width of widest peak, β-TUB), and reported no isoforms. Expression of tGFP and β-TUB were not well-correlated (Pearson correlation, p=0.22, p=0.60, FIG. 37, panel A; FIG. 35, panel B).

Under denaturing scIEF (7 M urea and 2 M thiourea added to the lysis buffer), three tGFP isoforms (RS>0.88) and two β-TUB isoforms (RS=2.54±0.46; nD=3) were detected (FIG. 37, panel B; FIG. 35, panel C). The tGFP isoforms arose from differential C-terminal cleavage by non-specific proteases and differed by just a single charge unit. Interestingly, the native conditions yielded 86% higher total tGFP probing signal than denaturing conditions, attributed to the sensitivity of photocapture efficiency on protein state or, possibly, to incomplete electromigration out of the microwell, as was under study (FIG. 37, panel C). Denaturing conditions resulted in well-resolved major β-TUB and tGFP peaks (RS=1.77±0.59) and a ~3× higher peak capacity than native conditions (28.08±6.68; nD=8, FIG. 37, panel D). Using the pI of the tGFP isoforms (FIG. 25), the pI of the β-TUB isoforms was estimated to be 5.11 and 5.76. The acidic isoform of β-TUB had a total expression approximately 5× higher than that of the basic isoform (p<0.01, FIG. 37, panel D). β-TUB isoforms have been implicated in resistance to tubulin-binding cancer therapeutics (i.e., Taxol).

To assess relevance to nuclear proteins (classically difficult to assay via single-cell cytometry-based techniques without fractionation) U373-tGFP cells was assayed for lamin A/C (FIG. 37, panel E; FIG. 35, panel D). As expected, lamin A/C was detected in all glioblastoma cells. Because of its basic 6.8-7.3 pI, lamin A/C bands migrated toward the cathode side and focused to the left of the microwell. The fluorescent readout signals observed on this set of validation proteins were sufficient (SNR>3) for study of endogenous isoforms from single mammalian cells. The successful immunoprobing of lamin A/C (nuclear protein), tGFP (cytosolic protein), and β-TUB (cytoskeletal protein) demonstrate that the denaturing scIEF lysis buffer solubilizes proteins from the major cellular compartments.

The number of parallel scIEF separations in the same chip was dictated by microwell spacing (FIG. 32) and device size (which determine the number of microwells), as well as by the cell settling efficiency of passive sedimentation. In this work, ~10 cells were analyzed per chip. The number of cells analyzed per device could be increased by fabricating larger devices or using active settling methods.

Direct detection of proteoforms in single cells is a crucial capability, as protein copy number (especially isoforms) from single mammalian cells was only sparsely reported and RNA may not always well-correlate with protein expression (or form). The demonstrated capability of the scIEF assay to resolve isoforms of endogenous proteins from single cells provided a much-needed capability to elucidate the role of specific proteoforms in cancer progression, cardiovascular disease, and neurodegenerative disorders. scIEF opens a separations-based avenue for measuring proteoforms, an important aspect of protein signaling that was difficult to observe with conventional cytometry tools.

3-(Trimethoxysilyl)propyl methacrylate (98%), acetic acid (glacial, 99.7%, ACS grade), methanol (anhydrous, 99.8%), sodium hydroxide (NaOH, ≥97.0%, ACS grade), acrylamide/bisacrylamide solution (29:1, electrophoresis grade), N,N,N',N'-tetramethylethylenediamine (TEMED, BioReagent, ~99%), ammonium persulfate (APS, ACS reagent, ≥98.0%), 3-[(3-Cholamidopropyl)dimethylammonio]-1-propanesulfonate (CHAPS, ≥98%, electrophoresis grade), digitonin (Used as non-ionic detergent), Triton™ X-100 detergent (laboratory grade), sodium dodecyl sulfate (SDS, BioReagent, ≥98.5% (w/v), suitable for electrophoresis & molecular biology), β mercaptoethanol, urea (BioReagent), thiourea (ACS reagent, ≥99.0%), Polybuffer® 74 (PB74), Polybuffer® 96 (PB96), Immobilines, and fluorescent IEF markers were acquired from Sigma Aldrich (St. Louis, Mo.). The fluorescent pH markers used were pI 4.5 (1 mg mL-1 in 5 mM HCl), pI 5.5 (3 mg mL-1 in 15 mM HCl), and pI 6.8 (1 mg mL-1 in 5 mM HCl). The Immobilines used were acrylamido buffer pKa 3.6 (~0.2 M in water) and acrylamido buffer pKa 9.3 (~0.2 M in 1-propanol). Polybuffers could be used as a substitute for other carrier ampholytes such as Biolyte, Ampholine, Pharmalyte, and Servalyte.

UV photoinitiator VA-086 was purchased from Wako Chemicals (Richmond, Va.). Trypsin:Ethylenediaminetetraacetic acid (EDTA) solution (0.05% trypsin and 0.53 mM EDTA) was acquired from Gemini Bio-Products (Sacramento, Calif.). 10× Phosphate-Buffered Saline (PBS) solution (pH 7.4, MCB grade) was obtained from Mediatech (Manassas, Va.). Trisbuffered saline with Tween 20 (TBST) was bought from Santa Cruz Biotechnology (Santa Cruz, Calif.). Tris-HCL (pH 6.9) was purchased from Teknova (Hollister, Calif.). N-[3-[(3-benzoylphenyl)formamido]propyl] methacrylamide (BPMAC) monomer was custom synthesized by PharmAgra Laboratories (Brevard, N.C.). Purified recombinant wild-type GFP from Aequorea victoria (wtGFP) was sourced from Clontech (632373, Mountain View, Calif.). Purified recombinant TurboGFP (tGFP) was sourced from Evrogen (FP552, Moscow, Russia). Primary antibodies used in this study include rabbit anti-TurboGFP (1:30, PA5-22688, Pierce Antibody Products, Rockford, Ill.), mouse anti-lamin A/C (1:5, mab636, Pierce Antibody Products), and rabbit anti-β-Tubulin (1:10, mab6046, Abcam, Cambridge, United Kingdom). The secondary antibodies used in this study were AlexaFluor 555-labeled donkey anti-mouse IgG (1:30, A-31570) and AlexaFluor 647-labeled donkey anti-rabbit IgG (1:30, A-31573) sourced from Life Technologies (Grand Island, N.Y.).

Cells Lines and Cell Culture

U373 MG human glioblastoma cells were obtained from the American Type Culture Collection via the UC Berkeley Tissue Culture facility and were stably transduced with tGFP by lentiviral infection (multiplicity of infection=10) were provided by collaborators in the Kumar Laboratory at UC Berkeley. The tGFP expressing U373 MG (U373-tGFP) cells were cultured in-house in high glucose DMEM (Life Technologies) supplemented with 1 mM sodium pyruvate (Life Technologies), 1×MEM non-essential amino acids (Life Technologies), 1% penicillin and streptomycin, and 10% fetal bovine serum (JR Scientific, Woodland, Calif.). Cells were grown at 37° C. with 5% CO2 in a humidified incubator. Prior to the experiment, cells were trypsinized, resuspended in 1×PBS, and kept on ice. The ATCC U373 MG cells have been found to share a common origin with U251 and SNB19 glioma cells. However, they have since diverged and are karyotypically distinct.

Device Fabrication

The first component of the single-cell isoelectric focusing (scIEF) device is the bottom layer, which is a standard microscope slide, coated with a 40 μm thick film of large pore-size 6% T (3.3% C) polyacrylamide gel containing 5 mM BPMAC. Unlike western blotting, IEF did not require molecular sieving through the polyacrylamide gel matrix. In lieu of sieving, the thin polyacrylamide gel bottom layer functions as an anti-convective medium, contains the microwells for cell containment, and, in immunoprobing, acts as a scaffold on which protein peaks are immobilized (blotted). A row of 32 μm diameter microwells spaced 500 μm apart was molded into this thin polyacrylamide film using SU-8 wafers as molds and chemical polyacrylamide gel polymerization, as previously described. Importantly, the x-axis position of the microwells was moved to be closer to the pI of the proteins when faster focusing was desired or away from the pI of the proteins to avoid proteins focusing on the microwells (FIG. 38). wtGFP at a concentration of 10 μg mL-1 and pH markers at 1:100 dilutions were included in the bottom layer precursor solution as pH markers when specified (FIG. 38). Covalent attachment of the polyacrylamide gel to plain glass microscope slides (VWR International, Radnor, Pa.) was achieved by acrylate-terminated silane monolayer formation using previously described methods. Slides were used whole or cut to desired dimensions using a diamond scribe (Ted Pella Inc., Redding, Calif.) and Running and Nipping Pliers (Fletcher, East Berlin, Conn.). SU8 2025 photoresist (MicroChem, Westborough, Mass.) molds on silicon wafers (University Wafer, Boston, Mass.) were fabricated as previously described.

The second component of the scIEF device is the chemically functionalized "lid". The heterogeneous gel lid is a chemically patterned 500 µm thick polyacrylamide gel layer that performs two functions: (i) delivery of lysis and IEF reagents to the bottom layer and (ii) serves as a template for the pH and electric potential gradients required for IEF. The free-standing 15% T (3.3% C) polyacrylamide gel lids were fabricated using a multistep photopolymerization method (FIG. 29). Polyacrylamide gel precursor was loaded between glass surfaces rendered hydrophobic with Gel Slick (Lonza, Rockland, Me.). Lid thickness was specified using 500 µm thick, 9 mm wide spacers were obtained from C.B.S. Scientific (Del Mar, Calif.). The three distinct regions were formed using sequential photopatterning and precursor solution wash steps (FIG. 29). The focusing region containing the carrier ampholytes and lysis reagents was flanked by gels containing Immobilines serving as the catholyte and anolyte boundaries. The basic and acidic regions in the gel lid contained combinations of Immobilines to buffer at acidic and basic pH values. Using patterned polyacrylamide gel regions containing Immobilines obviated the use of liquid buffers, which if introduced into the focusing region, would disrupt pH gradient formation. The width of the focusing region was specified using the spacers as molds. Because the carrier amphololytes and lysis reagents in the focusing region were not immobilized, the focusing region was polymerized shortly before running the assay, in order to avoid excessive diffusion of these reagents to the catholyte and anolyte regions. The focusing region in the gel contained 1:10 dilutions of PB74 and PB96 as the carrier ampholytes, and 3.6% (w/v) CHAPS, 1% (v/v) Triton x-100, and 0.0125% (w/v) digitonin as detergents for cell lysis and protein solubilization, as specified (FIG. 31). Chaotropes (7M urea, 2M thiourea) were added for scIEF with denaturing conditions (FIG. 38). UV excitation for gel photopolymerization was provided by an OAI Model 30 Collimated UV light source (San Jose, Calif.). 4 min exposure times at 20 mW cm-2 powers attenuated through a 390 nm longpass UV filter (Edmund Optics, Barrington, N.J.) were used.

Experimental Protocols

Cell setting into the microwell arrays on the bottom layer was performed by first creating a single cell suspension (106 cells mL-1) in 1×PBS (phosphate-buffered saline). Bottom layers were dehydrated with a nitrogen stream and the cell suspension was pipetted directly over the microwells on the bottom layer. Cells were settled in 4° C. 1×PBS for 10 min and then slides were rinsed twice with a buffer containing carrier ampholytes but no detergents. After the application of the gel lid over the bottom layer, lysis was performed via diffusive introduction of detergents from the lid into the bottom layer for 30 to 60 s, prior to electric field application, as specified (FIG. 38). Focusing was performed in a custom 3D-printed ABS electrophoresis chamber (MakerBot, New York, N.Y.). The lid was electrically addressed with graphite bar electrodes (McMaster Carr, Chicago, Ill.) embedded in the floor of the electrophoresis chamber. A potential difference of 600 V was then applied for IEF using a PowerPac® high-voltage power supply (Bio-Rad, Hercules, Calif.). A glass slide was placed over the lid during electrophoresis to reduce evaporation. The duration of electric field application times varied depending on the experiment, as specified (FIG. 38). Following IEF separation, BPMAC-mediated protein photocapture to the gel matrix in the bottom layer was done using UV light exposure from a Hamamatsu LIGHTNING CURE LC5 unit (Bridgewater, N.J.) through a Lumatec series 380 liquid light guide (Deisenhofen, Germany) with an inline UV filter (300- to 380-nm bandpass, XF1001, Omega Optical, Brattleboro, Vt.) suspended approximately 5 cm above the slide for 45 s with a power of approximately 400 mW cm-2 at the slide surface (320-400 nm UV meter; C6080-365, Hamamatsu).

Immunoprobing

Probing was done using a variation on using conventional techniques. The bottom layer was first placed face-down against glass, suspended by 80 µm thick spacers of Kapton tape (Dupont, Hayward, Calif.). 40 µL of TBST solution containing primary antibodies was then introduced in the space between the gel and the glass. After a 2 hour incubation at room temperature, the bottom layer was washed in TBST for 1 hour (exchanging with fresh TBST once). Next, the bottom layer was incubated with TBST solution containing secondary antibodies for 1 hour at room temperature and washed using the approach described above. Finally, the bottom layer was washed with deionized water for 1 minute and gently dried with a nitrogen stream. Refer to the Reagents and Materials section for the antibody dilutions (v/v) used. When primary antibodies were raised in the same host, probing of multiple targets was performed via stripping and reprobing, as using conventional techniques in-gel immunoassay workflows. After imaging, slides were stripped by incubation in harsh stripping buffer (62.5 mM Tris-HCl pH 6.8, 2.5% (w/v) SDS, and 1% (v/v) β-mercaptoethanol) at 50° C. overnight. After stripping, slides were washed in TBST for 20 minutes, dried, and then imaged to confirm all of the previous antibody had been removed (all lanes report a signal-to-noise ratio, SNR<3). Then, slides were rehydrated in TBST for 20 minutes in preparation for the next round of probing.

Imaging and Analysis

Imaging was conducted using an Olympus IX71 inverted fluorescence microscope (Shinjuku, Tokyo) equipped with an EMCCD camera iXon3 885 (Andor, Belfast, Northern Ireland), a motorized stage (Applied Scientific Instrumentation, Eugene, Oreg.), an automated filter cube turret controlled by MetaMorph software (Molecular Devices, Sunnydale, Calif.), and an X-Cite Exacte mercury arc lamp illumination source coupled to an automated shutter and attenuation system (Lumen Dynamics, Mississauga, ON, Canada) through 4× (Olympus UPIanFI, NA 0.13) and 10× (Olympus UPIanFI, NA 0.3) objective lenses, as specified. UV channel imaging was performed with a custom UV-longpass filter cube (XF1001, excitation 300-380 nm; XF3097, emission >410 nm) and green channel imaging was done using a filter cube optimized for GFP (XF100-3, excitation 445-495 nm, emission 508-583 nm) (Omega Optical).

Figure 25:
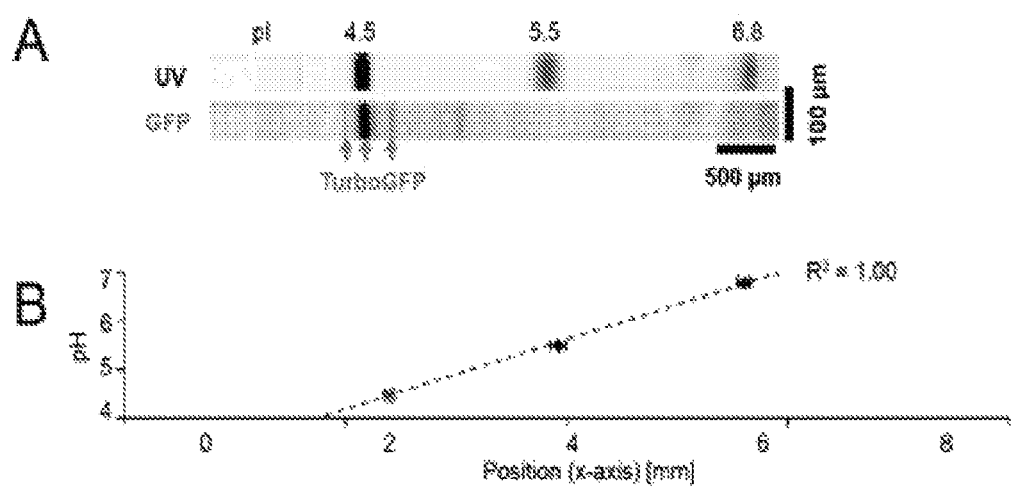
FIG. 25 shows cell extract microfluidic IEF.

Whole-device imaging was conducted using the Scan Slide function in MetaMorph at 4× magnification. Bottom layers were scanned using a GenePix 4300A fluorescence microarray scanner (Molecular Devices) after protein photocapture, immunoprobing, and wash steps using the 488 nm and 635 nm excitation lasers and the AF488 and the AF647 emission filters, as required. For single cell experiments, profile plots from individual lanes were obtained from 500 µm high windows. Background subtraction was done using plots from a 20 µm high window in the space between lanes. SNR was calculated using the maximum signal of background subtracted plots divided by the standard deviation of the intensity of regions without band signal. For experiments with pH markers and purified wtGFP included in the bottom layer, profile plots and band parameters were obtained from 500 µm high windows in the center of the device. MATLAB (MathWorks, Natick, Mass.) and ImageJ (NIH, Bethesda, Md./) scripts for Gaussian curve fitting and peak tracking written in-house were used to determine analyte band positions, widths, and other peak parameters. Mass transport simulations were performed in COMSOL Multiphysics 4.2a (Burlington, Mass.) with parameters determined experimentally or obtained from literature (FIG. 23). Endogenous protein pIs were estimated in the linear pH gradients by extrapolating from a linear fit of the tGFP peak centers. tGFP isoform pIs were obtained from microchannel IEF of U373-tGFP cell lysate (FIG. 25). Two-way comparisons were performed with a two-sample t-test. The critical p-value was set at 0.05. Multiway comparisons were performed with analysis of variance and the Bonferroni correction for multiple comparisons.

Electrophoretic Cytometry

As described in this Example, a multilayer, patterned hydrogel device was used to perform isoelectric focusing to separate protein isoforms with single-cell resolution (scIEF). All preparative and analytical steps were performed on the device without using pumps or valves, including: cell isolation, cell lysis, protein separation via IEF, UV-actuated blotting, and in-gel immunoprobing. Protein isoforms with single-charge differences were resolved, blotted, and then detected via immunoprobing. See FIG. 40.

Supporting Experiments, Analysis, and Simulations pH Gradient Characterization

To initiate scIEF, the lid layer was placed directly on top of the bottom layer. The graphite anode and cathode interfaced directly with the immobile acidic and basic boundary regions, respectively (FIG. 30, panel C). Upon completion of IEF, the band position and width of focused fluorescent pH markers included in the bottom layer were used to quantify three key metrics of IEF performance: the pH gradient linearity, the peak capacity (nc), and the minimum resolvable pI difference ($\Delta pI_{min}$) (FIG. 34, panel C). The pH gradient was expected to be linear due to the specified carrier ampholyte mixture. Linearity was assessed through a linear best fit to the pH marker band positions along the separation axis, and yielded a R2=1.00±0.00. Peak capacity quantifies the number of resolvable protein peaks for a given separation length and is described by $n_c = L/4\sigma$, where L is the pH gradient length (along the focusing axis) and σ describes the band width. The minimum resolvable pI difference ($\Delta pI_{min}$) measures the resolution of an IEF separation and is calculated using the expression $$\Delta pI_{min} = 3\left[DE^{-1}\left(\frac{dpH}{dx}\right)\left(-\frac{1 du}{dpH}\right)^{-1}\right]^{\frac{1}{2}},$$

where E is the magnitude of the applied electric field, $$\frac{dpH}{dx}$$

is the slope of the pH gradient, and D and $$\frac{du}{dpH}$$

are the diffusivity and the mobility slope of the focusing species. For experiments in which the aim was to resolve protein isoforms, the goal was to decrease $\Delta pI_{min}$ by using shallow (4-7 pH, 9 mm long) gradients. Using the pH marker band width and positions, these gradients had a peak capacity of 17.39±2.42 and $\Delta pI_{min}$ of 0.13±0.02 (FIG. 34, panel C). While pH gradients ranging from pH 4 to pH 9 enabled analysis of a wide range of pIs, the steeper gradient resulted in worse pI resolution. Moreover, most proteins could still be focused between pH 4-7 since 70% of proteins had pIs below pH 7. Careful consideration was given to the pH gradient length and composition to optimize for separation time, detection sensitivity, and analytical performance in a given application.

Single-Cell tGFP Focusing Characterization

IEF from single cells was characterized using real-time imaging (10× magnification) of tGFP expressed in U373-tGFP cells (FIG. 30, panel D; FIG. 32). Cell lysis began at t=10 s and the protein contents indicated by tGFP fluorescence were loaded upon application of a potential difference of 600 V at t=60 s. During injection, ~4% stacking (measured as x-axis band width normalized by initial band width $$\frac{\sigma_x}{\sigma_{x0}}$$

was observed as the proteins entered the 6% T polyacrylamide gel from the free solution microwell (FIG. 30, panel D). Stacking was calculated by dividing band width at each time point by the initial band width of the signal from the microwell before cell lysis. Interestingly, in this system enrichment in the x-axis was not observed upon IEF completion from the starting concentration in the cell; the initial band width (dictated by microwell size) was narrower than the size of the focused zones. While focusing occurred along the separation axis (x-axis, current path), diffusion broadened the protein band in the direction transverse (y-axis) to the scIEF separation axis in the bottom layer plane. Consequently, the separation resolution (SR) in the y-axis between cells initially in microwells 500 µm apart was observed to decrease from 10.3 to 1.2 after 390 s (lysis+focusing) (FIG. 32, panel F). The spacing in the y-axis between the two bands was maintained with an average distance of ~495 µm with only ~1% variation demonstrating uniform migration (FIG. 32, panel G). With SR>1 upon completion of focusing, the 500 µm spacing was adequate to ensure no overlap between the signals of each lane, thus enabling the performance of multiple scIEF assays in parallel. With 600 V applied in devices with a 9 mm long 4-9 pH focusing region, the maximum current of 2.38 mA was observed at 22 s after the start of focusing with it dropping to 0.86 mA by 3 min and stabilizing at 0.59 mA by 5 min.

Lid Placement Reproducibility Characterization

To characterize the repeatability of the lid placement and thus the repeatability of the position of the pH gradient relative to the microwell location, the peak center location of focused tGFP was compared across three devices (FIG. 33). Single U373-tGFP cells were assayed for tGFP in scIEF devices with a 9 mm long, pH 4-7 gradients. Focusing was performed for 6 minutes at 600 V. The native tGFP fluorescence was imaged after photocapture and the peak locations relative to the microwells was assessed. To assess the variance in the peak position across the different devices, the coefficient of variance was calculated, which was given as $$CV = \frac{\sigma}{\mu}$$

where σ standard deviation and μ is the mean. The tGFP peak center location was xtGFP=3.10±0.46 mm (n=3 devices, 9 cells), which gave a coefficient of variance of CV=14.87%.

Photocapture and Immunoprobing Characterization

UV photocapture resulted in irreversible photobleaching of a subset of the tGFP proteins resulting in a SNR of 4.67±3.33 from single cells (n=9). After immunoprobing, SNR was increased to 51.87±39.10 (FIG. 30, panel E; FIG. 35, panel A). Multiplexed immunoprobing was performed to enable the readout of unlabeled and endogenous targets in native conditions (FIG. 37, panel A; FIG. 35, panel B). Denaturing conditions were used during scIEF to achieve resolution of protein isoforms (FIG. 37, panel B; FIG. 35, panel C) and immunoprobing of nuclear proteins (FIG. 37, panel E; FIG. 35, panel D). Owing to the short transport lengths for diffusive antibody introduction, the scIEF assay on endogenous proteins was completed in less than 7 hours. Moreover, not having to use the polyacrylamide gel for sieving allowed the use of low-density gels. The low-density gels facilitated diffusive antibody probing without needing to tune gel density for specific molecular weight separations.

During photocapture, both electromigration and diffusional band broadening reduce resolution. Under an applied electric field, each protein peak would be immobilized while migrating along the scIEF separation axis. Such migration reduced certainty in pI and reduces scIEF separation resolution. To mitigate these confounding factors, photocapture was performed with no applied electric field (electrically floating). Under such conditions, the focused protein peak defocuses owing to diffusion. Importantly, during defocusing the peak maximum was stationary, which yielded a robust determination of pI, such that only resolution losses was considered. Using the characteristic timescale for protein photocapture (t ~5.5 s), the experimentally measured diffusivity for tGFP in 6% T (3.3% C) gels (D ~31.3 μm2 s-1, experimentally determined in the Diffusivity and Relative Mobility Measurements section), and the relationship 2Dt=x2 for unconfined one-dimensional diffusion, a defocusing dispersion during photocapture was estimated and leads to a x ~17 μm increase in peak width. Given the focused band width of tGFP (~90 μm, FIG. 30, panel D, FIG. 32, panel B), defocusing during photocapture resulted in ~20% loss in separation resolution.

Figure 36:
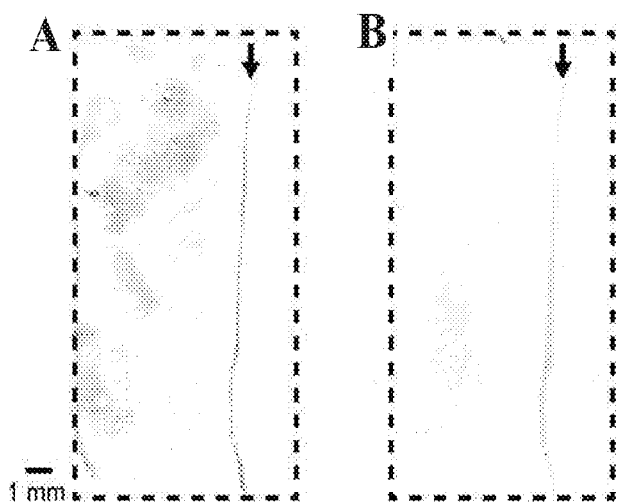
FIG. 36 shows quantification of photocapture efficiency. Micrographs of fluorescence of 1 µM tGFP fluorescence assayed with an scIEF device in native conditions (pH 4-9, 9 mm wide gradient, 5 minutes of focusing, 600 V) FIG. 36, panel A before washing and FIG. 36, panel B after washing.

Protein photocapture efficiency can vary depending on the buffer and denaturation state of the protein. The protein photocapture efficiency was measured in the scIEF assay by comparing the total fluorescence of a photocaptured tGFP band before and after washing. To do so, 1 μM of purified tGFP was included in the bottom layer and focused for 5 min (FIG. 36). After focusing, the setup was illuminated with UV for 45 s for protein photocapture. Note that a fraction of tGFP molecules were irreversibly photobleached during UV photocapture. Photobleaching was assumed to occur at the same rate in both captured and uncaptured protein populations.

Photocapture was performed under focused conditions because the local buffer composition (carrier ampholytes) is different in focused and unfocused compositions. Following photocapture, the total tGFP fluorescence was imaged in the bottom layer. Next, the bottom layer was washed in TBST overnight to allow protein that was not photocaptured to diffuse out of the bottom layer.

Finally, the bottom layer was imaged after washing. In the before and after images, the area under the curve (AUC) of the focused band in 250 μm tall regions of interest (ROIs) was calculated. Photocapture efficiency was calculated as $$\eta = AUC_{after\_wash}/AUC_{before\_wash}$$

and $AUC_{after\_wash}$ were the AUC before and after washing in corresponding regions of interest, respectively. The photocapture efficiency of the scIEF assay is η=17.7±1.5% (n=30 ROIs). Interestingly, this value was higher than the 1.3-13% capture efficiencies previously observed in IEF buffers. In the scIEF assay, however, a different carrier ampholyte was used and detergent mixture as well as a higher BPMAC concentration (5 mM compared to 3 mM). For IEF separations in gels the BPMAC concentration could be increased without adversely affecting the sieving properties of the gel, which was not the case for size-based separations.

Using the experimentally measured protein photocapture efficiency of ~17.7%, the lower limit of detection of our system could be estimated. In detailed characterization done in prior work, the lower limit of detection by in gel immunoprobing was estimated to be ~27,000 molecules when the capture efficiency was 27.5% (Hughes et al., 2014). Therefore, to achieve the same number of captured proteins for immunoprobing detection ~42,000 molecules were needed in the bottom layer prior to photocapture in the scIEF system when native conditions. As mentioned previously, the buffer compositions used and the denaturation state of proteins could affect photocapture efficiency.

Diffusive Protein Losses to Gel Lid during scIEF

Diffusive protein losses to the lid were estimated by including purified wtGFP at a concentration of 10 μg mL-1 inF bottom layer gel precursor and performing IEF for 10 min. After 10 min, the scIEF setup was imaged (FIG. 15, panel A). The lid was then removed and imaged separately (FIG. 15, panel B), allowing the estimation of the protein that diffused into the gel lid from the bottom layer during IEF.

Microfluidic Glass Device Fabrication and Operation

Various characterization studies and parameter estimations were done using microfluidic glass devices. Soda lime glass devices were designed, fabricated, functionalized with acrylateterminated monolayers, and filled with photopolymerized polyacrylamide gel, using conventional methods. Chip layouts containing a 70 μm wide and 10.4 mm long channel between ~2 mm diameter well reservoirs were designed in-house using AutoCAD 2011 (Autodesk Inc., San Rafael, Calif.). 20 μm deep features were fabricated on the glass chips using standard wet etching processing by Caliper Life Sciences (a PerkinElmer Company, Hopkinton, Mass.) using the designed chrome-glass photomask (Photo Sciences Inc., Torrance, Calif.). Fluid access well drilling and thermal bonding were done by Caliper.

Covalent attachment of the polyacrylamide gel to the channel walls was achieved by acrylateterminated silane monolayer formation on the channel walls using conventional methods. Channels were first washed with 1 M NaOH for 10 min, then rinsed with DI water, and then purged by vacuum. A degassed 2:3:5 (v/v/v) mixture of 3-(trimethoxysilyl)-propyl methacrylate, acetic acid, and DI water was then introduced into the channels for the silane monolayer formation. After 30 min, the channels were rinsed with methanol and DI water and then purged by vacuum. An analogous protocol was used to form the silane monolayers on glass slides. Gels were photopolymerized inside the glass channels using the same UV exposure conditions described in the main text for gel lid fabrication. UV exposure to the well reservoirs was blocked to prevent gel formation in the wells. Press-fit pipette tips were inserted into the wells to be used as 10 pl reservoirs. Continuous monitoring and control of voltages and currents for on-chip electrophoresis was achieved using a custom built, eight-channel high voltage power supply.

Following assay completion, gels could be removed from the glass chips allowing efficient recycling of glass chips by using an overnight incubation with a 2:1 perchloric acid and hydrogen peroxide solution heated to 75° C. following appropriate safety precautions.

Cell Lysate Microfluidic IEF

IEF of cell lysate was performed in microfluidic channels (FIG. 25) to determine the pI of tGFP. U373-tGFP cells were lysed via the addition of the native lysis detergent composition used for scIEF followed by vortexing (Analogue Vortex Mixer, VWR) and sonication (Aquasonic Model 50D, VWR). Extracts were then purified and exchanged to IEF buffer (1:10 PB74 and PB96, 3.6% (w/v) CHAPS) via centrifugation in Bio-Spin Columns with Bio-Gel P-30 (Bio-Rad) following manufacturer instructions. 6% T (3.3% C) gels containing IEF buffer and 1:100 dilution of pH markers were photopolymerized inside the channels of the microfluidic glass devices. Sample solution containing IEF buffer, 1:100 (v/v) dilutions of pH markers (pH 4.5, 5.5, 6.8), and a 1:20 (v/v) dilution of the purified cell extract was electrophoretically loaded from both wells into the device for 30 s by applying a potential difference of 600 V between reservoirs. After electrophoretic loading, the electric field application was stopped and the solutions in the terminal wells were replaced with 1× Cathode Buffer (20 mM arginine, 20 mM lysine) and 1× Anode Buffer (7 mM phosphoric acid), both acquired from Bio-Rad. A 600 V potential difference was then reapplied for the focusing step.

Profile plots of the focused bands were obtained from windows equal to channel width using ImageJ. The position of the pH gradient was determined by linear regression of the position of the fluorescent pH markers. The pI of the tGFP isoforms was estimated using the linear fit of the pH gradient. The pI values of 4.32±0.01, 4.44±0.01, and 4.62±0.00 for the three tGFP isoforms match the pattern for single charge differences resulting from differential C-terminal cleavage by non-specific proteases. For comparison, the isoforms of wtGFP had pI values of 4.88, 5.00, and 5.19.[12]

Diffusivity and Relative Mobility Measurements

The diffusivities of the reagents used in the focusing region of the scIEF are given in FIG. 39. The diffusivities D of the reagents were estimated using the Stokes-Einstein relation given as $D=k_B T/6\pi\eta a$ where $k_B$ is the Boltzmann constant, T is the temperature, $\eta$ is the dynamic viscosity, and a is the hydrodynamic radius. The hydrodynamic radii of the Polybuffers and pH markers were estimated by $a=0.595*m_w 0.427$ where $m_w$ is the molecular weight of the solute as specified by the manufacturer. The hydrodynamic radii of the CHAPS and digitonin micelles were obtained from literature. The diffusivity of Triton X-100, urea, and thiourea were obtained from the literature. Characteristic times of diffusion were estimated as $t=x^2/2D$ where x is the diffusion length and D is the diffusivity of the solute. The effect of the gel matrix on the diffusivity and partitioning coefficients of small molecules was negligible. According to our estimations, the reagents in the lysis buffer required ~0.1 to 12 s to diffuse into the bottom layer where the species remained at 92% of their initial concentration (FIG. 39), owing to the larger thickness of the lid compared to the thin bottom layer (500 µm vs. 40 µm).

Measurements of the diffusivity of tGFP in free solution, 6% T (3.3% C), and 15% T (3.3% C) gels were done in microfluidic glass devices as described in this Example. Gels were photopolymerized inside the devices using the same procedure used for the cell lysate IEF. The same sample solution containing cell extract was electrophoretically loaded at 600 V for 20 s from the negative terminal. After loading, the solution in the loading well was replaced with 1× Cathode Buffer and a potential of 600 V was reapplied to load a band of tGFP into the channel. The electric field application was halted and the protein band was imaged at 10× magnification for 200 s with 20 s intervals. Profile plots were obtained from windows equal to channel width using ImageJ.

Measured band widths (4σ) were used to determine the diffusivity D of tGFP using the relationship $2Dt=\sigma^2$ for unconfined one-dimensional diffusion from a point source. The measured tGFP diffusivity in free solution, 6% T (3.3% C) gels, and 15% T (3.3% C) gels were 169.1±94.1, 31.3±5.2, and 4.2±1.1 µm2 s-1, respectively. The position of the band during loading was tracked across a distance of ~525 µm during the loading using ImageJ scripts written in house to calculate the relative mobility difference of tGFP at the two gel densities. A custom, in-house written ImageJ script was used to track peak position during migration. tGFP mobility was 46.3±1.1% lower in 15% T gels compared to 6% T gels. The molecular weight of tGFP is reported to be 26-27 kDa. The mean±standard deviation values are reported for 3 replicates in each condition.

Chemical Partitioning Coefficient Measurements

Partitioning measurements were performed using 2.5 cm² (500 µm thick) pads of polyacrylamide. For the free solution to gel measurements, the appropriate gel composition was polymerized on a glass slide using the fabrication procedure shown in FIG. 31. The gel was then allowed to equilibrate in a 1 µM solution of tGFP on a shaker overnight. After incubation the glass slide was removed and a second glass slide was placed on top, ensuring that the free solution of tGFP next to the gel pad was also 500 µm thick. The gel and free solution were then imaged using a widefield epifluorescence microscope focused on the bottom of the gel pad (4x/NA 0.13 objective). The chemical partitioning coefficient K was defined using the following equation:

$$K=[tGFP_{two\ free\ volume}/[tGFP_{high\ free\ volume}].$$

The 15% T polyacrylamide gel to 6% T polyacrylamide gel partitioning measurement was performed in a similar manner. 6% T polyacrylamide gel and 15% T polyacrylamide gel pads (1 cm×2.5 cm×500 µm) were fabricated on separated glass slides. The 6% T polyacrylamide gel pad was incubated in 1 µM tGFP. Then the 6% T polyacrylamide gel and 15% T polyacrylamide gel pads were placed face-to-face. The edges of the sandwich were sealed with paraffin wax to prevent evaporation. The sandwich was allowed to equilibrate for 4 days then each polyacrylamide gel pad was imaged separately.

The partitioning coefficient of the 6% T polyacrylamide gel to free solution, $K_{eq,6-FS}$, was measured to be 0.51±0.13. This was 13.7% higher than the previously measured value for EGFP in 8% T polyacrylamide gel (K=0.44±0.05). A higher partitioning coefficient for a lower % T gel was expected due to the increased free volume in the polymer matrix. Correspondingly, $K_{eq,6-FS}$ was higher than that for 15% T to free solution, $K_{eq,15-FS}$, which was estimated to be 0.24±0.04.

Surprisingly, $K_{eq,15-FS}$, the partitioning coefficient of the 15% T polyacrylamide gel to 6% T polyacrylamide gel, was lower than both the 6% T polyacrylamide gel and 15% T polyacrylamide gel to free solution partitioning coefficients (0.10±0.04). Nevertheless, the simulations in which these parameters were used were not sensitive to variations within this range in the partitioning coefficients.

COMOSL Simulations of Protein Losses During scIEF

Simulations were done in COMSOL Multiphysics 4.2a (Burlington, Mass.). Diffusivities and partitioning coefficients were experimentally determined or obtained from literature. Mass transport simulations were performed to estimate protein losses during lysis and electromigration in the scIEF setup reported in this work and in typical single cell western blotting setups (FIG. 23). During lysis and electromigration, losses occur over time via diffusion and chemical partitioning between the different gel and free solution phases. For diffusion in three dimensions, a 2D axis-symmetric model was used, and for diffusion in two dimension, a 2D model was used (FIG. 24). The gel lid was 500 μm high, the bottom layer was 30 μm high, and the microwell was 30 μm wide. The maximum and minimum mesh element sizes were 30 and 0.3 μm, respectively. The time steps for lysis and electromigration simulations were 1 s and 5 s, respectively. Initial conditions before lysis were modeled as an initial uniform starting concentration of tGFP in a 28 μm diameter cell inside the microwell. The used diffusivities and partitioning coefficients of tGFP in different gel densities were experimentally estimated. The configurations used for the different simulations were specified in FIG. 24. Losses were estimated by tracking the concentration over time. The concentration used was determined by integrating the protein concentration along a z-axis cutline through the center of the microwell on the bottom layer. This concentration represents the maximum concentration of protein in the bottom layer that would be measured by wide-field microscopy.

For simplicity, the initial conditions used for the electromigration simulations were the same as used for the lysis simulations. Thus, proteins started from a uniform starting concentration instead of the Gaussian-like zone present at the end of focusing. As an additional simplification, the differential electromigration of protein in the different gel densities was ignored. During scIEF, proteins that diffused off the bottom layer into the gel lid experience IEF and focused at the same position as on the bottom layer, while in single-cell western blotting, proteins that diffused into the free solution bath did not focus. Proteins have a lower mobility at higher % T polyacrylamide gel, but in this study it was assumed that during focusing the position of the protein bands on the bottom layer and gel lid coincide, justified by the rapid focusing times in the setup, the estimated mobility differences, and experimental observations (FIG. 15). Given that no focusing occurs in single-cell western blotting, these simulations underestimated the losses during electromigration for single-cell western blotting. A third simplification is that the gel lid is 500 μm in height vs. the ~10 mm height of the free solution bath, thus providing a smaller volume reservoir for dilution. However, the diffusion time for tGFP across 500 μm of 15% T gel is ~17 hours, so the contribution from this difference was considered negligible.

The goal of the simulations was to estimate the diffusive protein losses during the scIEF assay and gain insight into the mechanisms that mitigate these diffusive losses in the scIEF setup that enable longer separations (>5 min) compared to single-cell western blotting (<1 min). There are two major differences regarding the protein losses in the setup developed here for scIEF and the setup typically used for single cell western blotting demonstrated previously. First, the use of the 15% T gel lid used in scIEF compared to the free solution bath used in single-cell western blotting for lysis reagent delivery and electrical actuation leads to loss mitigation by reducing diffusion in the z-axis. With the gel lid (scIEF), integrated concentration decreased by 90% after 20 s, while without the gel lid, integrated concentration decreased by 90% after 5 s (FIG. 23, panel B). During electromigration, losses were further mitigated due to focusing, which eliminated diffusive losses along the x-axis. By restricting diffusion to two dimensions, integrated concentrated decreased by 90% after 115 s (FIG. 23, panel C). Thus, while the gel lid did help mitigate losses during lysis and electromigration, focusing, or the reduction of diffusion in three dimensions to two, was the primary reason for the reduction in protein losses in scIEF compared to single-cell western blotting.

A sensitivity analysis was performed to determine whether dense gels mitigated losses due to partitioning or due to proteins having a lower diffusivity in these regions. The partitioning coefficient $K_{eq,15-6}$ was varied and measured changes in the resulting integrated concentration at the different times. Changing $K_{eq,15-6}$ from the measured to 0.1 to 0.24 and 0.51 in the scIEF simulations resulted in average changes of integrated concentration of <0.02 in the tested conditions (FIG. 23). Thus, the losses were not very sensitive to changes in the partitioning coefficient and any variations in the experimentally determined partitioning coefficients were not impactful. These results indicated that diffusive losses in the system were mitigated mostly due to the lower diffusivity in high-density gel regions and not due to the partitioning behavior that happens at the interfaces which determines equilibrium concentrations.

Although the foregoing embodiments have been described in some detail by way of illustration and example for purposes of clarity of understanding, it is readily apparent to those of ordinary skill in the art in light of the teachings of the present disclosure that certain changes and modifications may be made thereto without departing from the spirit or scope of the appended claims. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

That which is claimed is:

1. A device comprising:
    a polymeric separation medium comprising two or more isoelectric focusing regions each comprising an acidic boundary sub-region, a basic boundary sub-region, and a focusing sub-region positioned between the acidic boundary sub-region and the basic boundary sub-region,
    wherein each isoelectric focusing region is configured for multiplex separation of sample components of interest from two or more samples in the polymeric separation medium,
    wherein the two or more isoelectric focusing regions are arranged in series along an axis of the polymeric separation medium, and
    wherein each isoelectric focusing region comprises a pH gradient along the axis of the polymeric separation medium.

2. The device of claim 1, wherein the isoelectric focusing region comprises a polymeric gel.

3. The device of claim 2, wherein the pH gradient is an immobilized pH gradient.

4. The device of claim 1, wherein the polymeric separation medium further comprises functional groups that covalently bond to the sample components of interest in the polymeric separation medium upon application of an applied stimulus.

5. The device of claim 1, wherein the polymeric separation medium comprises:
    a plurality of microwells arranged for parallel separations of the sample components of interest along the axis from each microwell.

6. The device of claim 5, wherein each microwell is dimensioned to accommodate a single cell.

7. The device of claim 5, further comprising a polymeric gel cover configured to contact a top surface of the polymeric separation medium.

8. The device of claim 7, wherein the polymeric gel cover contacts one or more electrodes configured to apply an electric field to the polymeric separation medium.

9. The device of claim 7, wherein the polymeric gel cover comprises a pH gradient along an axis of the polymeric gel cover substantially parallel to the axis of the polymeric separation medium.

10. The device of claim 7, wherein the polymeric gel cover comprises a lysis reagent.

11. The device of claim 5, wherein the polymeric separation medium comprises two or more isoelectric focusing regions arranged in series along the axis of the polymeric separation medium.

12. The device of claim 5, wherein the polymeric separation medium further comprises functional groups that covalently bond to the sample components of interest in the polymeric separation medium upon application of an applied stimulus.

13. A method comprising:
    contacting a sample to the polymeric separation medium of the device according to claim 1; and
    applying an electric field to the polymeric separation medium in a manner sufficient to perform a multiplex isoelectric focusing separation of the sample components of interest in the polymeric separation medium.

14. The method of claim 13, wherein the polymeric separation medium comprises two or more isoelectric focusing regions arranged in series along an axis of the polymeric separation medium.

15. The method of claim 13, wherein the polymeric separation medium comprises:
    a pH gradient along an axis of the polymeric separation medium; and
    a plurality of microwells arranged for parallel separations of theسل sample components of interest along the axis from each microwell; and
    wherein, prior to applying the electric field, the method comprises contacting a top surface of the polymeric separation medium with a polymeric gel cover comprising a pH gradient along an axis of the polymeric gel cover substantially parallel to the axis of the polymeric separation medium.

16. The method of claim 15, wherein the sample comprises cells and/or cellular components.

17. The method of claim 16, further comprising lysing the cells to produce cellular components of interest in the sample.

18. The method of claim 13, further comprising immobilizing the separated sample components in the polymeric separation medium.

19. The method of claim 13, further comprising detecting the separated sample components.

20. A system comprising:
the device according to claim 1; and
an electric field source.

21. A kit comprising:
the device according to claim 1; and
a packaging containing the device.

22. The device of claim 1, wherein the acidic boundary sub-region comprises immobilines that buffer at an acidic pH and the basic boundary sub-region comprises immobilines that buffer at a basic pH.

23. The device of claim 1, wherein the acidic boundary sub-region is positioned on a same side of the focusing sub-region as a positive electrode, and the basic boundary sub-region is positioned on a same side of the focusing sub-region as a negative electrode.

* * * * *